United States Patent
Greenbaum et al.

(10) Patent No.: US 10,372,807 B1
(45) Date of Patent: Aug. 6, 2019

(54) SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES IN A DISTRIBUTED SYSTEM ARCHITECTURE

(71) Applicant: Addepar, Inc., Mountain View, CA (US)

(72) Inventors: Michael Lee Greenbaum, Mountain View, CA (US); Duc Ngo, Mountain View, CA (US); Hao Wu, Sunnyvale, CA (US)

(73) Assignee: Addepar, Inc., Mountain View, CA (US)

( * ) Notice: Subject to any disclaimer, the term of this patent is extended or adjusted under 35 U.S.C. 154(b) by 298 days.

(21) Appl. No.: 15/349,332

(22) Filed: Nov. 11, 2016

Related U.S. Application Data

(60) Provisional application No. 62/253,858, filed on Nov. 11, 2015.

(51) Int. Cl.
*G06F 3/048* (2013.01)
*G06F 17/24* (2006.01)
(Continued)

(52) U.S. Cl.
CPC ........... *G06F 17/245* (2013.01); *G06Q 40/00* (2013.01); *G06F 3/04842* (2013.01)

(58) Field of Classification Search
None
See application file for complete search history.

(56) References Cited

U.S. PATENT DOCUMENTS

| | | |
|---|---|---|
| 5,704,371 A | 1/1998 | Shepard |
| 6,865,567 B1 | 3/2005 | Oommen et al. |

(Continued)

FOREIGN PATENT DOCUMENTS

| | | |
|---|---|---|
| EP | 1862955 | 5/2007 |
| EP | 2439691 | 4/2012 |

(Continued)

OTHER PUBLICATIONS

Chakrabarti, D., & Faloustsos, C. (2006). Graph mining. ACM Computing Surveys, 38(1), 2. doi:http://doi.acm.org.10.1145/1132952.1132954 retrieved on Feb. 6, 2015.

(Continued)

*Primary Examiner* — William C Trapanese
(74) *Attorney, Agent, or Firm* — Knobbe Martens Olson & Bear LLP

(57) ABSTRACT

Various systems and methods are provided for accessing and traversing one or more complex data structures and generating a functional user interface that can enable non-technical users to quickly and dynamically generate detailed reports (including tables, charts, and/or the like) of complex data including time varying attributes. The user interfaces are interactive such that a user may make selections, provide inputs, and/or manipulate outputs. In response to various user inputs, the system automatically calculates applicable time intervals, accesses and traverses complex data structures (including, for example, a mathematical graph having nodes and edges), calculates complex data based on the traversals and the calculated time intervals, displays the calculated complex data to the user, and/or enters the calculated complex data into the tables, charts, and/or the like. The user interfaces may be automatically updated based on a context selected by the user.

20 Claims, 55 Drawing Sheets

(51) Int. Cl.
*G06Q 40/00* (2012.01)
*G06F 3/0484* (2013.01)

(56) References Cited

U.S. PATENT DOCUMENTS

| | | | |
|---|---|---|---|
| 7,046,248 B1 | 5/2006 | Perttunen | |
| 7,299,223 B2 | 11/2007 | Namait et al. | |
| 7,395,270 B2 | 7/2008 | Lim et al. | |
| 7,533,057 B2 | 5/2009 | Whipple et al. | |
| 7,533,118 B2 | 5/2009 | Chaudri | |
| 7,644,088 B2 | 1/2010 | Fawcett et al. | |
| 7,769,682 B2 | 8/2010 | Mougdal | |
| 7,827,082 B1 | 11/2010 | Shanmugan | |
| 7,836,394 B2 | 11/2010 | Linder | |
| 7,873,557 B2 | 1/2011 | Guidotti et al. | |
| 7,949,937 B2 | 5/2011 | Wu | |
| 7,966,234 B1 | 6/2011 | Merves et al. | |
| 7,996,290 B2 | 8/2011 | Dweck et al. | |
| 8,117,187 B2 | 2/2012 | Mostl | |
| 8,249,962 B1 | 8/2012 | Stephens et al. | |
| 8,271,519 B2 | 9/2012 | Young | |
| 8,306,891 B1 | 11/2012 | Findlay, III et al. | |
| 8,458,764 B2 | 6/2013 | Karjoth et al. | |
| 8,819,763 B1 | 8/2014 | Cheung et al. | |
| 9,015,073 B2 * | 4/2015 | Mirra | G06Q 40/06 705/36 R |
| 9,087,361 B2 | 7/2015 | Mirra et al. | |
| 9,105,062 B2 | 8/2015 | Posch et al. | |
| 9,105,064 B2 | 8/2015 | Posch et al. | |
| 9,244,899 B1 * | 1/2016 | Greenbaum | G06Q 40/00 |
| 9,424,333 B1 * | 8/2016 | Bisignani | G06F 17/30592 |
| 9,916,297 B1 * | 3/2018 | Greenbaum | G06Q 40/00 |
| 2002/0042764 A1 | 4/2002 | Gardner et al. | |
| 2003/0174165 A1 | 9/2003 | Barney | |
| 2004/0236655 A1 | 11/2004 | Scumniotales et al. | |
| 2005/0187852 A1 | 8/2005 | Hwang | |
| 2005/0222929 A1 | 10/2005 | Steier et al. | |
| 2005/0262047 A1 | 11/2005 | Wu | |
| 2006/0041539 A1 | 2/2006 | Matchett | |
| 2006/0146719 A1 | 7/2006 | Sobek et al. | |
| 2006/0212452 A1 | 9/2006 | Cornacchia | |
| 2007/0011071 A1 | 1/2007 | Cuscovitch et al. | |
| 2008/0139191 A1 | 6/2008 | Melnyk et al. | |
| 2008/0270316 A1 | 10/2008 | Guidotti et al. | |
| 2009/0164387 A1 | 6/2009 | Armstrong et al. | |
| 2009/0249359 A1 | 10/2009 | Caunter et al. | |
| 2010/0100802 A1 | 4/2010 | Delaporte | |
| 2011/0264467 A1 | 10/2011 | Green | |
| 2011/0283242 A1 | 11/2011 | Chew | |
| 2011/0302221 A1 | 12/2011 | Tobin et al. | |
| 2012/0089432 A1 | 4/2012 | Podgurny | |
| 2012/0136804 A1 | 5/2012 | Lucia et al. | |
| 2012/0182882 A1 | 7/2012 | Chrapko et al. | |
| 2013/0073939 A1 | 3/2013 | Honsowetz | |
| 2013/0073940 A1 | 3/2013 | Honsowetz | |
| 2013/0212505 A1 | 8/2013 | Herold | |
| 2013/0332862 A1 * | 12/2013 | Mirra | G06Q 40/06 715/760 |
| 2014/0250375 A1 | 9/2014 | Malik | |
| 2015/0026075 A1 | 1/2015 | Mondri et al. | |
| 2015/0186338 A1 * | 7/2015 | Mirra | G06O 40/06 715/210 |

FOREIGN PATENT DOCUMENTS

| | | |
|---|---|---|
| EP | 2672446 | 12/2013 |
| EP | 2672447 | 12/2013 |
| EP | 2743881 | 6/2014 |
| HK | 1193898 | 10/2014 |
| JP | 2002197277 A | 7/2002 |
| SG | 195517 | 12/2013 |
| SG | 195518 | 4/2015 |
| WO | WO 2005/036364 | 4/2005 |

OTHER PUBLICATIONS

Wagner et al.,: Assessing the Vulnerability of Supply Chain Using Graph Theory, 2010, International Jounral of Production Economics 126, pp. 121-129.

Yang et al.,: Incremental Mining of Across-Stream Sequential Patterns in Multiple Data Streams, Mar. 2011, Journal of Computers, vol. 6, No. 3, pp. 449-457.

European Patent Office, "Extended Search Report" in application No. 13170954.5, dated Jan. 21, 2014, 6 pages.

European Patent Office, "Search Report" in application No. 13170952.9, dated Jan. 21, 2014, 6 pages.

European Patent Office, "Search Report" in application No. 13197286.1, dated Mar. 14, 2014, 5 pages.

Singapore, "Search and Examination Report" in application No. 201304378-1, dated Jul. 3, 2014.

Singapore, "Search and Examination Report" in application No. 201304379-9, dated Jan. 23, 2014.

U.S. Appl. No. 14/644,025, Controlled Creation of Reports From Table Views, filed Mar. 10, 2015.

U.S. Appl. No. 14/683,059, Interactive Look Through User Interface, filed Apr. 9, 2015.

U.S. Appl. No. 14/962,987, Systems and User Interfaces for Dynamic and Interactive Table Generation and Editing Based on Automatic Traversal of Complex Data Structures Including Time Varying Attributes, filed Dec. 18, 2015.

U.S. Appl. No. 15/213,722, Systems and User Interfaces for Dynamic and Interactive Report Generation and Editing Based on Automatic Traversal of Complex Data Structures, filed Jul. 19, 2016.

U.S. Appl. No. 15/344,154, Systems and User Interfaces for Dynamic and Interactive Table Generation and Editing Based on Automatic Traversal of Complex Data Structures Including Summary Data Such as Time Series Data, filed Nov. 4, 2016.

U.S. Appl. No. 15/343,766, Systems and User Interfaces for Dynamic and Interactive Table Generation and Editing Based on Automatic Traversal of Complex Data Structures and Incorporation of Metadata Mapped to the Complex Data Structures, filed Nov. 4, 2016.

* cited by examiner

FIG. 1B

*(Figure showing a table interface with columns: ASSET CLASS, VALUE (CURRENT), VALUE (2010-04-15))*

Date: 2011-04-15

Clients/Perspectives:
- Alice
- Bob
- Client C
- Client D
- Client E
- Client F

| ASSET CLASS | VALUE (CURRENT) | VALUE (2010-04-15) |
|---|---|---|
| ▼ Gary | | |
| ▼ Equity | | |
| Security A | $ 40,000.00 | $ 20,000.00 |
| ▼ Henry | $ 40,000.00 | $ 20,000.00 |
| ▼ Equity | | |
| Security A | $ 25,000.00 | $ 10,000.00 |
| Security B | $ 15,000.00 | $ 10,000.00 |
| Total | $ 40,000.00 | $ 30,000.00 |

Reference numbers: 112, 142, 144, 146, 152, 154

Buttons: Select View ▼, Edit Table, Add Filter

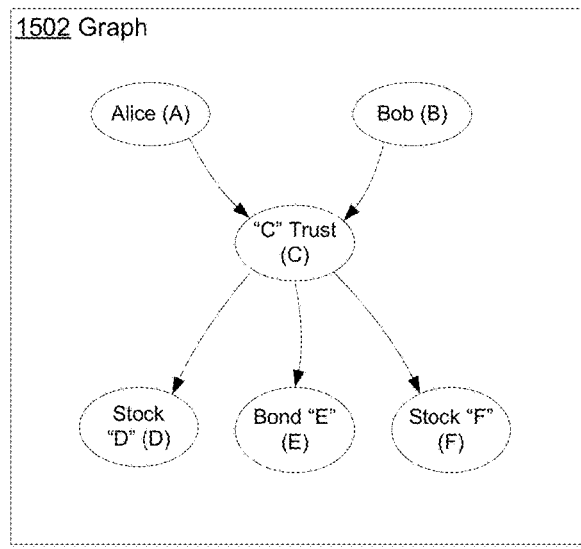
FIG. 15A
Perspective = Bob
Bucketing Factor = Asset Type
Column Factor = Asset Value ("Value")
Paths:
  1: B
  2: B,C
  3: B,C,D
  4: B,C,E
  5: B,C,F
FIG. 15B
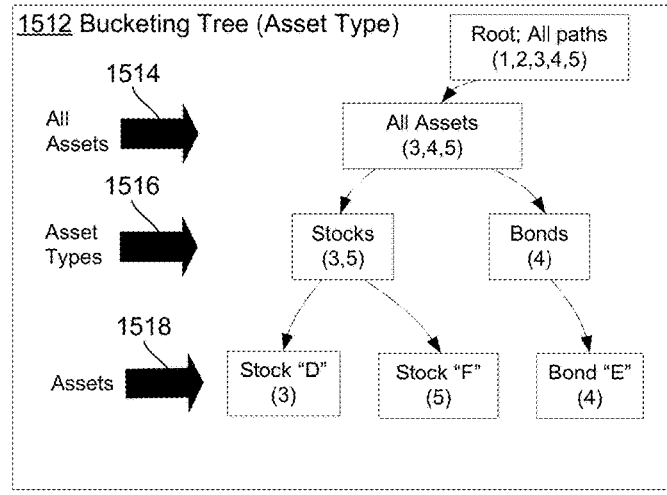
FIG. 15C

FIG. 17B

| USERS | | | |
|---|---|---|---|
| Alice | | | |
| Bob | | | |

2010-04-15 ▼

Select View ▼    Edit Table    Add Filter

*1714*

| ASSET CLASS | VALUE |
|---|---|
| ▼ Bonds | $ 20,000.00 |
|   ▼ US | $ 20,000.00 |
|     Bond "E" | $ 20,000.00 |
| ▼ Stocks | $ 50,000.00 |
|   ▼ US | $ 20,000.00 |
|     Stock "D" | $ 20,000.00 |
|   ▼ Europe | $ 30,000.00 |
|     Stock "F" | $ 30,000.00 |
| Total | $ 70,000.00 |

| 2010-04-15 ▼ | | | | Select View ▼ | Edit Table | Add Filter |
|---|---|---|---|---|---|---|
| Clients/Perspectives | | | | | | |
| Alice | ▼ ASSET CLASS | | VALUE (CURRENT) | VALUE (2010-04-15) | | |
| Bob | ▼ Gary | | $ 20,000.00 | $ 20,000.00 | | |
| Client C | ▼ Equity | | $ 20,000.00 | $ 20,000.00 | | |
| Client D | | Security A | $ 20,000.00 | $ 20,000.00 | | |
| Client E | ▼ Henry | | $ 10,000.00 | $ 10,000.00 | | |
| Client F | ▼ Equity | | $ 10,000.00 | $ 10,000.00 | | |
| | | Security B | $ 10,000.00 | $ 10,000.00 | | |
| | Total | | $ 30,000.00 | $ 30,000.00 | | |

2072 → (points to Total row)
2074 → (points to VALUE (CURRENT) column)
2076 → (points to VALUE (2010-04-15) column)

FIG. 20F

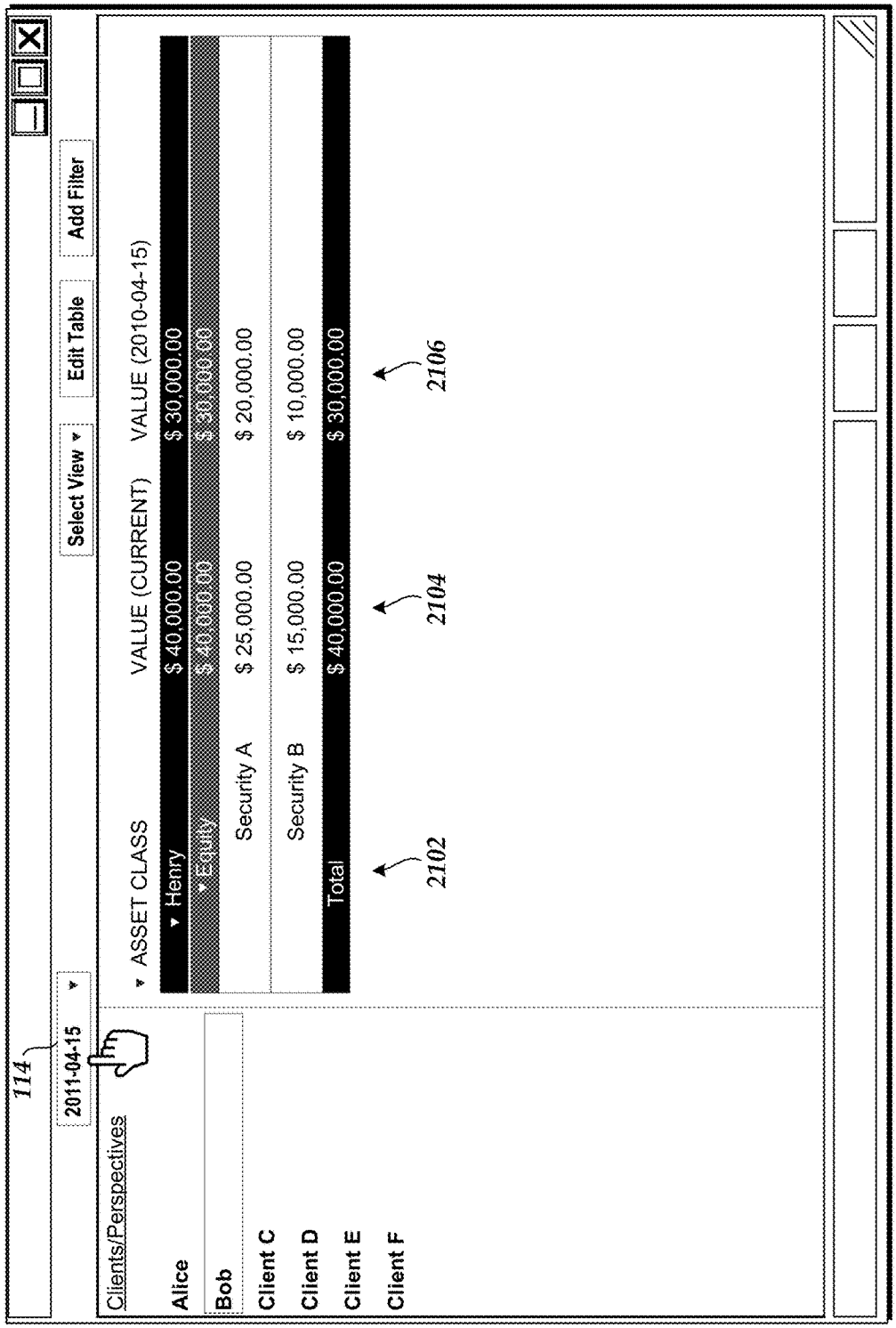

| Clients/Perspectives ▼ | 2011-04-15 ▼ | | Select View ▼ | Edit Table | Add Filter |
|---|---|---|---|---|---|
| Alice | ▼ ASSET CLASS | | VALUE (CURRENT) | VALUE (2010-04-15) | |
| Bob | ▼ Henry | | $ 40,000.00 | $ 30,000.00 | |
| Client C | ▼ Equity | | $ 40,000.00 | $ 30,000.00 | |
| Client D | | Security A | $ 25,000.00 | $ 20,000.00 | |
| Client E | | Security B | $ 15,000.00 | $ 10,000.00 | |
| Client F | Total | | $ 40,000.00 | $ 30,000.00 | |

EDIT TABLE

Groupings
Manager
Asset Class
Security

Columns
Value (Current)
Value (2010-04-15)

2042

👆 Group by historical values

2114

OK   CANCEL

FIG. 21B

```
Context = Bob & 2012-04-14
Bucketing Factor = Manager -> Asset Type
Column Factor = TWR (5 yr. trailing)
Group by historical values Paths:
    1: B
    2: B,C
    3: B,C,D
    4: B,C,E
```

Determined time varying attributes:
- Manager

SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES IN A DISTRIBUTED SYSTEM ARCHITECTURE

CROSS-REFERENCE TO RELATED APPLICATIONS

This application claims benefit of U.S. Provisional Patent Application No. 62/253,858, filed Nov. 11, 2015, and titled "SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES IN A DISTRIBUTED SYSTEM ARCHITECTURE." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

Embodiments of present disclosure relate to systems and techniques for accessing one or more databases in substantially real-time to provide information in an interactive user interface. More specifically, embodiments of the present disclosure relate to user interfaces for dynamically generating and displaying time varying complex data based on electronic collections of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A report (such as a report including tables and/or charts of complex data) is a way of presenting and conveying information, and is useful in many fields (for example, scientific fields, financial fields, political fields, and/or the like). In many fields, computer programs may be written to programmatically generate reports or documents from electronic collections of data, such as databases. This approach requires a computer programmer to write a program to access the electronic collections of data and output the desired report or document. Typically, a computer programmer must determine the proper format for the report from users or analysts that are familiar with the requirements of the report. Some man-machine interfaces for generating reports in this manner are software development tools that allow a computer programmer to write and test computer programs. Following development and testing of the computer program, the computer program must be released into a production environment for use. Thus, this approach for generating reports may be inefficient because an entire software development life cycle (for example, requirements gathering, development, testing, and release) may be required even if only one element or graphic of the report requires changing. Furthermore, this software development life cycle may be inefficient and consume significant processing and/or memory resources.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a computer system designed to provide interactive, graphical user interfaces (also referred to herein as "user interfaces") for enabling non-technical users to quickly and dynamically generate, edit, and update complex reports including tables and charts of data. The user interfaces are interactive such that a user may make selections, provide inputs, and/or manipulate outputs. In response to various user inputs, the system automatically accesses and traverses complex data structures (including, for example, a mathematical graph having nodes and edges), calculates complex data based on the traversals, and/or displays the calculated complex data to the user. The displayed data may be rapidly manipulated and automatically updated based on a context selected by the user, and the system may automatically publish generated data in multiple contexts.

The computer system (also referred to herein simply as the "system") may be useful to, for example, financial advisors, such as registered investment advisors (RIAs) and their firms. Such RIA's often need to view data relating to investment holdings of clients for purposes of analysis, reporting, sharing, or recommendations. Client investments may be held by individuals, partnerships, trusts, companies, and other legal entities having complex legal or ownership relationships. RIAs and other users may use the system to view complex holdings in a flexible way, for example, by selecting different metrics and/or defining their own views and reports on-the-fly.

Current wealth management technology does not offer the capability to generate views, reports, or other displays of data from complex investment holding structures in an interactive, dynamic, flexible, shareable, efficient way. Some existing wealth management systems are custom-built and therefore relatively static in their viewing capabilities, requiring programmers to make customized versions (as described above). Other systems lack scalability and are time-consuming to use. Yet other systems consist of MICROSOFT VISUAL BASIC scripts written for use with MICROSOFT EXCEL spreadsheets. This type of system is an awkward attempt to add some measure of flexibility to an otherwise static foundation.

Various embodiments of the present disclosure enable data generation and display in fewer steps, result in faster creation of outputs (such as tables and reports), consume less processing and/or memory resources than previous technology, permit users to have less knowledge of programming languages and/or software development techniques, and/or allow less technical users or developers to create outputs (such as tables and/or reports) than the user interfaces described above. Thus, the user interfaces described herein are more efficient as compared to previous user interfaces, and enable the user to cause the system to automatically access and initiate calculation of complex data automatically. Further, by storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements.

Further, various embodiments of the system further reduce memory requirements and/or processing needs and time via a complex graph data structure. For example, as described below, common data nodes may be used in multiple graphs of various users and/or clients of a firm operating the system. Utilization of common data nodes reduces memory requirements and/or processing requirements of the system.

Accordingly, in various embodiments the system may calculate data (via complex graph traversal described herein) and provide a unique and compact display of calculated data based on time varying attributes associated with the calculated data. In an embodiment, the data may be displayed in a table in which data is organized based on the time varying attributes and dates associated with particular metrics specified by the user and/or determined by the system. In some embodiments, when no metric values are associated with a particular item of data, a portion of the table is left blank and/or omitted.

In various embodiments the system may calculate time intervals applicable to calculations of various metrics. For example, the system may calculate asset value metrics for which a single date or time is applicable. In other examples, the system may calculate metrics that span periods of time such as a rate of return of an asset over a number of years. Accordingly, the system may determine a set of time intervals associated with the metric, a set of time intervals associated with applicable time varying attributes of graph data, and determine in intersection of the two sets of time intervals. The calculated intersection of the sets of time intervals may then be inputted into the complex graph traversal process to calculate metric values for display in compact and efficient user interfaces of the system.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Accordingly, various embodiments of the present disclosure may provide interactive user interfaces for enabling non-technical users to quickly and dynamically generate and edit complex reports including tables and charts of data. The complex reports may be generated through automatic calculation of applicable time intervals, access and traversal of complex data structures, and calculation of output data based on property/attribute values of multiple nodes and/or edges within such complex data structures, all in substantially real-time. The system may eliminate the need for a skilled programmer to generate a customized data and/or a report. Rather, the system may enable an end-user to customize, generate, and interact with complex data in multiple contexts automatically. Accordingly, embodiments of the present disclosure enable data generation and interaction in fewer steps, result in faster generation of complex data, consume less processing and/or memory resources than previous technology, permit users to have less knowledge of programming languages and/or software development techniques, and/or allow less technical users or developers to create outputs (such as tables and/or reports) than the previous user interfaces. Thus, in some embodiments, the systems and user interfaces described herein may be more efficient as compared to previous systems and user interfaces.

According to an embodiment, a computer system is disclosed that is configured to access one or more electronic data sources in response to inputs received via an interactive user interface in order to automatically calculate metrics based on a complex mathematical graph and insert the metrics into a dynamically generated table of the interactive user interface, the computing system comprising: a computer processor; and a computer readable storage medium configured to: store a complex mathematical graph comprising nodes and edges, each of the nodes storing information associated with at least one of an account, an individual, a legal entity, or a financial asset, each of the edges storing a relationship between two of the nodes, wherein a plurality of attributes is associated with each of the nodes and each of the edges, wherein at least one of the nodes is associated with a time varying attribute; and store program instructions configured for execution by the computer processor in order to cause the computing system to: generate user interface data for rendering an interactive user interface on a computing device, the interactive user interface including: a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and a context selection element including a listing of a plurality of perspectives from which the dynamically generated table may be automatically updated, each of the plurality of perspectives associated with a node of the complex mathematical graph; receive, via the interactive user interface, a selection of one of one of the plurality of perspectives; determine a node of the complex mathematical graph associated with the selected perspective; automatically traverse the complex mathematical graph from the determined node so as to enumerate paths within the complex mathematical graph that are associated with the determined node; for each enumerated path, determine any rows of the dynamically generated table associated with the enumerated path based on nodes commonly associated with the enumerated path and a row of the dynamically generated table; generate a bucketing tree comprising value nodes corresponding to the rows of the dynamically generated table and associated with the respective enumerated paths determined to be associated with the rows; for each value node of the bucketing tree and each metric of the dynamically generated table: determine one or more time intervals associated with each of the enumerated paths associated with the value node, the one or more time intervals determined based on attributes associated with nodes of each of the enumerated paths including any time varying attributes; determine one or more time intervals associated with the metric; calculate, for each of the enumerated paths associated with the value node, one or more calculation intervals based on an intersection between the time intervals associated with the metric and the time intervals associated with the respective enumerated path; for each of the enumerated paths and each of the calculation intervals associated with the respective enumerated paths: calculate an interval value corresponding to each calculation interval based on the metric; and aggregate the calculated interval values associated with each of the enumerated paths to calculate a path value associated with each of the enumerated paths; and aggregate the path values associated with each of the value nodes to calculate a metric value corresponding to each combination of value node and metric; and automatically update the dynamically generated table with the calculated metric values, wherein each of the calculated metric values is inserted into a cell of the table corresponding to the row associated with the value node associated with the calculated metric value and the column associated with the metric associated with the calculated metric value.

According to yet another embodiment, the interactive user interface further includes an input element wherein the user inputs time varying attribute information for association with a node via the input element, wherein the time varying attribute information includes at least two attribute values and time intervals associated with each of the at least two attribute values.

According to yet another embodiment, the rows of the dynamically generated table are arranged hierarchically according to a user defined categorization of one or more attributes associated with nodes of the complex mathematical graph.

According to yet another embodiment, the interactive user interface further includes an input element wherein the user inputs the categorization of the one or more attributes associated with nodes of the complex mathematical graph via the input element.

According to yet another embodiment, the interactive user interface further includes a second input element wherein the user inputs one or more metrics to be associated with the dynamically generated table via the second input element.

According to yet another embodiment, the one or more metrics include at least one of asset value, TWR, IRR, rate of return, cash flow, or average balance.

According to yet another embodiment, the interactive user interface further includes a second context selection element wherein the user selects select a particular date, wherein the determined one or more time intervals associated with the metric are based on the particular date.

According to yet another embodiment, automatically traversing the complex mathematical graph comprises: traversing, from the determined node, any edges and/or other nodes connected directly or indirectly with the determined node; determining, based on the traversal, any non-circular paths in the complex mathematical graph connected to the determined node; and designating the determined non-circular paths as the enumerated paths associated with the designated node.

According to yet another embodiment, at least two edges of the complex mathematical graph are part of a circular reference from the designated node back to the designated node, and wherein automatically traversing the complex mathematical graph further comprises: determining whether two sequences of two or more traversed nodes are identical, and if so, backtracking the traversal and moving to the next adjacent node or edge.

According to yet another embodiment, each of the enumerated paths include at least one node and at least one edge of the complex mathematical graph.

According to yet another embodiment, at least one column of the dynamically generated table corresponds to an asset value metric, and wherein calculating an interval value corresponding to each calculation interval based on the asset value metric comprises determining a monetary value associated with the edges and/or nodes of the enumerated path for each calculation interval.

According to yet another embodiment, aggregating the calculated interval values associated with each of the enumerated paths to calculate a path value associated with each of the enumerated paths comprises summing each of the calculated interval values.

According to yet another embodiment, the program instructions are further configured for execution by the computer processor in order to cause the computing system to, for each value node of the bucketing tree and each metric of the dynamically generated table: determine that no calculation intervals are associated with a given enumerated path associated with the value node and a given metric; and automatically update the dynamically generated table so as to insert a blank space into a cell of the table corresponding to the row associated with the value node and the column associated with the given metric.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 1A-1B illustrate example user interfaces of the system in which data is presented to the user in a table format.

FIG. 6 illustrates an example Edit Groupings dialog that displays a list of currently selected groupings and a tree representation of available groupings.

FIG. 7 illustrates an example Edit Columns dialog that displays a list of currently selected columns and a tree representation of available columns.

FIG. 9A illustrates a home screen display illustrating a portfolio summary view from the Perspective of Clients.

FIG. 9B illustrates another example in which widget and a Family option has been selected.

FIG. 13 illustrates the display of FIG. 4 showing asset details.

FIGS. 15A-15C illustrate an example traversal of a simplified graph.

FIG. 17A-17B illustrate an example bucketing tree and user interface of the system.

FIGS. 18A-18C illustrate example user interfaces of the system in which the user may associate a custom attribute with an asset.

FIGS. 20A-20F illustrate example user interfaces of the system in which data is presented to the user in a table format based on associated manager attribute information.

FIGS. 21A-21C illustrate additional example user interfaces of the system in which data is presented to the user in a table format based on associated manager attribute information.

DETAILED DESCRIPTION

Figure 1A:
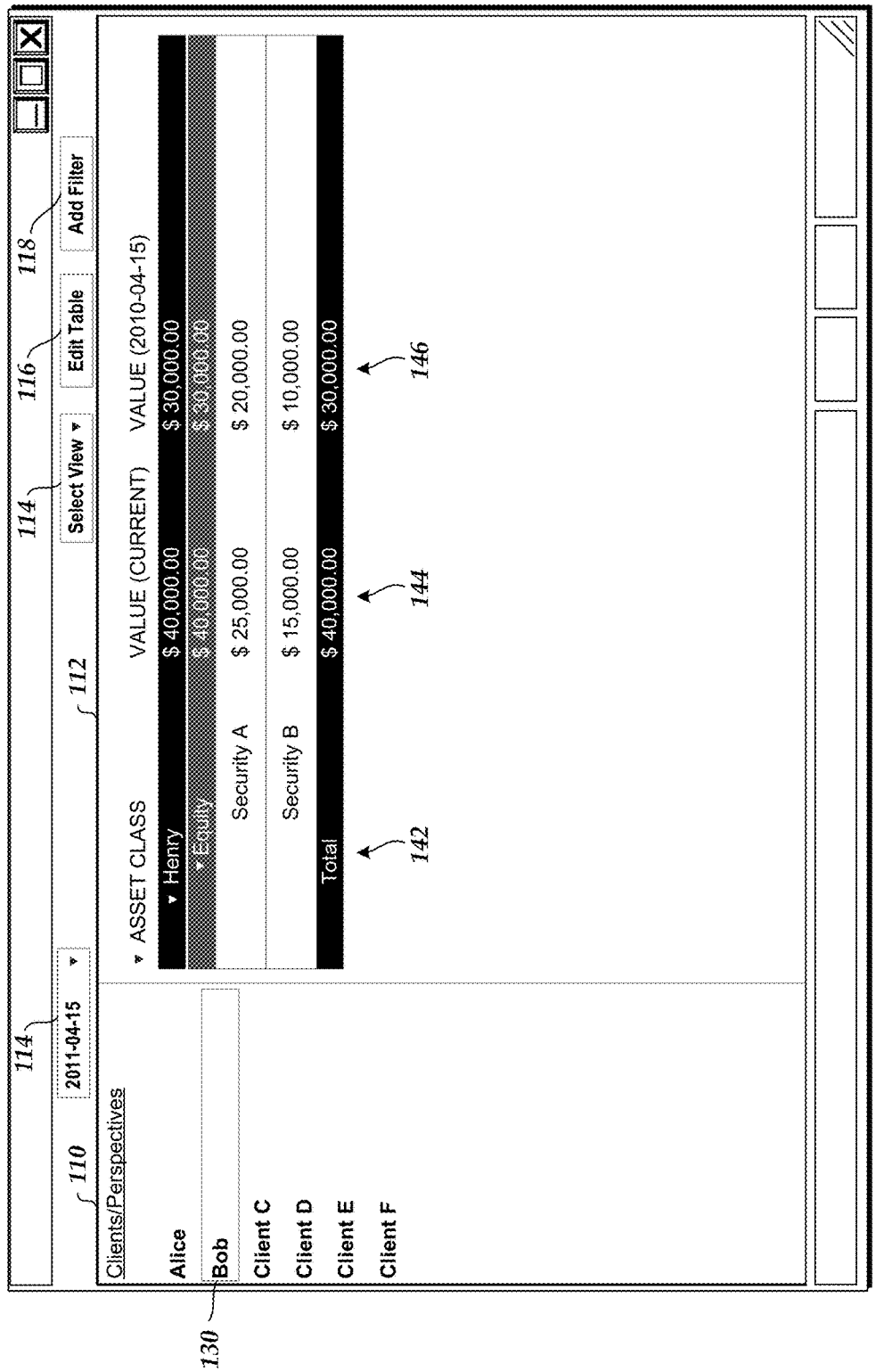

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

1.0 General Overview

As described above, embodiments of the present disclosure relate to a computer system designed to provide interactive user interfaces for enabling non-technical users to quickly and dynamically generate, edit, and update complex reports including tables and charts of data. The user interfaces are interactive such that a user may make selections, provide inputs, and/or manipulate outputs. In response to various user inputs, the system automatically accesses and traverses complex data structures (including, for example, a mathematical graph having nodes and edges, described below), calculates complex data based on the traversals, and displays the calculated complex data to the user. The displayed data may be rapidly manipulated and automatically updated based on a context selected by the user, and the system may automatically publish generate data in multiple contexts.

The system described herein may be designed to perform various data processing methods related to complex data structures, including creating and storing, in memory of the system (or another computer system), a mathematical graph (also referred to herein simply as a "graph") having nodes and edges. In some embodiments each of the nodes of the graph may represent any of (but not limited to) the following: financial assets, accounts in which one or more of the assets are held, individuals who own one or more of the assets, and/or legal entities who own one or more of the assets. Further, the various data processing methods, including traversals of the graph and calculation of complex data, may include, for example: receiving and storing one or more bucketing factors and one or more column factors, traversing the graph and creating a list of a plurality of paths of nodes and edges in the graph, applying the bucketing factors to the paths to result in associating each set among a plurality of sets of the nodes with a different value node among a plurality of value nodes, and/or applying the column factors to the paths and the value nodes to result in associating column result values with the value nodes. The system may also be designed to generate various user interface data useable for rendering interactive user interfaces, as described herein. For example, the system may generate user interface data for displaying of a table view by forming rows based on the value nodes and forming columns based on the column result values. Column result values may also be referred to herein as metrics.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The terms "database," "data structure," "data store," and/or "data source" may be used interchangeably and synonymously herein. As used herein, these terms are broad terms including their ordinary and customary meanings, and further include, but are not limited to, any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storagedata structures for storing and/or organizing data, including, but not limited to, relational databases (for example, Oracle database, mySQL MySQL database, and the like), non-relational databases (for example, a NoSQL database), spreadsheets, XML files, text files, and/or the like. Databases are typically stored in one or more data stores. Accordingly, each database referred to herein (e.g., in the description herein and/or the figures of the present application) is to be understood as being stored in one or more data stores. The term "data store", as used herein, is a broad term including its ordinary and customary meaning, and further includes, but is not limited to, any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

The terms "mathematical graph" and/or "graph" may be used interchangeably and synonymously herein. As used herein, these terms are broad terms including their ordinary and customary meanings, and further include, but are not limited to, representations of sets of objects or data items in which the data items are represented as nodes in the graph, and edges connect pairs of nodes so as to indicate relationships between the connected nodes. A graph may be stored in any suitable database and/or in any suitable format. In general, the terms "mathematical graph" and "graph," as used herein do not refer to a visual representation of the graph, but rather the graph as stored in a database, including the data items of the graph. However, in some implementations the graph may be represented visually.

FIGS. 1A-1B illustrate example user interfaces of the system in which data is presented to the user in a table format following a graph traversal as described herein. Referring to FIG. 1A, the example user interface includes two primary display portions 110 and 112. Within a right display portion 112 the user interface displays a table of financial data associated with a particular individual, a group, or a legal entity. Specifically, the table displays a listing of financial assets associated with the particular individual, group, or legal entity, organized in a hierarchical fashion, as well as various metrics associated with the listing. A left display portion 110 includes a listing of various clients and/or perspectives. As described in detail below, user interfaces of the system are, accordingly to some embodiments, generated with respect to a particular context. A context may include a perspective and/or a date. In some embodiments, the perspective identifies any of an individual, a group, and/or a legal entity, each of which may, in some embodiments, correspond to clients of a user of the system. Accordingly, the display portion 110 includes a listing of various selectable perspectives (or clients), with a particular client "Bob" 130 being selected (as indicated by a box outline).

The example user interface of FIG. 1A further includes a date selection box 114. As described, the context of the user interface may include a date which may be specified by the user via the date selection box 114 (by, for example, direct input of a desired date and/or selection of a date in a dropdown list or calendar widget). The user interface may further include a select view button 115, an edit table button 116, and/or an add filter button 118. In various embodiments, and as described in further detail below, the user may select the select view button 115 to specify particular types of tables, charts, or other information to be displayed in the display portion 112; the user may select the edit table button 116 to specify an arrangement of data to be displayed in the table (or other chart and/or other information displayed), types of data to be displayed in the table (or other chart and/or other information displayed), particular metrics to be displayed in the table (or other chart and/or other information displayed), and/or the like; and the user may select the add filter button 118 to apply information filters to the table (or other chart and/or other information displayed).

In various embodiments, any input from the user changing the perspective, changing the date, applying a filter, editing displayed information, and/or the like causes the system to automatically and dynamically re-traverse the graph and re-generate data to be displayed according to the user's inputs.

In the example user interface of FIG. 1A, the table displays various information associated with the selected context (including the perspective, Bob, and the date, 2011-04-15), and based on other inputs from the user including a specification of two metrics (including a current value in column 114 and a value as of 2010-04-15 in column 146) and a particular hierarchical organization of information (as shown in column 142). Specifically, the table shows financial assets associated with Bob as of 2011-04-15, organized according to first, a manager of the financial assets, and second, a type of the financial assets. Further, metrics associated with the assets (and various groups of the assets) are displayed including a current value (for example, as of the date of the current context 2011-04-15) and a value as of a specified date 2010-04-15. Column 142 shows each asset, including Security A and Security B, organized by a manager of the asset (in the example, both Security A and Security B are managed by Henry) and a type of the asset (in the example, both Security A and Security B are of the type Equity). Columns 144 and 146 show metric values as of the current date (for example, the date associated with the current context, 2011-04-15) and 2010-04-15, respectively. As shown, between 2010-04-15 and 2011-04-15, the value of Security A owned by (or otherwise associated with) Bob increased from $20,000 to $25,000, the value of Security B owned by (or otherwise associated with) Bob increased from $10,000 to $15,000, the value of all equities owned by (or otherwise associated with) Bob increased from $30,000 to $40,000, the value of all assets managed by Henry that are owned by (or otherwise associated with) Bob increased from $30,000 to $40,000, and the total value of all assets owned by (or otherwise associated with) Bob increased from $30,000 to $40,000.

According to some embodiments, the system may generate user interfaces the provide the user with insights into data having time varying attributes. For example, suppose that in the table of FIG. 1A, Security A is managed by Henry on the currently selected date, but was managed by a different manager at some earlier time. This fact is not represented in the table of FIG. 1A. Accordingly, the system provides, in some embodiments, that the user may specify that data is to be displayed taking into account any associated time varying attributes (also referred to herein as "historical values"). FIG. 1B shows, in the display portion 112, an updated table of Bob's assets in which time varying attributes are accounted for. In particular, in the table of FIG. 1B, it is assumed that Security A was managed by Henry from 2011-01-01 to 2011-12-31, and managed by Gary during all other times. Thus, the table of FIG. 1B includes rows corresponding to Security A as managed by Gary, and Security A as managed by Henry. Because Security A was not managed by Gary during the current date (2011-04-15), no value is displayed at location 152 of column 144. Likewise, because Security A was not managed by Henry during the date associated with the metric of column 146 (2010-04-15), no value is displayed at location 154. However, values of metrics are displayed in the respective columns when the dates are applicable to the respective managers. For example, Security A had a value of $20,000 on 2010-04-15, at which time it was managed by Gary, and a value of $25,000 on 2011-04-15, at which time it was managed by Henry. Note that Security B only appears under the Henry category as Security B was managed by Henry during both of the applicable dates (although it may have been managed by Gary or another manager during to other time period).

Additional examples of using the system with data having time varying attributes is provided in U.S. patent application Ser. No. 14/643,999, filed Mar. 10, 2015, and titled "SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES INCLUDING TIME VARYING ATTRIBUTES," the entire disclosure of which is hereby made part of this specification as if set forth fully herein and incorporated by reference for all purposes, for all that it contains.

Accordingly, in various embodiments the system may calculate data (via complex graph traversal described herein) and provide a unique and compact display of calculated data based on time varying attributes associated with the calculated data. In an embodiment, the data may be displayed in a table, such as the example table of FIG. 1B, in which data is organized based on the time varying attributes and dates associated with particular metrics specified by the user and/or determined by the system. In some embodiments, when no metric values are associated with a particular item of data, a portion of the table is left blank (as with the locations 152 and 154 of FIG. 1B) and/or omitted (for example, no row is shown for Security B under Gary in the table of FIG. 1B as Security B is not associated with Gary during any time period applicable to the table).

In various embodiments the system may calculate time intervals applicable to calculations of various metrics. For example, in the user interfaces of FIGS. 1A and 1B, the system calculates asset value metrics for which a single date or time is applicable. In other examples, the system may calculate metrics that span periods of time such as a rate of return of an asset over a number of years. Accordingly, the system may determine a set of time intervals associated with the metric, a set of time intervals associated with applicable time varying attributes of graph data, and determine in intersection of the two sets of time intervals. The calculated intersection of the sets of time intervals may then be inputted into the complex graph traversal process to calculate metric values for display in compact and efficient user interfaces of the system.

Advantageously, accordingly to various embodiments, the system may calculate and provide, for example, any set of metrics with respect to graph having time varying attributes. The user may therefore easily find insights that are not otherwise easily attainable. For example, the non-technical user may easily compare asset returns by manager, while the managers of the assets change over time.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

In an embodiment, a method comprises creating and storing, in memory of a computer, a graph having nodes and edges, wherein the nodes represent financial assets and any one or more of: accounts in which one or more of the assets are held, individuals who own one or more of the assets, or legal entities who own one or more of the assets; receiving, such as from a user of the computer, one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing display of a table view by forming rows based on the value nodes and forming columns based on the column result values.

In an embodiment, the method further comprises, for the bucketing factors, selecting a particular bucketing factor; applying the particular bucketing factor to the paths and receiving a bucketing result value; creating a value node for the result value; associating, with the value node, all child nodes of the paths having bucketing result values that match the value node.

In an embodiment, the method further comprises, for the column factors, for the value nodes, and for paths associated with a particular value node, applying a particular column factor to a particular path and receiving a column result value; associating the column result value with the particular value node. In one feature, the edges represent any one or more of: ownership; containment; or data flow. In another feature at least two of the edges comprise a circular reference from a particular node to that particular node; further comprising determining, during the traversing, whether two sequences of two or more traversed nodes are identical, and if so, backtracking the traversal and moving to a next adjacency. In yet another feature one or more of the bucketing factors or column factors comprises an executable code segment configured to perform one or more mathematical calculations using one or more attributes of nodes in a path.

In still another feature one or more of the bucketing factors or column factors comprises an executable code segment configured to invoke a function of a network resource using one or more attributes of nodes in a path.

In an embodiment, the method further comprises generating and causing display of a graphical user interface comprising the table view and one or more info-graphics, wherein each of the info-graphics is programmatically coupled to the table view using one or more data relationships, and further comprising receiving user input selecting one or more rows of the table view and, in response, automatically updating the info-graphics to display only graphical representations of the one or more rows of the table view that are in the user input.

In an embodiment, the method further comprises generating and causing display of a graphical user interface comprising the table view; causing displaying a bucketing factor menu identifying one or more available bucketing factors; receiving a selection of a particular bucketing factor; re-traversing the graph and applying the particular bucketing factor to the paths to result in associating second sets of the nodes with second value nodes among the plurality of value nodes; re-creating and causing re-displaying an updated table view based on the second value nodes and the column result values.

In an embodiment, the method further comprises generating and causing display of a graphical user interface comprising the table view; causing displaying a column factor menu identifying one or more available column factors; receiving a selection of a particular column factor; re-traversing the graph and applying the particular column factor to the paths and the value nodes to result in associating second column result values with the value nodes; re-creating and causing re-displaying an updated table view based on the value nodes and the second column result values.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a particular one of the graphical elements; creating and storing a filter that is configured to pass only data in the table view that corresponds to the particular one of the graphical elements; applying the filter to the table view and causing re-displaying the table view using only data in the table view that corresponds to the particular one of the graphical elements.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a one or more particular rows in the table view; updating the info-graphics by causing displaying graphical elements corresponding only to the particular rows in the table view.

In an embodiment, the method further comprises generating and causing display of a graphical user interface comprising the table view and one or more info-graphics; receiving a selection of one row associated with an asset; updating the graphical user interface to display a summary of attributes of the asset, based on stored asset data or based on retrieving, at the time of the selection, the attributes of the asset from one or more global data sources.

In an embodiment, the method further comprises displaying, with the summary of attributes of the asset, a transaction reference identifying a number of transactions previously completed by a particular perspective.

In an embodiment, the method further comprises receiving and storing a context comprising a perspective and/or a date, wherein the perspective identifies any of an individual, a group, and a legal entity; beginning the traversing at a first node associated with the perspective; receiving user input specifying a different perspective; repeating the traversing beginning at a second node associated with the different perspective and repeating the creating and causing displaying the table view, based on updated value nodes and updated column result values yielded from the different perspective.

In an embodiment, the method further comprises receiving an updated context comprising a changed date value; repeating the traversing, creating and causing displaying the table view based on updated value nodes and updated column result values yielded from re-applying the column factors using the changed date value.

2.0 Structural and Functional Overview

The computer system provides wealth management capabilities that enable non-technical users to create new views, reports, and other manipulations of a dataset without the need for custom programming. Custom views can be created in any user session by selecting particular columns, factors or metrics, ordering, filters providing groupings, graphics and other aspects of a desired view. The resulting views can be saved and reused in later sessions. However, a view that is needed only on a one-time basis also may be constructed rapidly using atomic components without specialized programming knowledge. Further, views may be shared with others such as team members, clients, or other applications. Sharing may include exporting to an application such as a spreadsheet, transferring to a report generator, or other mechanisms as further described herein.

Figure 2A:
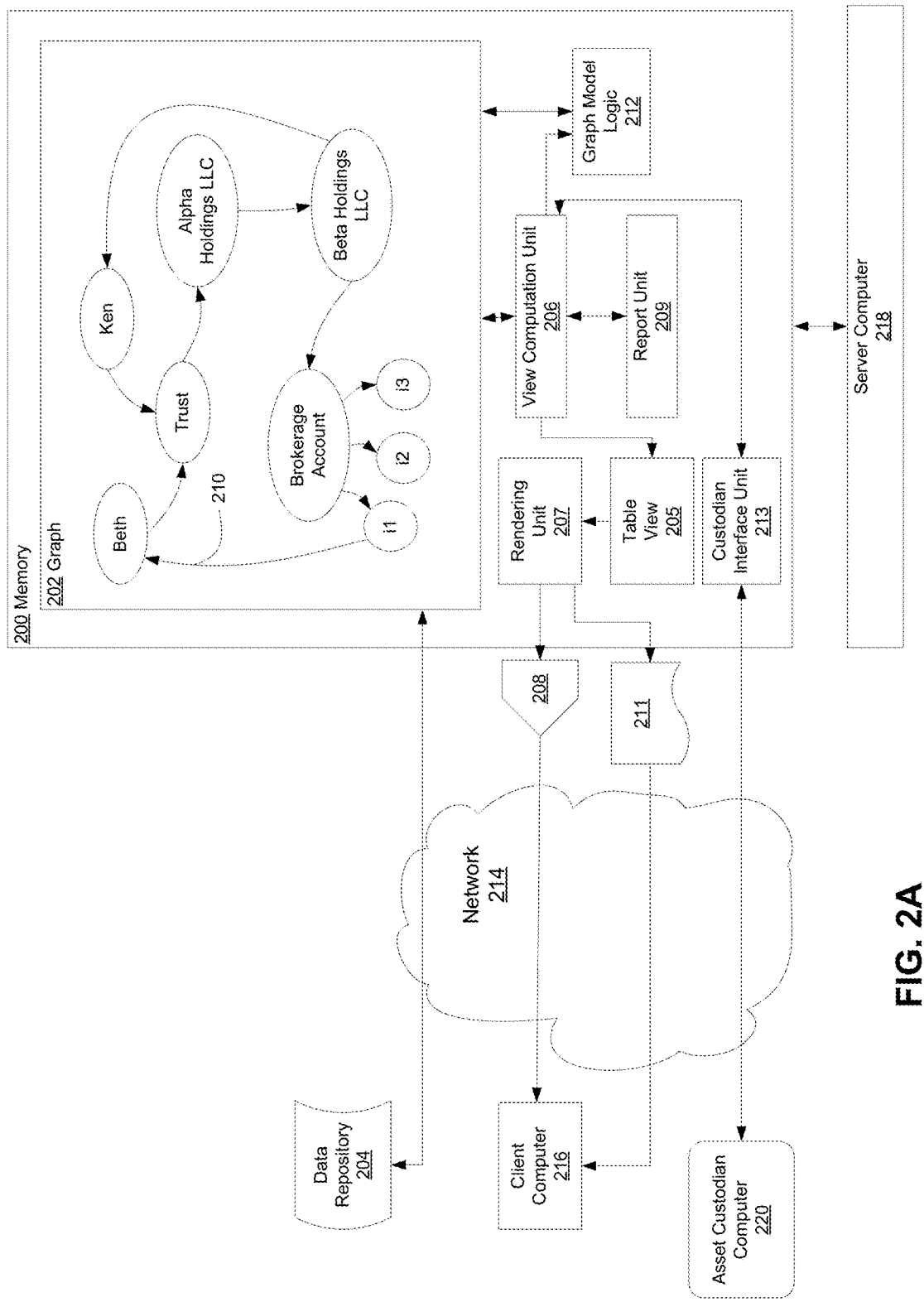
FIG. 2A illustrates a computer system that may be used to implement an embodiment.

FIG. 2A illustrates a computer system that may be used to implement an embodiment. The computer memory 200 stores a graph 202 that represents a set of investment holdings. In an embodiment, client or customer investment data is received from one or more sources, such as brokerages, and transformed into position data prior to storage into a data repository for use by the system. Positions, in an embodiment, are considered the most fine-grained or atomic element of data manipulated in the system rather than, for example, an account.

Memory 200 forms part of a computer system having a processor, mass storage, input-output devices, and other elements that are omitted in FIG. 2A for purposes of clarity. A view computation unit 206 can access the graph 202 for purposes of traversing the graph in response to different configuration data and generating output one or more table views 205 in the manner described further herein. View computation unit 206 may be coupled to a rendering unit 207 for rendering and communicating table views 205 to any of a computer display unit 208 or an electronic document 211 of any form such as a report, spreadsheet file, etc. In an embodiment, report unit 209 is configured to receive view data from view computation unit 206, facilitate transfer of view data to pages of reports, and receive user input specifying metadata for report formatting controls, as further described herein.

View computation unit 206 and graph 202 are implemented using object-oriented programming techniques in which nodes of the graph are represented using programmatic objects. For example, JAVA® may be used.

The foregoing elements of FIG. 2A may form part of a server computer 218 that is coupled directly or indirectly through one or more computer networks, represented by network 214, to a client computer 216. Network 214 may comprise one or more LAN, WAN, or internetwork links and may comprise the public internet through the use of appropriate protocols for ensuring data security, user authentication and user authorization. Client computer 216 may comprise an individual client computing device such as personal computer, workstation, laptop, netbook, tablet computer, or smartphone that is coupled through a computer network to the other elements of FIG. 2A. Client computer 216 hosts an internet browser program which, may be configured with virtual machine program execution capability. For example, client computer 216 may host a JAVA virtual machine and may receive and execute one or more JAVA files that cause the browser to display a graphical user interface that receives data (for example, user interface data) from and facilitates interaction with the server computer 218 and view computation unit 206.

View computation unit 206 also may be coupled to a custodian interface unit 213 that is coupled directly or indirectly through network 214 to an asset custodian computer 220. Asset custodian computer 220 serves as an authoritative source of data about accounts and asset positions associated with individuals or other entities represented in data repository 204 and graph 202. Custodian interface unit 213 is configured to obtain account and position snapshot data periodically or through live data feeds from asset custodian computer 220. Inbound data may be transformed from account-level data into position-level data and stored in data repository 204 or represented in graph 202 in memory for further reference and manipulation.

Embodiments may also interface in a similar manner to global data sources such as market data feeds that are independent of particular accounts or positions but report current or historic market value of assets or instruments. Examples of sources of global data include Thomson Reuters, New York Stock Exchange, NASDAQ, etc. In such an embodiment, global data sources may or may not override asset values that are stored in the graph, based on configuration data. For example, a particular node of graph 202 representing an asset may store an asset value attribute that was obtained from positions data derived from account data obtained from an asset custodian. However, if the asset is, for example, a market traded security, then a current intraday value for the asset may be available from the global data source. Configuration data may indicate whether global data source values for assets should override position data obtained from a custodian or other sources.

A set of investment holdings may be associated with an individual, a legal entity, or a group of individuals and/or legal entities such as one or more clients of an RIA firm. Graph 202 may be formed in memory 200 based on data records obtained from data repository 204. Graph 202 may comprise any number of nodes and edges, and the particular graph shown in FIG. 2A is provided solely to illustrate one example and not as a requirement or limitation.

Graph 202 may comprise nodes and edges having any level of complexity, and there is no requirement that nodes are organized in a hierarchical arrangement; circular references may be represented. As an example, graph 202 comprises nodes for individuals named Beth and Ken who have an ownership or trusteeship relationship to a Trust. The Trust is related to a company, Alpha Holdings LLC, which is also related to a second company, Beta Holdings LLC that may own a Brokerage Account having instruments i1, i2, i3. Instruments i1, i2, i3 may represent stocks, bonds, options, or any other financial instrument that may be traded or receive an investment; for purposes of illustrating an example, three (3) instruments are shown in FIG. 2A but practical embodiments may use any number of instruments. Beta Holdings LLC further has a relationship to Ken and instrument i1 has a relationship to Beth; these relationships circle back within the graph and provide examples of non-hierarchical node-edge relationships. For example, one circular reference is the path Ken→Trust→Alpha Holdings LLC→Beta Holdings LLC→Ken.

The edges of the graph 202 may represent any type of relationship among the nodes connected by the edge. For example, the edges may represent asset ownership relationships, liability relationships, equity ownership relationships, data flow relationships, and/or the like. Thus, for example, one node may represent a security, another node may represent a brokerage account, and an edge connecting the two node may represent that the first node owns a particular number of shares of the second node.

As a further example, edge 210 may represent a flow of instrument data from a third party data source such as a brokerage data feed. For example, edge 210 could represent a brokerage data feed for instrument i1 indicating that Beth owns 200 units, such as shares, having a value of 25 per unit. Edge 210 may also represent an ownership relationship separate from value attributes. Edge 210 or other edges may represent other concepts such as issuance of an asset; thus, one node may represent an issuer of an asset, another node may represent the asset, and an edge connecting the two nodes may represent that the first node issued the second node.

Graph nodes may receive data for attributes of the nodes from a custodian, from a global data source, or from other data in the data repository. For example, processing a particular client's custodial account may enable populating the graph 202 with some, but not all, values of attributes that are defined in the graph model. In an embodiment, view computation unit 206 is configured to investigate alternative data sources to supply missing node attribute values when all attribute values are not available from a custodian. For example, a particular global data source may have a sector attribute value that the custodian does not have, and if so, the substitute value indicating sector may be added to a node attribute. As another example, if data previously received from a custodian is determined to be stale, then updated data could be requested from one of the global data sources.

Further, overriding prior values is made straightforward through the representation of ownership relationships in graph edges, whereas nodes represent assets per se, possibly with value attributes. Consequently, modifying a value attribute of an asset node, based on received market-based values, enables the received values to affect all calculations that reference the asset node. Other asset node attributes may propagate in a similar manner. For example, if a particular RIA user modifies an asset node representing ALPHA COMPANY to add an earnings report document as an attribute, all clients of that particular user who own positions in ALPHA COMPANY obtain access to the earnings report through principles of object inheritance.

Figure 4:
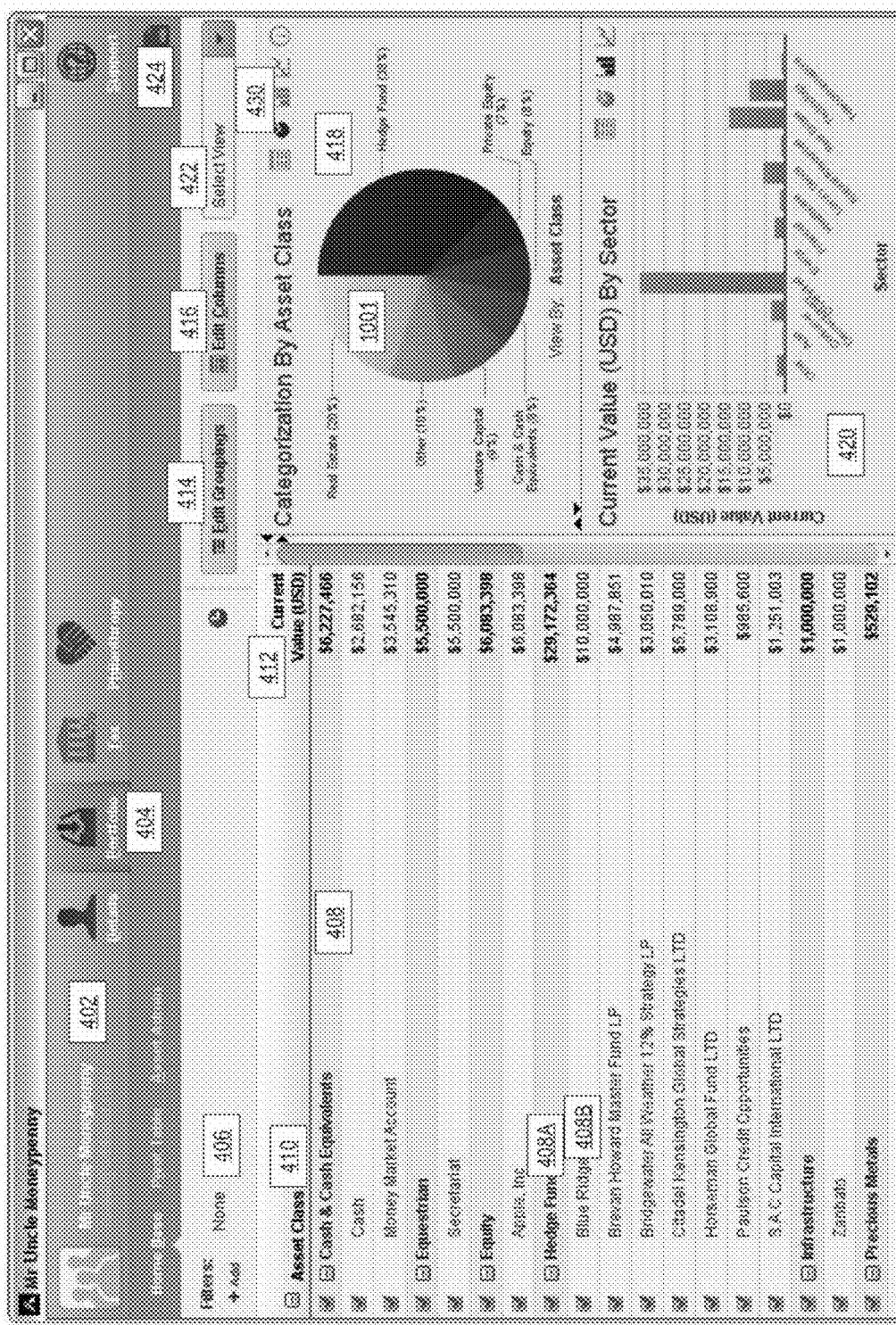
FIG. 4 illustrates an example of a graphical user interface for a computer display unit.

View computation unit 206 is configured to transform graph 202 into one or more table views, graphs, charts, and other output. Tables, charts, graphs, and other components that may be inserted into user interfaces and/or reports of the present disclosure may be referred to herein as elements, report elements, or in some instances widgets. For purposes of illustrating the example embodiments which follow, FIG. 4 illustrates an example of a graphical user interface for a computer display unit. In an embodiment, the elements of FIG. 2A and the output of FIG. 4 are implemented using the ADDEPAR computer software system commercially available from Addepar, Inc., Mountain View, Calif.

FIG. 4 illustrates a view of holdings from the perspective of an individual named Uncle Moneypenny as indicated by Perspective label 402. A Portfolio tab 404 indicates that the user is viewing a portfolio of holdings of Moneypenny. A Filters region 406 indicates that no data display filters are presently applied to change a view of the data in the GUI. Selecting an Add link in the Filters region causes view computation unit 206 to display a GUI widget that may receive definitions of filters, as further described herein.

FIG. 4 comprises a table view 408 which, for purposes of illustrating an example, comprises rows organized by asset class as indicated by an Asset Class bucketing label 410 and columns showing asset class name and current value as indicated by column label 412. Assets within Asset Class 410 are organized in a hierarchy or tree in which boldface labels 408A indicate an asset class bucket and non-bold labels 408B indicate individual assets within the associated asset class bucket.

Selecting an Edit Groupings widget 414 causes view computation unit 206 to display a GUI dialog that may receive reconfiguration of data values that determine the identity and order of buckets and therefore the particular manner of displays of rows of the table view 408.

Figure 6:
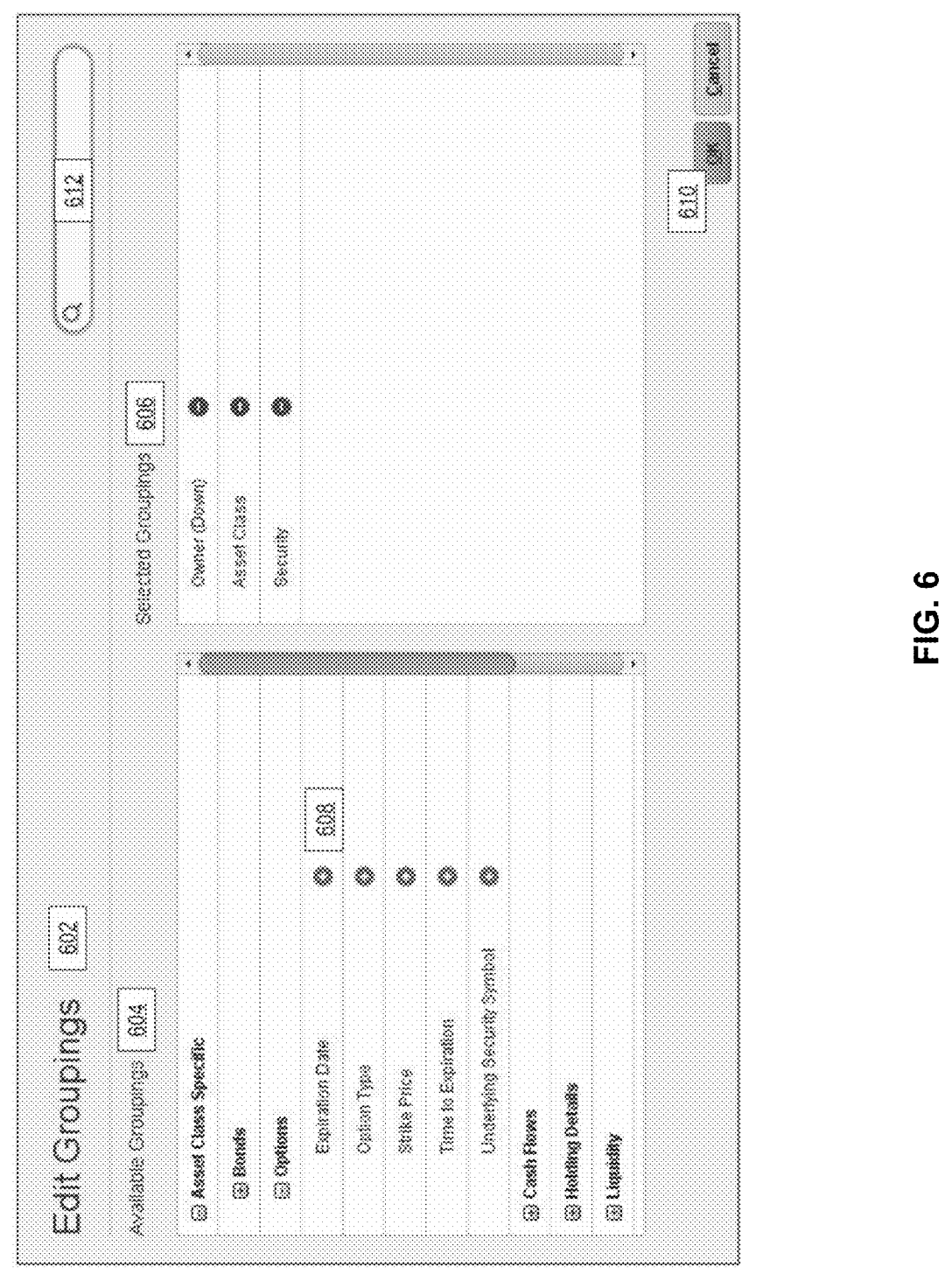

FIG. 6 illustrates an example Edit Groupings dialog 602 that displays a list of currently selected groupings 606 and a tree representation of available groupings 604. A comparison of selected groupings 606 to FIG. 4 will show that the selected groupings of FIG. 6 are represented in FIG. 4. User selection of a remove (−) icon in the selected groupings 606 causes the view computation unit 206 to remove the selected grouping from selected groupings 606; subsequent selection of OK widget 610 in dialog 602 causes view computation unit 206 to close the dialog and re-display the table view 408 without the removed grouping. User selection of open (+) and close (−) icons in the tree display of available groupings 604 causes categories of groupings to open until leaf nodes of the tree are shown. For example, in FIG. 6 the user has selected open icons for Asset Class Specific and Options, yielding a list of available option groupings 608.

Figure 8:
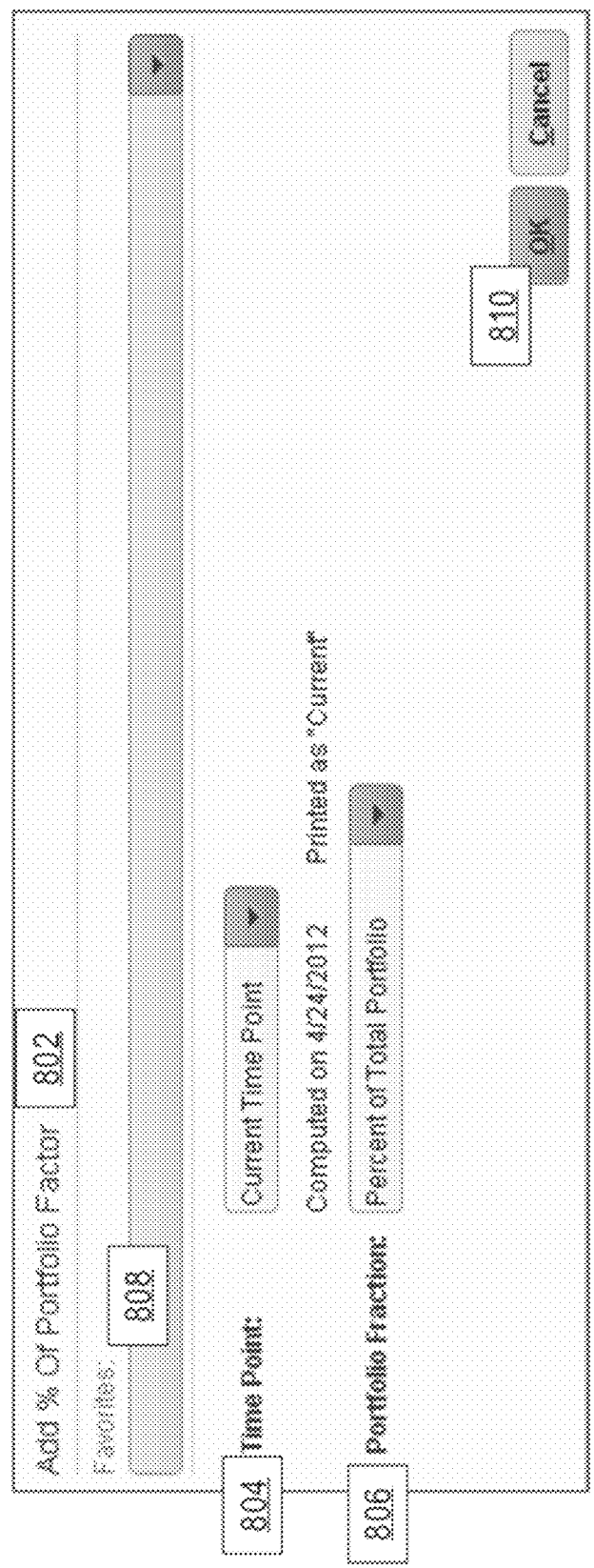
FIG. 8 illustrates an example configuration dialog for a Factor.

Selecting an add (+) icon associated with any of the available option groupings 608 causes view computation unit 206 to add the selected option grouping to selected groupings 606; subsequent selection of OK in dialog 602 causes view computation unit 206 to close the dialog and re-display the table view 408 with the added grouping. For some groupings, selecting the add (+) icon causes view computation unit 206 to display a Factor details dialog that prompts the user to enter or confirm one or more configuration values associated with a Factor that drives the grouping. FIG. 8 illustrates an example configuration dialog for a Factor. For example, assume that a user selects, from Available Groupings, Holding Details and then % of Portfolio. In response, view computation unit 206 causes displaying dialog 802, which comprises a Time Point widget 804 and Portfolio Fraction widget 806 that prompt the user to select one of several available values using drop-down menus. Alternatively, the user may select Favorites drop-down menu 808, which associates labeled menu items with stored values for Time Point and Portfolio Fraction. Selecting the OK widget 810 causes view computation unit 206 to close the dialog and store the specified values for Time Point and Portfolio Fraction in association with the % of Portfolio Factor, for use in subsequent computations. Thus, the system provides extensive opportunities for flexible customization by specifying the desired basis for computation, without requiring custom programming of algorithms or methods for particular factor computations.

Referring again to FIG. 6, a search box 612 may receive user input of keywords associated with groupings and causes view computation unit 206 to update available option groupings 608 with values that match the keywords.

Referring again to FIG. 4, selecting an Edit Columns widget 416 causes view computation unit 206 to display a GUI widget that may receive reconfiguration of data values that determine the identity and order of columns of the table view 408. FIG. 7 illustrates an example Edit Columns dialog 702 that displays a list of currently selected columns 706 and a tree representation of available columns 704. A comparison of selected columns 706 to FIG. 4 will show that the selected columns of FIG. 7 are represented in FIG. 4. User selection of a remove (−) icon in the selected columns 706 causes the view computation unit 206 to remove the selected column from selected columns 706; subsequent selection of OK widget 710 in dialog 702 causes view computation unit 206 to close the dialog and re-display the table view 408 without the removed column. User selection of open (+) and close (−) icons in the tree display of available columns 704 causes categories of columns to open until leaf nodes of the tree are shown. For example, in FIG. 7 the user has selected open icons for Holding Details, yielding a list of available option columns 708.

Selecting an add (+) icon associated with any of the available option columns 708 causes view computation unit 206 to add the selected option column to selected columns 706; subsequent selection of OK in dialog 702 causes view computation unit 206 to close the dialog and re-display the table view 408 with the added grouping. In some cases, selecting the add icon may cause the view computation unit 206 to display a dialog of the kind shown in FIG. 8 for groupings, with configuration parameter values applicable to the particular selected column. A search box 712 may receive user input of keywords associated with columns and causes view computation unit 206 to update available option columns 708 with values that match the keywords.

The GUI of FIG. 4 further comprises a Select View dropdown menu 422 that may be used to select and apply different views that have been previously created and saved by others. For example, in FIG. 4 the GUI comprises a table view 408 and one or more info-graphics such as categorization pie chart 418, and bar chart 420. As an example, table view 408 reflects an ownership breakdown by asset class and value; other view selections may cause view computation unit 206 to display different combinations of buckets and columns, tables, charts and graphs. In FIG. 4 and other drawing figures herein, the info-graphics comprise a pie chart and a bar chart, solely to illustrate examples; however, in an embodiment, the GUI of FIG. 4 comprises two or more info-graphic option icons 430 indicating the availability of a table view, pie chart, bar chart, or line graph. Other embodiments may support info-graphics of other types. View computation unit 206 is configured to receive user input selecting one of the info-graphic option icons 430 and, in response, to change the info-graphic panel adjacent to the selected option icon to a different form of info-graphic. For example when pie chart 418 is displayed, selecting a line graph icon from among option icons 430 causes view computation unit to display a line graph in place of the pie chart and using the same underlying data as a basis for the line graph.

Figure 13:
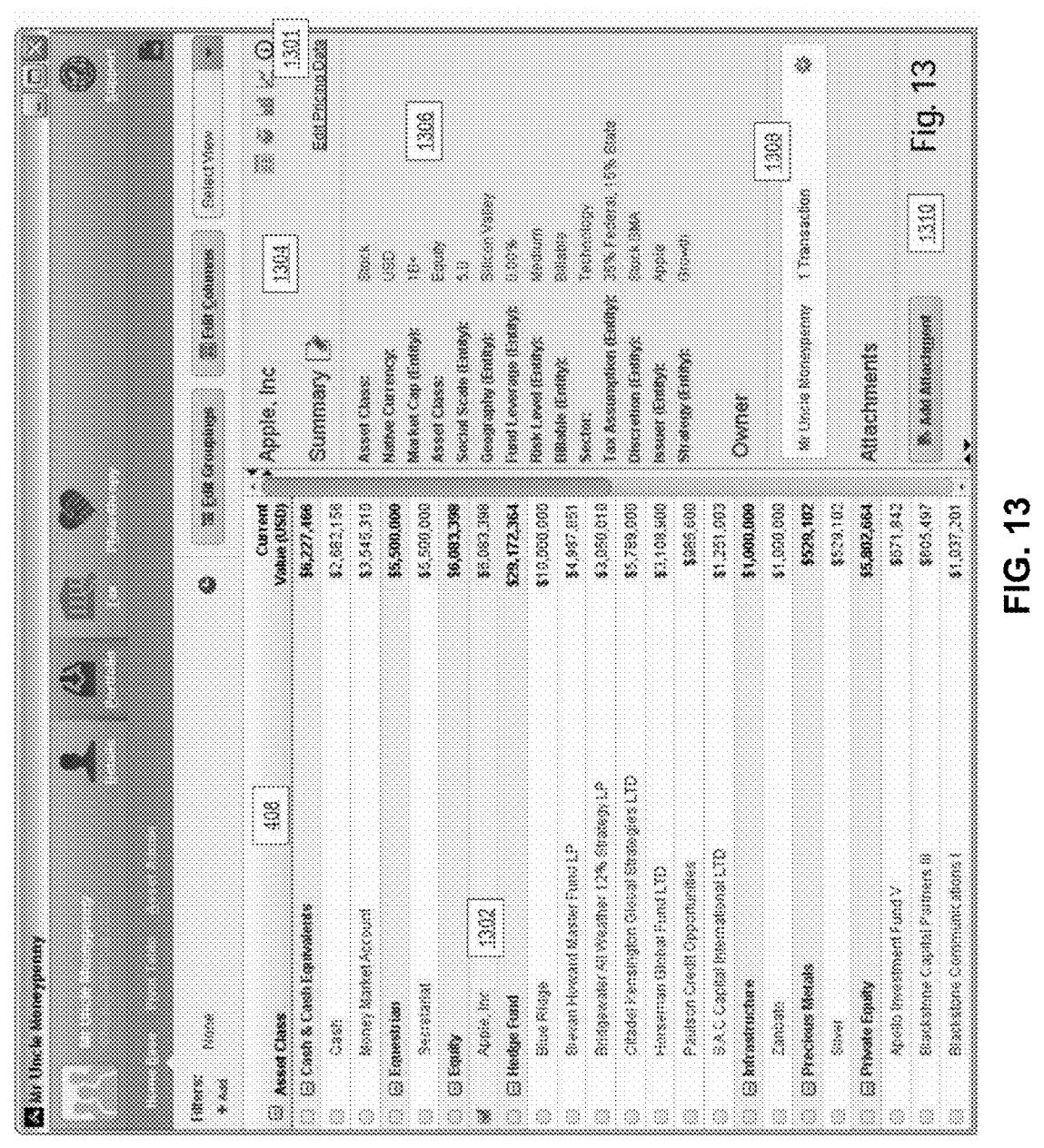

In an embodiment, icons 430 include an asset details icon that may trigger display of detailed information about a particular asset that has been selected in the table view 408. FIG. 13 illustrates the display of FIG. 4 showing asset details. In the example of FIG. 13, in table view 408 one asset 1302 is selected as indicated by a checkbox in the row of the selected asset, and asset details icon 1301 has been selected. View computation unit 206 is configured, in response to a selection of the asset details icon 1301, to cause displaying in the info-graphics area of the display, an asset details panel 1304 comprising a summary sub-panel 1306, owner sub-panel 1308, and attachments sub-panel 1310. In an embodiment, summary sub-panel 1306 lists attributes pertaining to the selected asset, which view computation unit 206 may obtain by retrieving from data repository 204. Owner sub-panel 1308 specifies one or more owners of the selected asset; the owners are those individuals, clients or legal entities that are associated with the current logged in user of the system. For example, when the user is an RIA, the Owner sub-panel 1308 may identify all clients of that user who have a position in the selected asset. Owner sub-panel 1308 further comprises a selectable hyperlink label indicating the number of transactions that each owner has completed for the selected asset; in the example of FIG. 13, "1 Transaction" is indicated. View computation unit 206 is configured, in response to selection of the hyperlink label, to retrieve information describing the transactions of that owner and display transaction detail in a pop-up menu. Consequently, a user is able to rapidly obtain transaction data for assets of clients or legal whose holdings are represented in the system, from within a display that has extensive viewing capabilities.

Figure 5:
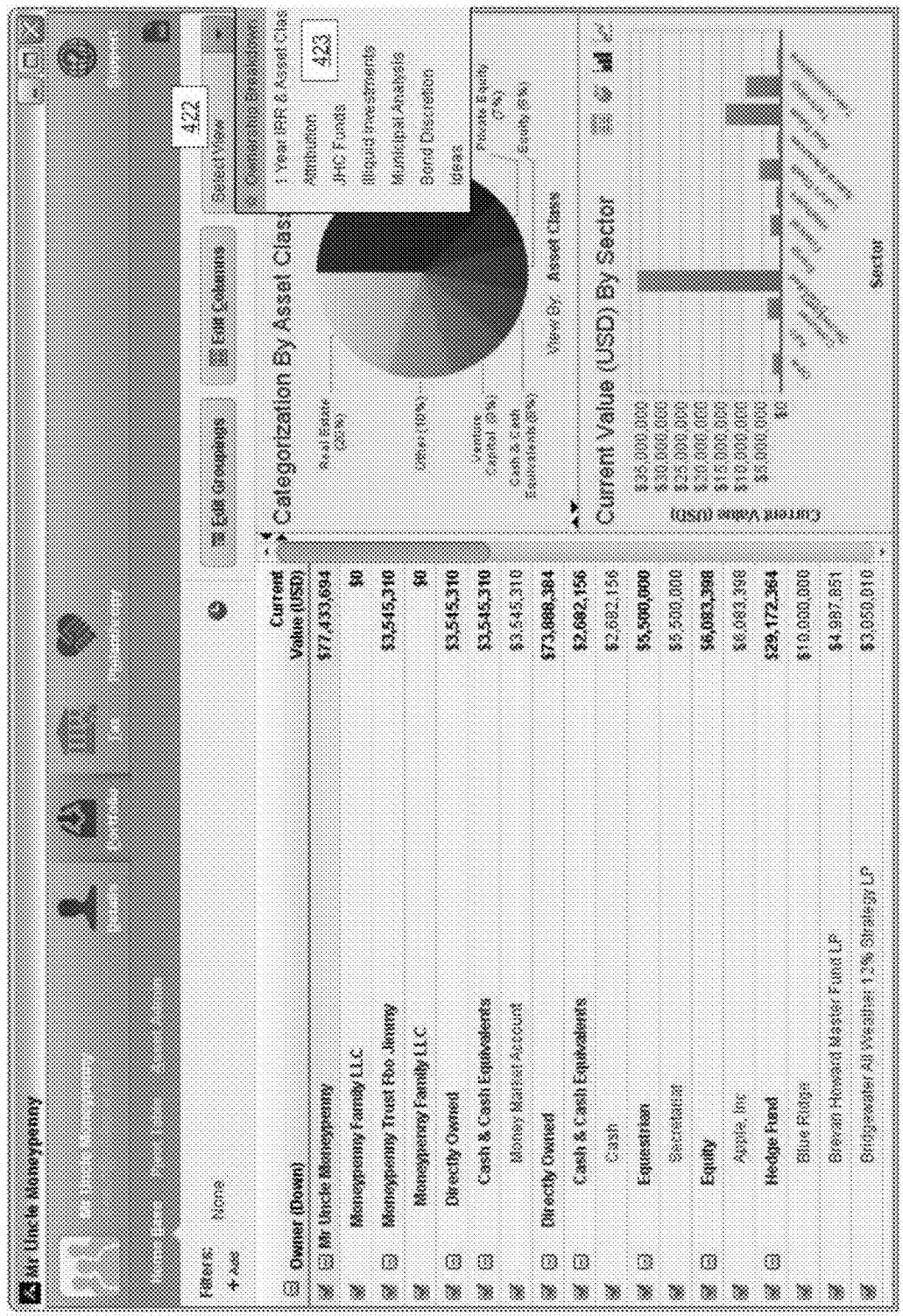
FIG. 5 illustrates the display of FIG. 4 in which dropdown menu has been selected and shows a plurality of named previously created views in a list.

FIG. 5 illustrates the display of FIG. 4 in which dropdown menu 422 has been selected and shows a plurality of named previously created views in a list 423. Selecting any particular view from list 423 causes view computation unit 206 to replace table view 408 with a new view based on the bucket Factors and column Factors that were defined for the selected view, and to update pie chart 418 and bar chart 420 based on the data in the new view. Replacement of the view involves re-computing the view based on the bucket Factors, column Factors and current Perspective of Moneypenny, in the manner described further herein. In some embodiments, pie chart 418 and bar chart 420 are replaced with different graphical views of data or removed completely.

In an embodiment, each of the info-graphics such as pie chart 418 and bar chart 420, by default, display charts and graphs based on the data that is then currently shown in table view 408. However, in an embodiment, view computation unit 206 is configured to respond to a selection of any of the info-graphics by updating the table view 408.

In an embodiment, the GUI of FIG. 4 further comprises an Export widget 424 which, when selected, begins operation of a report and data export function, as further described herein.

Embodiments operate in part based upon stored data representing a Context of a particular view of the graph 202. In an embodiment, a Context comprises a Perspective and/or a Date (or date range, also referred to herein as a time period). A Perspective indicates an individual, legal entity, or group and a Date indicates a time point at present or in the past. For example, a view of graph 202 from the Perspective of Ken may be different than a view generated from the Perspective of Beth. In an embodiment, a Perspective may comprise two or more individuals, such as a husband and wife, groups, or multiple legal entities. A change in Perspective results in a change in calculations of values of assets, in many cases. For example, the value of an asset from a particular Perspective typically depends upon the percentage of ownership of a particular person or legal entity. As an example based upon graph 202, the percentage of ownership in Beta Holdings LLC may be quite different for Beth and for Alpha Holdings LLC because of the presence or lack of intervening individuals or legal entities with different ownership arrangements, shares or percentages.

Graph 202 may be represented in a backing store such as a relational database system, represented in FIG. 2A by data repository 204. In an embodiment, each node in graph 202 is a row in a table in the database. An Edges table identifies edges in graph 202 in terms of identifiers of nodes from which an edge begins and to which an edge connects (FromID, ToID). In an embodiment, during operation all rows from the database are loaded into main memory and organized in a graph representation in memory for use during a user session. In an embodiment, view computation unit 206 interacts with graph model logic 212 to implement a graph model and perform graph manipulation operations; in various embodiments, the graph model logic may comprise custom code or may be based on an open-source project such as Tinkerbell.

Embodiments also apply one or more Factors as part of generating views. In an embodiment, a Factor may be any recognized financial metric. A Factor, for example, may be internal rate of return (IRR). A Factor is a computational unit that receives, as input, a path from a graph such as graph 202 and a Context.

For a table view, each Factor may be used as either a bucketing Factor or a column Factor. An example of a bucketing Factor is asset class, and an example of a column Factor is value. Based on such a configuration, an output table view would comprise rows identifying asset classes and a value for each asset class. The configuration of asset class as a bucketing Factor and value as a column Factor causes the view computation unit 206 to compute values by traversing graph 202 and consolidating values in terms of asset classes. In an embodiment, configuring a column Factor may be accomplished by selecting a user interface widget and selecting a Factor from a drop-down list. Selecting an additional column Factor causes view computation unit 206 to re-compute the table view by again traversing graph 202. For example, if IRR is configured as a column Factor, and rows in the table view represent Instruments, then the table view will comprise a column that shows an IRR value for each Instrument.

Further, selecting a second bucketing Factor causes the view computation unit 206 to re-compute the table view by consolidating values in terms of the second bucketing Factor; the resulting table view is displayed hierarchically so that multiple bucketing Factors are nested. For example, these techniques allow generating a table view that displays assets by asset class, then by owner, etc. In an embodiment, a user may re-order the bucketing Factors within a graphical list of all selected bucketing Factors, and the re-ordering causes the view computation unit 206 to re-compute and re-display the table view using a different hierarchy of bucketing Factors based on the re-ordered list of bucketing Factors.

3.0 Generating Table Views from Graphs

Figure 2B:
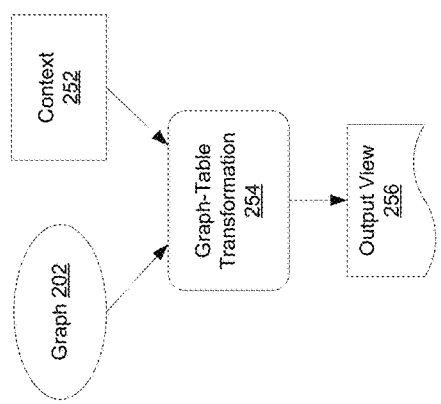
FIG. 2B illustrates a high-level view of a graph transformation.

To display a view of the data in graph 202 in a form that is familiar to the typical user, the graph is transformed into a table view consisting of rows and columns for display in a graphical display of a computer display unit. FIG. 2B illustrates a high-level view of a transformation. In general, a graph 202 and a Context 252 are received as input to a graph-table transformation 254, which generates an output view 256. The output view 256 may comprise a table, chart, or other output that is visually perceivable at a graphical display unit.

Figure 3A:
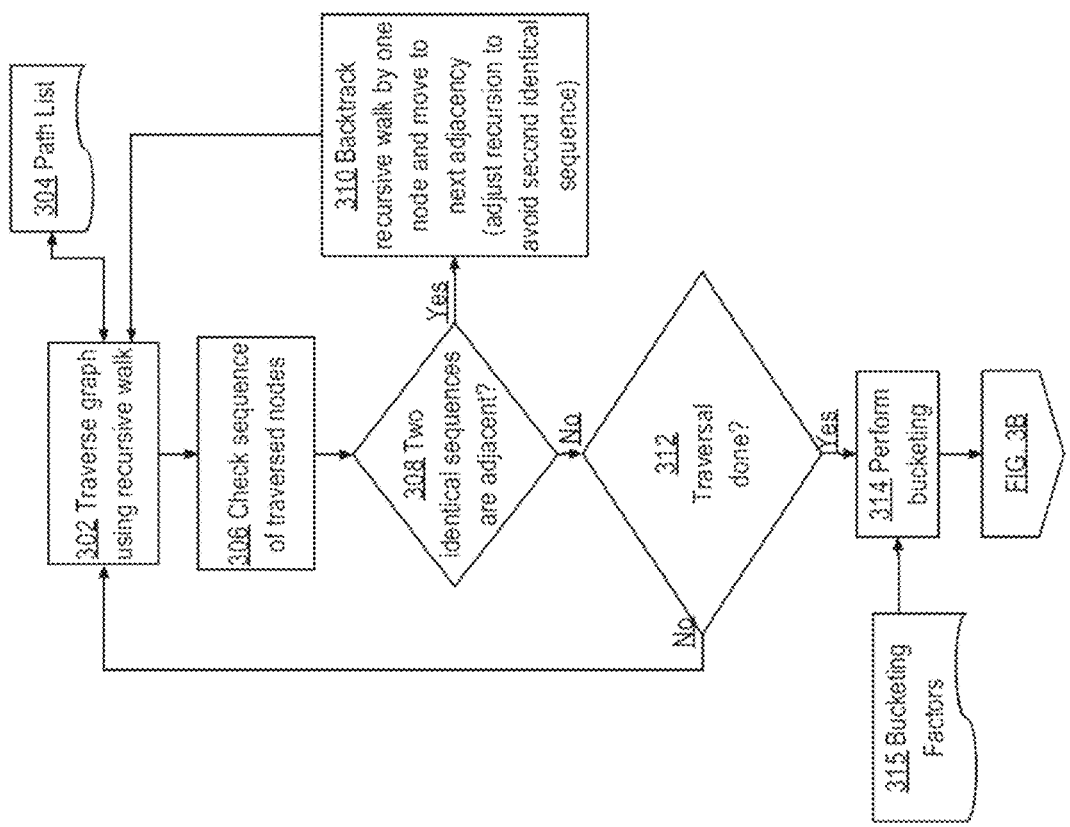
FIG. 3A illustrates a process of generating a table view based on a graph representing a set of financial asset holdings.

FIG. 3A illustrates a process of generating a table view based on a graph representing a set of financial asset holdings. In an embodiment, a view of data in a particular Context is created by computer-implemented processes that walk graph 202, creating and storing a plurality of paths within the graph. In block 302, the graph is traversed and a plurality of paths through the graph are stored in a path list 304. Traversal may use recursive transition techniques and either depth-first or width-first traversal is workable. In an embodiment, the graph is traversed starting at a source node as specified by the Perspective of the Context. For example, assume that the Perspective is Ken; graph traversal begins at the Ken node and the path list 304 would contain:

[Ken]
[Ken, Trust]
[Ken, Trust, Alpha Holdings LLC]
[Ken, Trust, Alpha Holdings LLC, Beta Holdings LLC]
[Ken, Trust, Alpha Holdings LLC, Beta Holdings LLC, Brokerage Account] and so forth.

Changing the Context causes the view computation unit 206 to re-compute a set of paths from the changed Perspective or Date represented in the changed Context. For example, if a user during a single session changes from Ken to Beth, any and all displayed table views would re-compute and would be redisplayed, illustrating holdings from the Perspective of Beth. The Perspective also could be for Trust, causing the view computation unit 206 to re-display a table view illustrating values from the point of view of the Trust without regard to what percentages are owned by particular human individuals.

Because the same processes described herein are re-performed based on a different root node as indicated by the Perspective, the processes herein offer the benefit of rapid generation of completely different asset value and holdings displays even when the newly selected Perspective is unrelated to a prior Perspective. Further, users have complete flexibility in how to display asset holdings and custom programming is not required to obtain displays that reflect different roll-ups or different user ownership regimes.

Figure 9A:
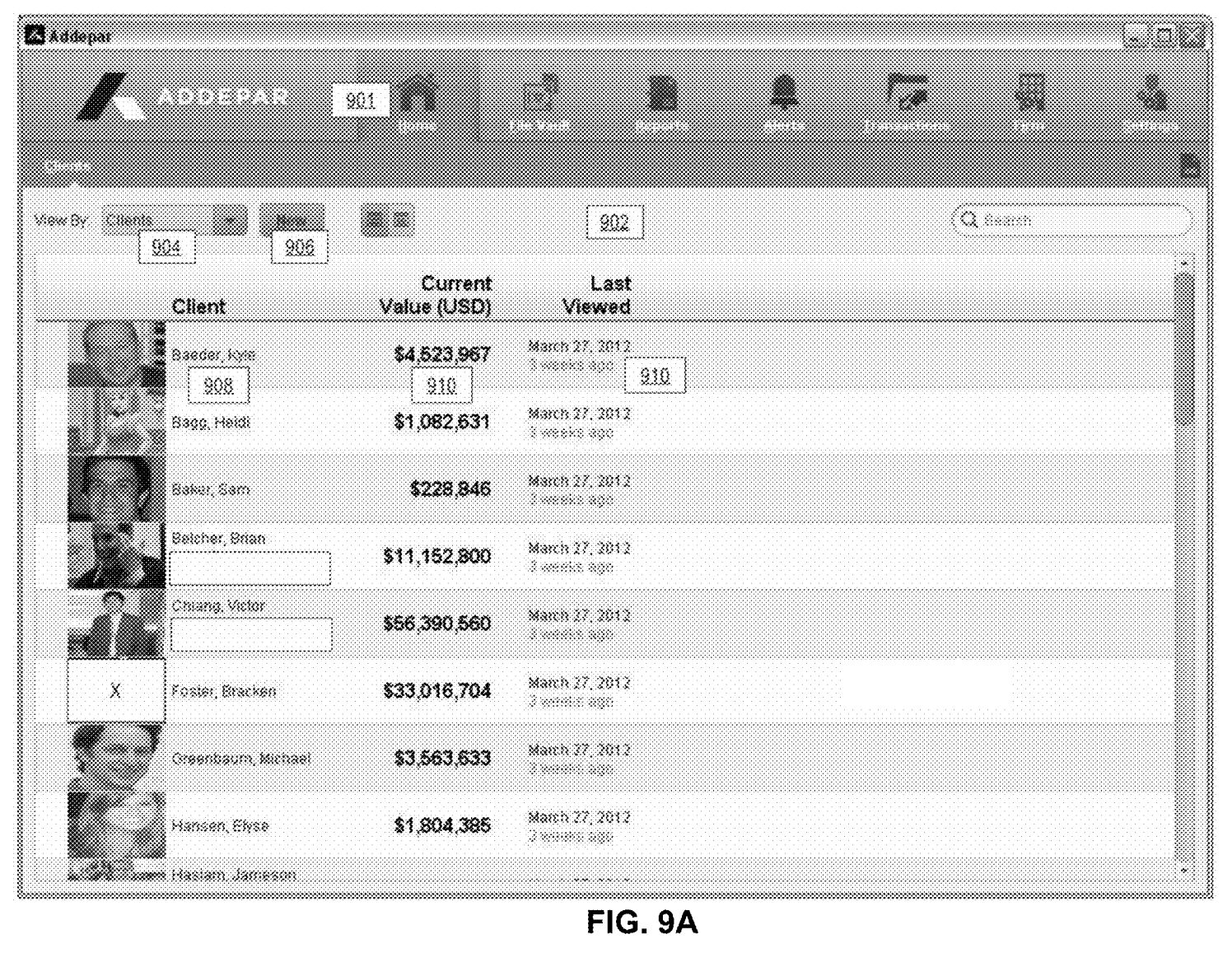

For example, FIG. 9A illustrates a home screen display 902 illustrating a portfolio summary view from the Perspective of Clients. In an embodiment, display 902 comprises a view type pull-down widget 904 which, when selected, displays a list of available views. Selecting a New widget 906 opens a dialog in which a user may specify configuration values for a new Person or Group, which then can be referenced in views. In the case of a Clients view, screen display 902 comprises a Client column 908 that identifies a person, a Current Value column that identifies aggregate current value of all holdings of that client, and a Last Viewed column that indicates the last time that the current user viewed the data.

Figure 9B:
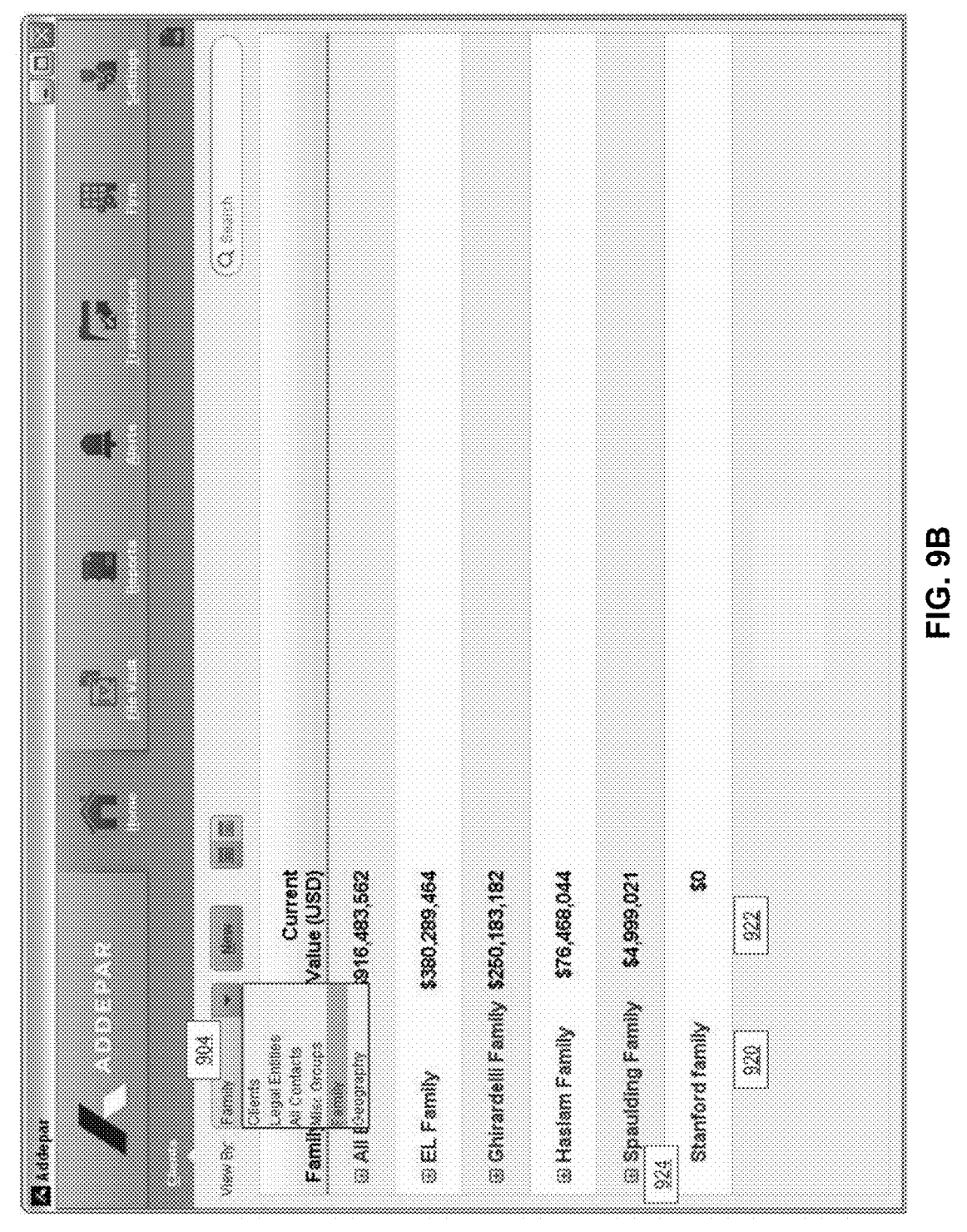

FIG. 9B illustrates another example in which widget 904 and a Family option has been selected. In response, view computation unit 206 has re-traversed the graph 202 and consolidated values based on family membership; to support such a view, family relationships are represented in graph 202, for example using edges labeled as family relationships to connect nodes of various individuals. In the example of FIG. 9B, the view comprises a Family column 920 and Current Value column 922, which are the only columns defined for the Family view. Selecting an open (+) widget for a particular Family causes the view computation unit 206 to display child nodes of the named family and Current Value totals for the child nodes. Similar views may be generated for legal entities such as trusts. A view of Current Value for a legal entity such as a trust is given from the trust's perspective and will indicate total value of all known assets, even if the current user (for example, a particular financial advisor) only works with one individual who owns a minority stake in the trust.

The example of FIG. 2A includes circular references, and FIG. 3A implements logic to prevent block 302 from causing an infinite loop, while permitting accurate representation of the value of assets by permitting edges to loop back once. In particular, FIG. 3A incorporates logic that permits a cycle to occur only once. In an embodiment, at block 306, a sequence of already traversed nodes is periodically checked and in block 308 the process tests whether two identical sequences are adjacent. For example, if nodes are labeled with alphabetic character labels, then the traversal sequence ABCAB is considered valid, but the sequence ABCABC is invalid. Although the first sequence includes two instances of path Aft the instances are not adjacent; however, in the second sequence, two instances of path ABC are adjacent and therefore invalid. Referring again to FIG. 2A, the sequence [Ken, Trust, Alpha Holdings LLC, Beta Holdings LLC, Ken, Alpha Holdings LLC] is valid, but [Ken, Trust, Alpha Holdings LLC, Beta Holdings LLC, Ken, Trust, Alpha Holdings LLC, Beta Holdings LLC] is invalid.

In block 310, upon detecting an invalid identical adjacent sequence, the process backtracks the recursive walk of the graph by one node and moves to the next adjacency. In effect the process adjusts internal recursion steps to avoid re-traversing a second identical sequence. Traversal continues until all nodes, edges and adjacencies have been traversed, as represented in the test of block 312. Upon completion, path list 304 is fully populated with all valid paths through the graph.

Figure 3B:
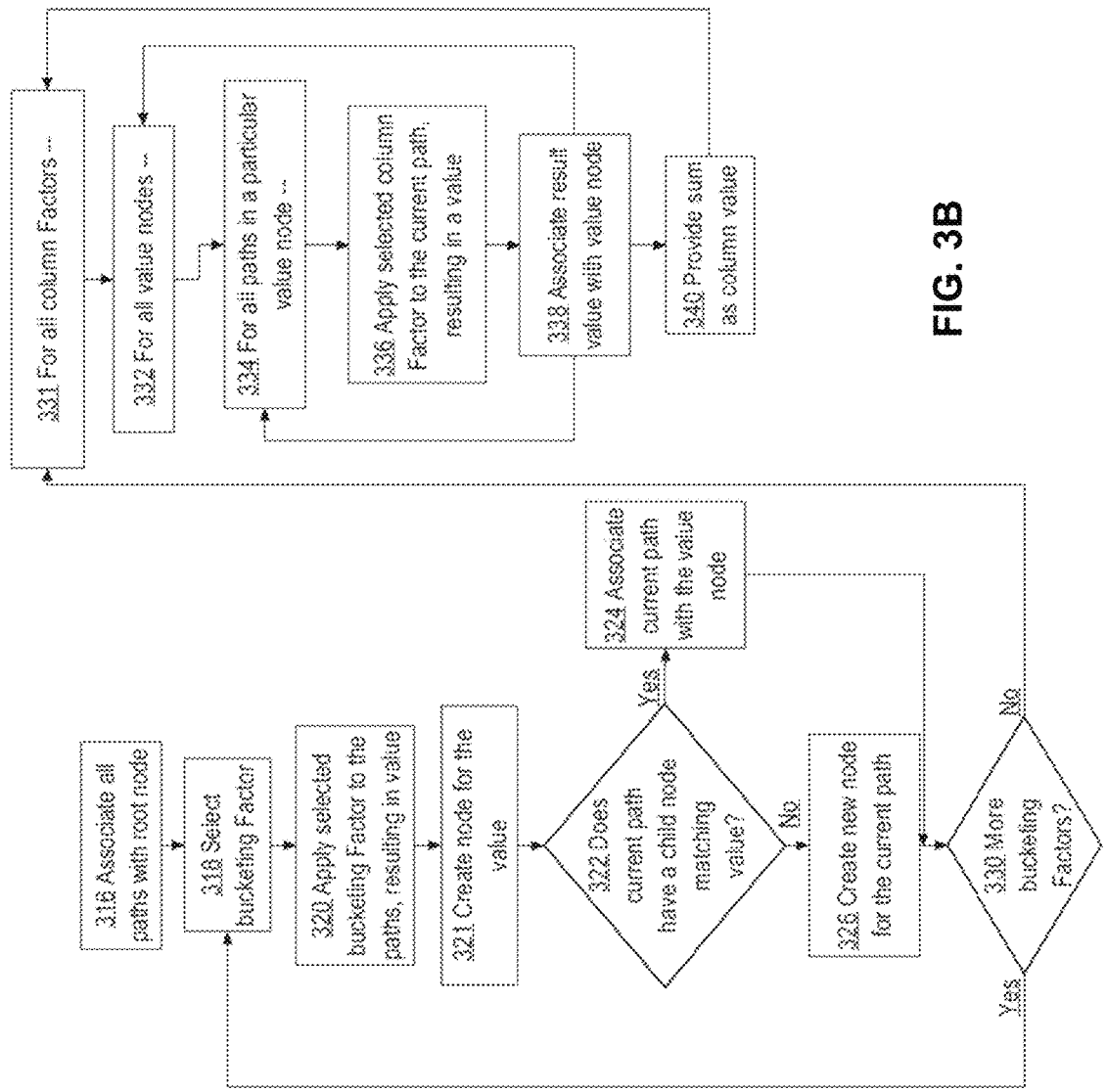
FIG. 3B illustrates other steps in the process of FIG. 3A.

At block 314, a bucketing process is performed to form nodes in the paths into a tree (also referred to herein as a "bucketing tree") or other hierarchy of buckets as specified by the then-current configuration of bucketing Factors 315. Referring now to FIG. 3B, at block 316, a root node (also referred to herein as a "root value node" and/or a "root node" of the bucketing tree) for the tree is created in memory and initially all paths in the path list 304 are associated with the root node. At block 318, a bucketing Factor is selected, and block 318 forms a loop with block 330 that iterates through all configured bucketing Factors. For example the first selected bucketing Factor could be asset class.

At block 320, the selected bucketing Factor is applied to all the paths in the path list 304, resulting in generating a value for the bucketing Factor. The following pseudocode represents applying a factor in an embodiment:

```
for (path: paths) {
    val = factor.apply (path) }
factor <T>
T    apply (list <Path>, Context)
```

If the first selected bucketing Factor is asset class, then the resulting value val might be Stock, Bond, etc. At block 321, a node in the tree hierarchy is created for the value; for example, a Stock node is created. At block 322, the process tests whether the current node (initially the root node) has a child node that matches the value. Thus, one test would be whether the root node has a Stock node as a child node. If the result is YES, then the current path is associated with the value node that was created at block 321. For example, if the current node has an ALPHA COMPANY Stock node as a child, then the ALPHA COMPANY Stock child node is associated with the Stock value node as shown at block 324. If the result of the test at block 322 is NO, then at block 326 a new node is created for the current path. Another example of the bucketing process is described below in reference to FIGS. 15A-15C.

In various embodiments, various filtering or correction processes may be applied to improve the appearance or analytical value of the result of bucketing. For example, certain bucketing Factors may return values that are too granular to justify creating a new value node, so the return values could be aggregated into a larger bucket. As a particular example, if IRR is a bucketing Factor and returns a value of 1.2, the process could elect to associate that result with a "1.0 to 5.0" IRR bucket, and associated value node, rather than creating a new value node just for IRR results of 1.2.

In an embodiment, configuration data may define the range of values that are included in a particular bucket, so that the nature of buckets may be customized on a per-user or per-session basis. For example, assume that a user wishes to classify stock assets as Large Cap, Mid Cap, Small Cap; different users may wish to define ranges of market capitalization differently for each of the three (3) classifications. In an embodiment, graphical user interface widgets may be selected to identify particular bucketing Factor values and the ranges of result values that each bucketing Factor should yield. Further, in an embodiment, any user may create any other desired new bucketing Factor by configuring a generic bucketing Factor to trigger on the presence of a particular metadata value in a particular asset or node. For example, a user could create a Hedge Fund Strategy (Quant) bucketing Factor that will classify assets into a node, ultimately causing reporting them as a row in a table view, when the value of a Hedge Fund Strategy metadata attribute of an asset is Quant.

Iterating to another bucketing Factor by transferring control from block 330 to block 318 results in re-processing path list 304 for a different bucketing Factor, for example, Country.

When all paths have been processed in the steps preceding block 330 for all configured bucketing Factors, the result is a set of nodes, representing each bucketing Factor, each having associated therewith all paths to nodes that match the value yielded by applying the bucketing Factor to a path. The effect is that each node representing a bucketing Factor has associated with it all matching paths and nodes in the graph 202. For example, if path list 304 comprises 100 paths, then a first bucketing Factor node for Stocks might have 50 paths, a Bonds node might have 40 paths, and a Commodities node might have 10 paths.

The association of paths with a bucketing Factor node, as opposed to individual assets or terminal nodes that represent assets provides a distinct difference as compared to other systems and provides special benefits for various other features of the systems as further described. For example, a particular Perspective, such as Ken or Beth, may have multiple paths to the same ultimate asset. The present system provides ways to consolidate or roll-up multiple different paths into a single value for a particular asset, regardless of the number, complexity or direction of the paths. For other features and reasons, the paths also matter, as subsequent description will make clear.

At block 331, the process of FIG. 3B performs column processing using each value node in the tree that was created and associated with paths in preceding steps. As shown at block 331, all configured column Factors are processed and block 331 represents starting an iteration of subsequent block for all such configured column Factors.

As indicated in block 332, for a particular column Factor, all value nodes are considered iteratively; further, block 334 represents iterating through all paths in a particular value node. For each such path, at block 336, a particular column Factor is applied to the current path, resulting in a value; as noted above, a Factor receives one or more paths and a Context as input, both of which are known and available at block 336. The same pseudocode as provided above may be used.

The resulting value is associated with the current value node at block 338. As shown in block 340, when all paths for a particular value node have been processed, the sum of all values that have been associated with the value node may be returned as a column value (also referred to herein as a "column result value" and/or a metric) for display or inclusion in a table view for a row associated with the value node. Processing continues iteratively until all column Factors have resulted in generating values for all columns of that row or value node.

Each column Factor may define a complex calculation by overriding a method in a class definition for a generic column Factor. For example, a Factor may call an ownership determination method to determine a percentage of ownership represented in a path as a precursor to computing a value of an asset. A Factor may call another Factor to perform such a computation. For example, a value Factor may call a percent-ownership Factor, which in turn could perform a matrix multiplication to determine percent ownership, and the value Factor may multiple the resulting percentage value by a current value of an asset to determine a particular Perspective's value for the asset.

Factors may implement complex logic for concepts such as internal rate of return. For example, a Factor may compute a date on which Beth became a trustee of the Trust, determine values of all transactions that occurred on or after that date, separately call a value Factor to determine a current-day value of each asset involved in each such transaction, etc.

In various embodiments, control steps may be performed in the processes of FIG. 3A, FIG. 3B to improve the quality of display. For example, if a Factor returns a result of "unknown value," the resulting column value may need to be modified or removed for a particular value node, since the user cannot gain any added information from an unknown column. The result would be that a particular section of a table view or tree represented in the table view would have blank column values.

Embodiments facilitate the ability to perform multi-currency displays and calculations so that values in multiple currencies are concurrently displayed in the same table view. For example, the Edit Columns dialog may be used to select a Value factor, and add it as a column to a table view, that is expressed in any of a plurality of currencies or in a Native Currency, which is the currency in which the underlying asset is actually held or tracked by a custodian. Any number of such columns may be added to a particular table view by repeatedly selecting the Edit Columns dialog, adding the Value factor with different currency values, and applying the selection to the view.

Figure 9C:
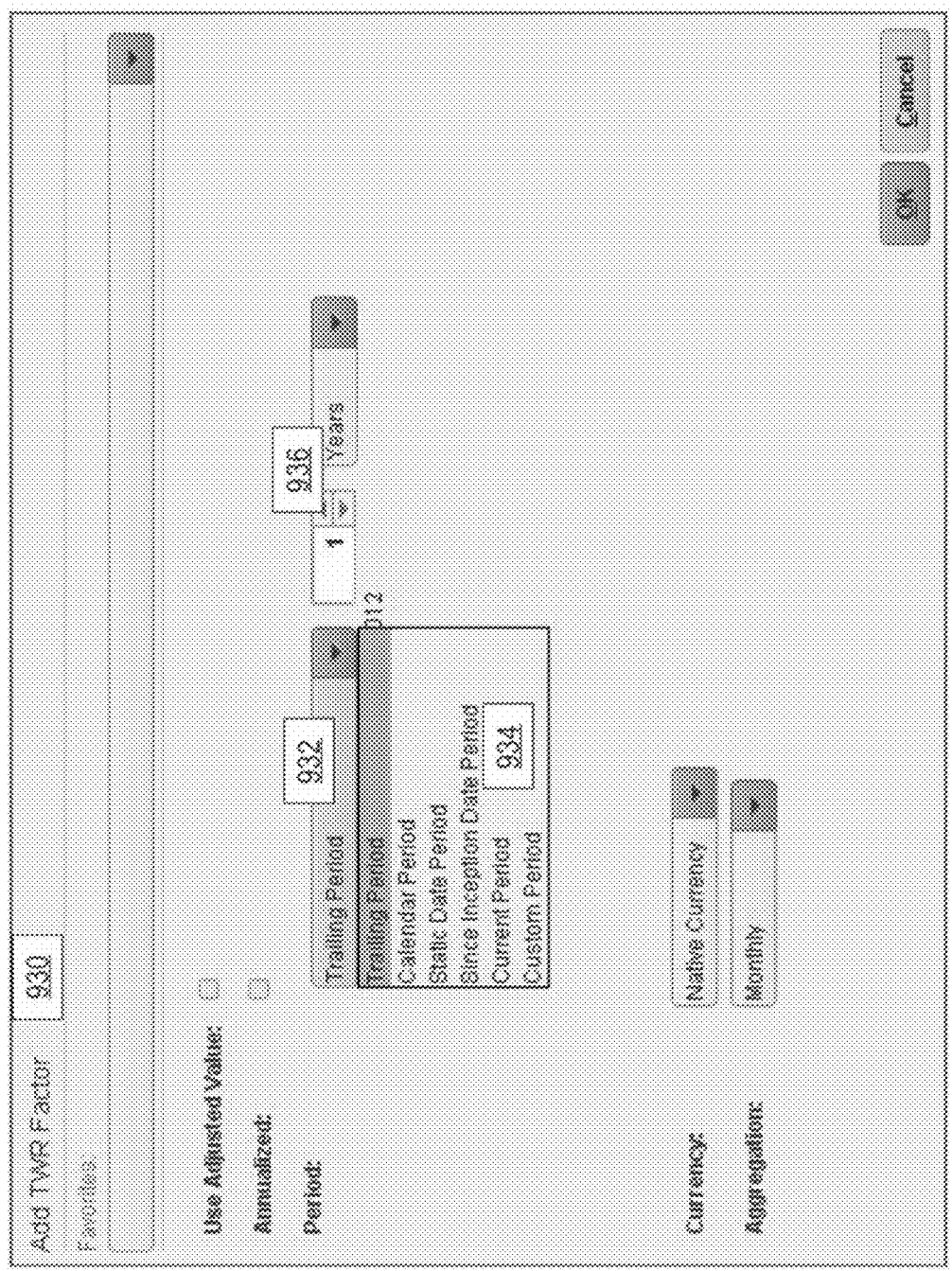
FIG. 9C illustrates an example of an Add TWR Factor dialog resulting from selecting the Edit Column dialog, selecting Performance Metrics from among the Available Columns, and adding TWR Factor as a column.

Embodiments provide the ability to display views of asset values for multiple different time periods in different columns within the same view. FIG. 9C illustrates an example of an Add TWR Factor dialog 930 resulting from selecting the Edit Column dialog, selecting Performance Metrics from among the Available Columns, and adding TWR Factor as a column. (TWR refers to Time Weighted Rate of Return.) In response, the view computation unit 206 causes displaying an Add TWR Factor comprising a Period drop-down menu 932 having a list 934 presenting a plurality of time period options. For example, for a particular view a user may add a column for TWR based on a Trailing Period, Calendar Period, Static Date Period, Since Inception Date, Current Period, or Custom Period. For some options the user is expected to enter time quantity and term values using time widgets 936. When the configuration values of dialog 930 are applied to a view, applying the TWR Factor to a traversal of the graph 202 will result in performing calculations based on available historical asset data for the time periods as specified. A user may add multiple TWR Factor columns to a particular view, each column having a different Period configuration, for example, to permit comparison of asset performance to benchmarks using different metrics of interest.

Changing the Date associated with the Context does not necessarily affect all date periods for the TWR Factor or other factors in the same manner. For example assume that the foregoing TWR Factor columns have been configured, that the current date is March 30, and then the user changes the Date associated with the Context to be March 1. The TWR Factor that is based upon a 1-year trailing date would then compute values based on March 1 and 1 year earlier. A TWR Factor that is based on a Start Date and End Date would use March 1 as the new Start Date but the End Date would be unchanged. A Factor that is based on a static date would be unaffected. Thus, the system offers the capability to independently control each column of a table view based on configuration data. Further, modification of date values in this manner enables a user to preview the impact of the change on output data that may be used later in a report.

Filters may be used to further customize the appearance or content of a table. A filter is a computational unit, such as a programmatic object, that determines whether edges and nodes in one or more paths should be reflected in output data in a table view. Filters are applied to paths using the processes described above, on a per-path basis. Thus, creating and applying a filter causes view computation unit 206 to re-traverse all paths of the current view and to apply the filter during path traversal; this approach contrasts sharply with approaches of others in which filtering is merely applied to an output table or to a dataset that has been retrieved from a database. Further, filters may be applied to entities that are not visualized in a particular table view. For example, a view may be filtered to show the top 10 holdings based on IRR, even though IRR is not present in the table view.

Figure 10:
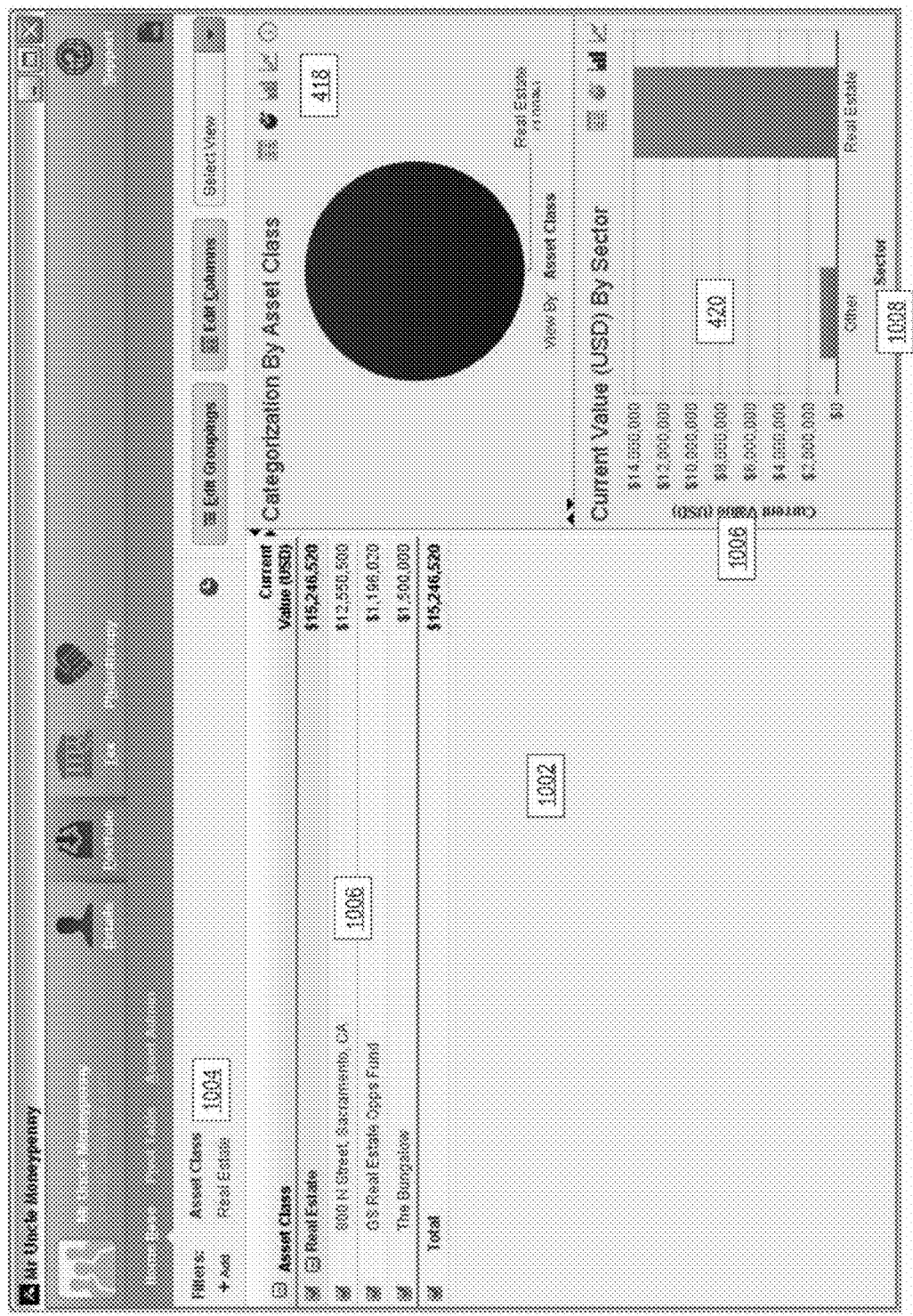
FIG. 10 illustrates the GUI of FIG. 4 after applying a Real Estate filter.

Filters may be created through manual user selection and action by selecting the Filters Add (+) icon and responding to a filter creation dialog, or semi-automatically by selecting elements of info-graphics. In an embodiment, info-graphics such as charts 418, 420 are configured with hyperlinks that cause the view computation unit 206 to create a filter and apply the filter to the table view 408. FIG. 10 illustrates the GUI of FIG. 4 after applying a Real Estate filter. In an embodiment, a user may select any pie wedge in the pie chart 418, or any bar in the bar chart 420, to cause creating a filter. In the example of FIG. 10, the user selected the Real Estate wedge 1001 of the pie chart 418 in the display of FIG. 4; in response, view computation unit created a filter 1004 as seen in the filter region and applied the filter to the table view to result in displaying only real estate assets. Further, the filter is concurrently applied to both the info-graphics with the result that the pie chart displays a single solid circle since 100% of the assets listed in the table view are real estate assets. The filter 1004 may be removed by hovering a cursor over the filter and selecting a remove (X) icon. The same form of filter control may be activated by selecting a bar of the bar chart 420.

Conversely, if the filter region of the table view is used to define one or more filters, then the info-graphics automatically update to reflect the filters that have been newly applied.

In an embodiment, the same basic processes described above for generating table views may be applied to generating the pie chart 418 and bar chart 420. For example, the X axis of the bar chart 420 may be defined using a bucket Factor and the Y axis may be defined using a column Factor. For example, a bar chart may be defined by bucketing IRR on the X axis while particular values are determined using column Factor value generating techniques as described above for table views.

Figure 11:
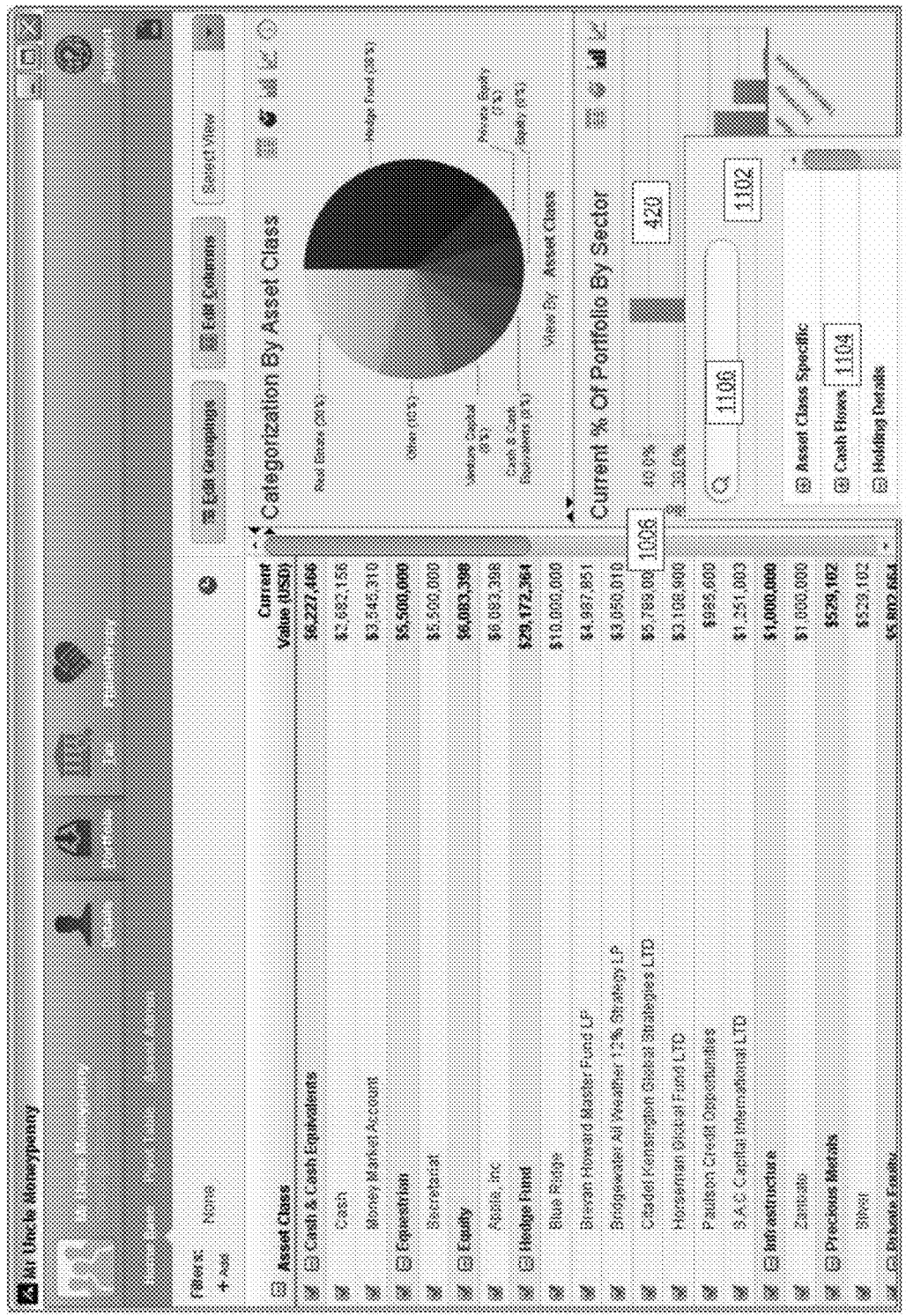
FIG. 11 illustrates the GUI of FIG. 4, FIG. 10 in which vertical axis label has been selected.

In an embodiment, bar graph 420 comprises a vertical axis label 1006 and horizontal axis label 1008 that are configured as selectable hyperlinks. View computation unit 206 is configured to cause displaying, in response to user selection of an axis label 1006, 1008, a pop-up menu listing available Factors that may be selected for use as axes. FIG. 11 illustrates the GUI of FIG. 4, FIG. 10 in which vertical axis label 1006 has been selected. View computation unit 206 is configured to cause displaying pop-up menu 1102 comprising a list 1104 of available Factors that may be selected as the basis of computing a new vertical axis for the bar graph 420. A user may scroll through list 1104 and select any Factor of interest, or type keywords for a Factor name in search box 1106 to receive a list of matching Factors. Selecting a Factor from list 1104 causes view computation unit 206 to cause closing the menu 1102 and recomputed the chart 420 using the newly selected Factor. A different Factor for the X-axis may be applied in a similar manner by selecting horizontal axis label 1008 and selecting a new Factor from a pop-up menu.

In an embodiment, Factors include value by any of a large plurality of currencies. Consequently, a user or analyst may view values by currency according to currency rates and conversions of the present day, with immediate recalculation by re-traversing the graph.

Figure 12:
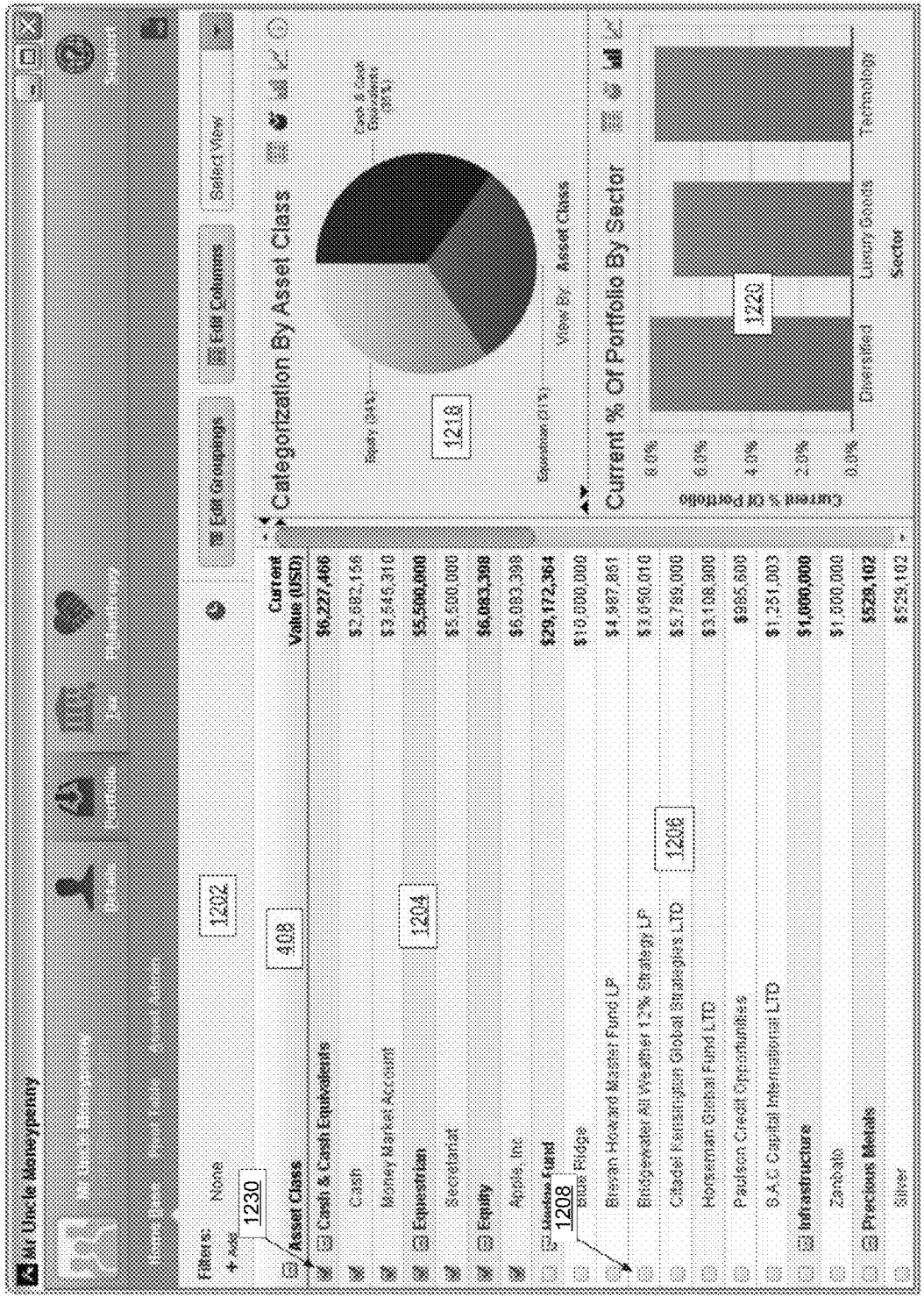
FIG. 12 illustrates an example in which some of the data in the table view is selected.

In an embodiment, view computation unit 206 is configured to re-compute and cause re-displaying info-graphics such as pie chart 418 and bar chart 420 based on changes in selections to data in table view 408. FIG. 12 illustrates an example in which some of the data in the table view is selected. In screen display 1202 of FIG. 12, table view 408 comprises a first set of rows 1204 and a second set of rows 1206 indicating assets organized by asset class. The first set of rows 1204 has been selected as indicated by checks in selection checkboxes 1230 while the second set 1206 is not selected as indicated by non-checked selection checkboxes 1208. In an embodiment, a range of rows may be selected by individually checking checkboxes 1230, 1208 or by selecting one row and then using keyboard control combinations such as SHIFT-click or CTRL-click to select a range of rows or multiple discrete rows. View computation unit 206 is configured to re-compute and cause re-displaying pie chart 1218 and bar chart 1220 to reflect only the selected rows and omit data associated with non-selected rows. For example in FIG. 12 it will be seen that pie chart 1218 comprises only three (3) wedges for Cash & Cash Equivalents, Equity, and Equestrian assets because the first set 1204 of rows comprises only assets in those asset classes. The sum of assets represented in the pie chart 1218 is the sum of only the first set 1204 of selected rows. Similarly, bar chart 1220 has been re-computed and redisplayed to reflect only the Sectors represented in the first set 1204 of selected rows.

In an embodiment, view computation unit 206 is configured to save a view of the type shown in FIG. 4, FIG. 5, FIG. 10, FIG. 11, FIG. 12 in response to user input requesting to save a view. In one embodiment, referring again to FIG. 4, a user may select the Select View menu 422 to cause displaying a list of named, previously saved views; one menu option is Save As. In response to receiving a selection of Save As in menu 422, view computation unit 206 is configured to cause displaying a dialog that prompts the user to enter a name for the current view. In response to receiving user input specifying a name, the view is saved in data repository 204 in the form of a named set of metadata defining the view. Example metadata that define a view include the Context, the Filters applicable to the view, the grouping and column Factors defining table view 408, and the Factors defining axes of the chart 420.

After a view is saved, a user may retrieve and use the view with any other Context. For example, the same user could change the Context to a different client or legal entity, and the view computation unit 206 is configured to apply, in response, the metadata defining the view to portions of the graph that relate to the newly selected client or legal entity. As a result, table view 408 and related info-graphics are re-computed and redisplayed to reflect holdings of the newly selected client or legal entity.

In an embodiment, when a user logs out and logs back in again in a later user session, the last saved view from the prior user session is used as the first view that is displayed in the new user session.

4.0 Exporting Views and Generating Reports and Publications

In an embodiment, view computation unit 206 is configured to export data shown in views to other applications or to other document formats such as MICROSOFT EXCEL or ADOBE PDF. In an embodiment, view computation unit 206 is configured to perform export operations based on the current view. For example, in one embodiment, exporting is initiated by a user selecting the Export widget 424. In response, view computation unit 206 causes highlighting all of the table view 408 and current info-graphics such as pie chart 418 and bar chart 420, and causes displaying, in each of the table view and info-graphics, a selectable icon representing an available export format for that area of the display. For example, view computation unit 206 may cause displaying an EXCEL icon and a PDF icon over the table view 408, but may display only a PDF icon over pie chart 418 and bar chart 420 since info-graphics of those forms cannot be exported in the form of an EXCEL table.

In an embodiment, view computation unit 206 is configured, in response to selection of one of the ADOBE PDF icons, to facilitate exporting data shown in views to a report center system that is configured to facilitate generating reports in the form of electronic documents. Embodiments facilitate creating reports in which the organization of pages is controlled and source data from a table view is gracefully fitted into the report pages rather than appearing as a direct cut-and-paste without appropriate fitting or formatting. In one embodiment, selecting the Export widget 424 and an ADOBE PDF icon causes displaying a report selection dialog. In an embodiment, the report selection dialog comprises a list of previously created and saved reports. View computation unit 206 is configured, in response to selection of a particular report in the list of previously created and saved reports, to display a page list identifying all pages that have been previously defined in the selected report.

Selecting a particular page in the page list may cause view computation unit 206 to trigger execution of report unit 209 (FIG. 2A). In response, report unit 209 causes displaying a report creation user interface (also referred to herein as a "report editor user interface"). Examples of report generation and/or editing user interfaces are described in U.S. patent application Ser. No. 14/644,038, filed Mar. 10, 2015, and titled "SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES," the entire disclosure of which is hereby made part of this specification as if set forth fully herein and incorporated by reference for all purposes, for all that it contains.

In various embodiments, the report editor user interface may include a Context link that may be used to specify a context for the report in terms of a named individual or legal entity (for example, the Context link may be similar to portion 1610 of FIG. 16 described below, in that the Context link may enable the user to select a particular perspective). As noted above, a Context may include a Perspective (an individual, legal entity, and/or group) and/or a date or date range. The report editor user interface may further include a link by which the user may specify a particular date and/or date range. The report unit 209 is configured to receive user input selecting the Context link and to display a list of other individuals or legal entities that are associated with the current logged in user and/or Perspectives that may be selected for the Context. In response to receiving a selection of a different individual or legal entity, the report view is re-computed and re-rendered from the perspective of the next Context. Re-computation involves re-traversing the graph 202 in the manner described above for generating table view 408 of FIG. 4. As described further below, a report view may comprise a plurality of independent widgets for text, tables, and graphics, and in an embodiment changing the Context causes each widget to perform an independent traversal of graph 202 to re-compute values for display in that widget. Thus, working on a report involves creating and storing metadata that defines the components of the report and certain formatting attributes of the report, but not particular values in the report; instead, the current Context drives a traversal of the graph 202 to generate values for substitution into a view of the report based on the metadata. Moreover, the techniques herein have the benefit of separating the construction and format of a particular widget from the underlying data, so that programmatic changes in a widget will result in displaying the widget in updated form while rendering in correct and timely underlying data based on traversing the graph 202.

Accordingly, as described above, the interactive user interfaces of the system enable non-technical users to quickly and dynamically generate and edit complex reports including tables and charts of data. The complex reports may be automatically and efficiently generated through access and traversal of complex data structures, and calculation of output data based on property values of multiple nodes within the complex data structures, all in substantially real-time. By storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements. Thus, in some embodiments, the systems and user interfaces described herein may be more efficient as compared to previous systems and user interfaces.

5.0 Example Graph Traversal and Table Generation

Figure 14:
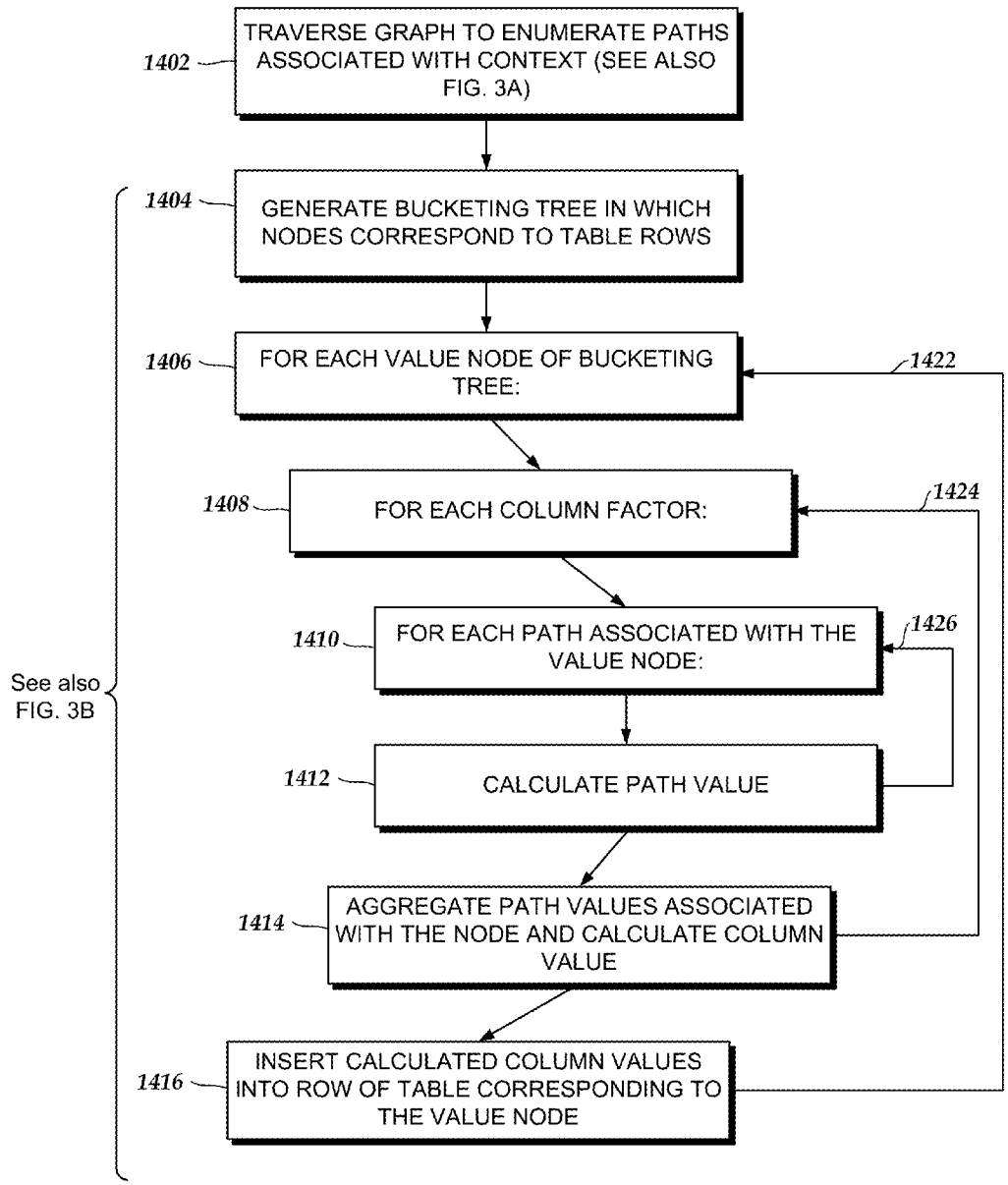
FIG. 14 is a flowchart showing an example method of the system in which a table is generated.

FIG. 14 is a flowchart showing an example method of the system in which a table is generated via graph traversal and column factor calculations. In various embodiments, fewer blocks or additional blocks may be included in the process of FIG. 14, or various blocks may be performed in an order different from that shown in the figure. Further, one or more blocks in the figure may be performed by various components of the system as described above and below, for example, one or more of view computation unit 106 and/or report unit 109.

Beginning at block 1402, the graph, for example graph 202, is traversed and all the paths associated with the selected context are enumerated. This block is described in further detail above in reference to FIG. 3A. Graph traversal and enumeration of paths may be dependent on a particular context. For example, a given perspective (for example, an individual, legal entity, and/or the like) may indicate the locations from which the graph is traversed. An example is described above, and another example is illustrated in FIGS. 15A-15C. In particular, FIGS. 15A-15C illustrate an example traversal of a simplified graph 1502, according to an embodiment of the present disclosure. Referring to FIG. 15A, the graph 1502 includes six nodes: Alice (representing an individual, and which may be referred to as node A), Bob (representing an individual, and which may be referred to as node B), "C" Trust (representing an trust instrument, and which may be referred to as node C), Stock "D" (representing a stock instrument, and which may be referred to as node D), Bond "E" (representing a bond instrument, and which may be referred to as node E), and Stock "F" (representing a stock instrument, and which may be referred to as node F). The relationships among the various nodes of the graph are indicated by the edges. Further, as described above, various attributes and/or properties may be associated with each of the nodes and/or edges of the graph. For example, as described above and below, each of the edges of the graph may indicate a relationship between the two nodes connected by the edge. In one example, an edge may indicate a value and/or percentage of an asset (for example, a stock, bond, and/or the like) owned by an individual.

For simplicity of explanation, graph 1502 illustrates a simple graph with a small number of nodes and no complex relationships among the nodes. However, in various embodiments, and depending on actual data stored in the system, the graph may include hundreds, thousands, millions, or more nodes and/or edges. Further, the graph may include complex relationships including loops, and/or the like. Accordingly, identifying paths through a typical graph having thousands or more nodes and edges would not be practical to perform manually, at least for the reasons that it would take an impractical amount of time to perform (e.g., days, weeks, or longer to traverse a large graph) and the process would be error-prone (e.g., manual traversal of thousands or more nodes would have a nonzero error rate). Accordingly such processes are necessarily performed by computing processors and systems, using the various methods discussed herein.

According to an embodiment, FIG. 15B illustrates an aspect of traversal of the graph 1502. As described above (and as further described in reference to FIG. 2B), a graph and a context are provided in the process of graph-to-table transformation. In the embodiment of FIG. 15B, the context includes the perspective "Bob." Accordingly, in the example the graph is traversed from the perspective of Bob so as to generate a table of information derived from the graph. As further shown in FIG. 15B, an "Asset Type" bucketing factor has been selected by a user (or automatically by the view computation unit 106 and/or report unit 109, for example). Accordingly, the generated table will include rows corresponding to assets associated with Bob, and organized according to asset types (as described above). Additionally, an "asset value" column factor (also referred to herein as an "asset" column factor) has been selected. Accordingly, the generated table will include at least one column showing values corresponding to the various rows of the table.

As described above in reference to FIG. 3A, the graph 1502 is traversed so as to enumerate all the paths associated with node B (as node B represents Bob). FIG. 15B illustrates all five paths associated with node B as determined by the system. In various embodiments, each path may include nodes and/or edges of the graph that comprise the path in the graph, as well as any attributes associated with the nodes and/or edges of the path.

Returning now to FIG. 14, each of blocks 1404-1416 describe additional aspects of the graph-to-table transformation, which is also described above in reference to FIG. 3B. Specifically, at block 1404 (roughly corresponding to blocks 316-330 of FIG. 3B), the various enumerated paths are processed based on a selected bucketing factor to create a tree (also referred to herein as a "bucketing tree") of various values associated with the bucketing factor, and paths associated with those values. In an embodiment, the values represented in the bucketing tree may be represented by nodes (also referred to herein as "value nodes"). In the example of graph 1502 (of FIG. 15A), this step is illustrated in FIG. 15C in which the bucketing factor is asset type. As shown, a bucketing tree 1512 associated with graph 1502 includes a root node 1514 (also referred to herein as a "root value node") corresponding to all paths associated with an asset (3, 4, and 5), child nodes 1516 (also referred to herein as child "value nodes") corresponding to types of assets (for example, stocks and bonds), and further child nodes 1518 corresponding to actual individual assets (for example, Stock "D", Stock "F", and Bond "E"). Further, paths associated with each of the nodes are shown. These include, for example, path 4 for Bond "E", path 3 for Stock "D", path 5 for Stock "F", paths 3 and 5 for "Stocks", path 4 for "Bonds", and paths 3, 4, and 5 for "All Assets".

In reference again to FIG. 14, in blocks 1406-1416 each node of the bucketing tree is processed so as to calculate column values to be displayed in the table. Some aspects of this process, according to an embodiment, are described above in reference to blocks 331-340 of FIG. 3B.

At block 1406, each node (as indicated by loop arrow 1422) of the bucketing tree, including its associated path, is processed. Processing of each node includes, at block 1408, evaluation of the node with respect to each column factor (as indicated by loop arrow 1424) (for example, each metric selected by the user including, for example, asset value, rate of return, IRR, and/or the like). For each of the column factors, at block 1410, each path associated with the node is processed (as indicated by loop arrow 1426) so as to determine, at block 1412, a path value. For example, if the column factor is "asset value," each path associated with the node is processed so as to calculate the asset value associated with the path. Then, at block 1414, the path values calculated with respect to each of the path associated with the node are aggregated so as to determine a column value. This calculated column value indicates a value of the given column factor with respect to the node being processed.

For example, in the instance of a bucketing tree node representing an asset class such as "Stocks," multiple paths may be associated with the node, each of the paths associated with different stocks. In calculating a bucketing factor "Asset Value" associated with the node, each of the paths may be traversed and values of each of the particular stocks are calculated. Then, all of the calculated values may be aggregated by summation so as to calculate a total value of all stocks.

In various embodiments, calculation of path values may be accomplished by referencing data (for example, attributes and/or metadata) associated with one or more nodes and/or edges associated with the path. Examples are given above and below. In some embodiments, attributes and/or metadata associated with nodes and/or edges of a path may be stored as transaction effects object. Examples of such transaction effects objects, including creation of the transaction effects objects and calculations based on the transaction effects objects are described in detail in U.S. patent application Ser. No. 13/714,319, filed Dec. 13, 2012, and titled "Transaction Effects," the entire disclosure of which is hereby made part of this specification as if set forth fully herein and incorporated by reference for all purposes, for all that it contains.

At block 1416, the each of the calculated column values is inserted into the table in respective columns associated with the column factors, and a row associated with the processed node of the bucketing tree.

This process is further illustrated with reference to bucketing tree 1512 and FIG. 15C. In FIG. 15C, the "value" column factor has been selected, and the "Stock" node is associated with paths 3 and 5. Accordingly, each of paths 3 and 5 may be individually processed by the system so as to determine a value of stocks associated with Bob. For example, edges in path 3 may indicate that Bob owns 50% of Trust "C", and further, Trust "C" has $1000 of Stock "D". Thus the system may determine that Bob owns $500 of Stock "D". Similarly, the system will determine an ownership of Stock "F" with respect to Bob. Next, the system aggregates the determined values and the aggregated data is displayed in a row and column of the table corresponding to Stocks and value.

Figure 16:
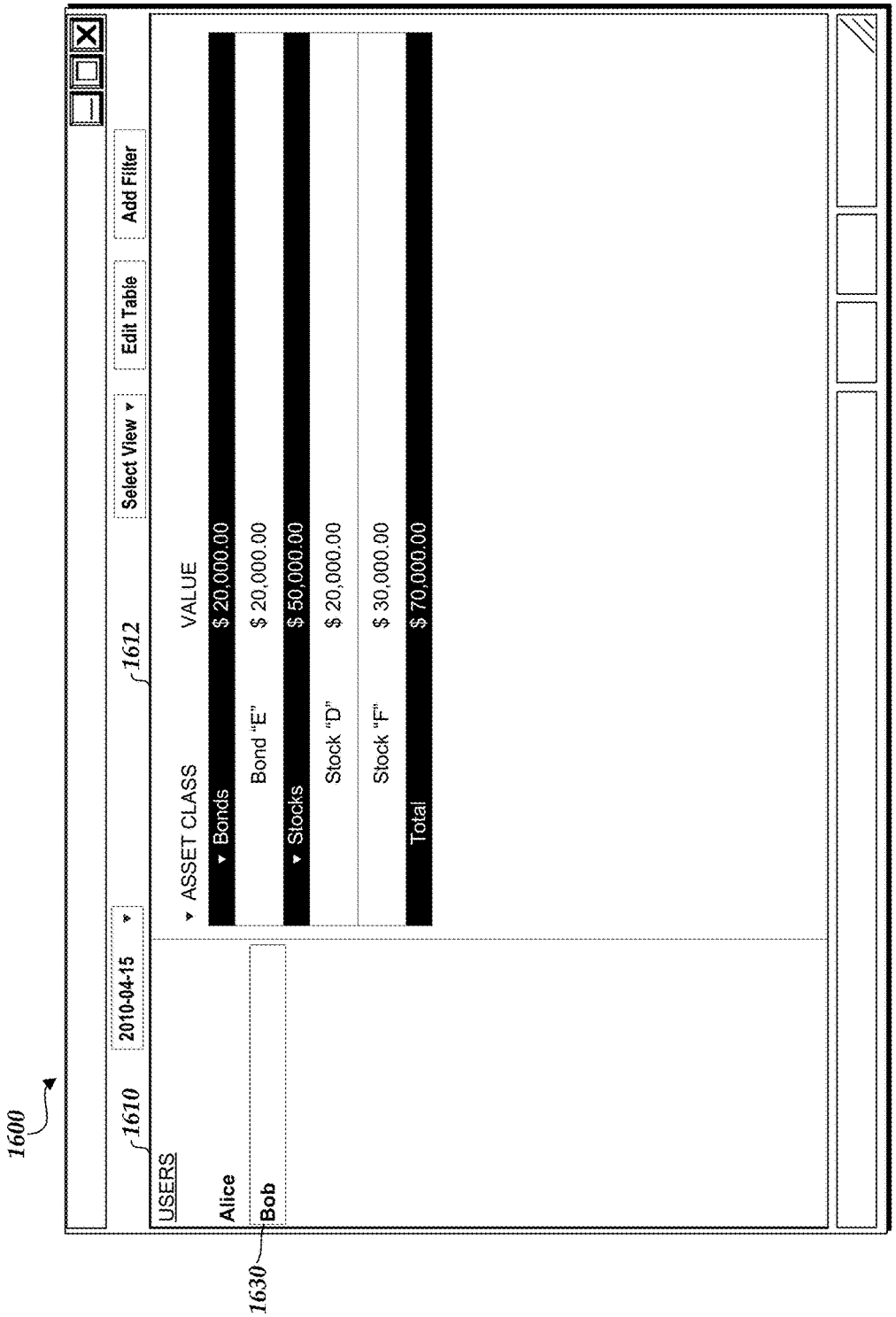
FIG. 16 illustrates an example user interface including a table generated as a result of the graph traversal of FIGS. 15A-15C.

An example of a table generated by the graph traversal of FIGS. 15A-15C is shown in FIG. 16. FIG. 16 shows an example user interface 1600 including two portions 1610 and 1612. The portion 1610 shows that currently selected perspective 1630 (in this example, Bob), while the portion 1612 shows the table generated based on the traversal described above in reference to FIGS. 15A-15C. As shown, the table includes six rows corresponding to each of the nodes of the bucketing tree 1512 (for example, Bonds, Stocks, Bond "E", Stock "D", Stock "F", and Total). The numbers in the column "Value" are displayed with respect to each of the rows, and are determined based on processing of the associated paths, as described above.

Accordingly, in various embodiments the system may automatically generate a table of data associated with a context via rapid traversal of complex graphs of related data items.

As described above, selection of a different context, application of filters, selection of different bucketing factors (for example, changing the type and/or hierarchical arrangement of rows of the table), selection of different column factors (for example, changing the calculated information displayed with respect to each row) causes the system to automatically re-traverse the graph and regenerate the table. For example, the user may change the context to Alice, may choose to organize the rows of the table according to geographical location of assets, and/or may choose to include a column showing Internal Rate of Return (IIR) (and/or any other metric). In response, the system automatically re-traverses the graph 1502 from the perspective of node A to determine associated paths, applies the geographical location bucketing factor to generate a bucketing tree associated with the determined paths, and calculate for each of the nodes (and associated paths) of the bucketing tree an IIR and/or a value. The system may then generate a table including the calculated data.

Figure 17A:
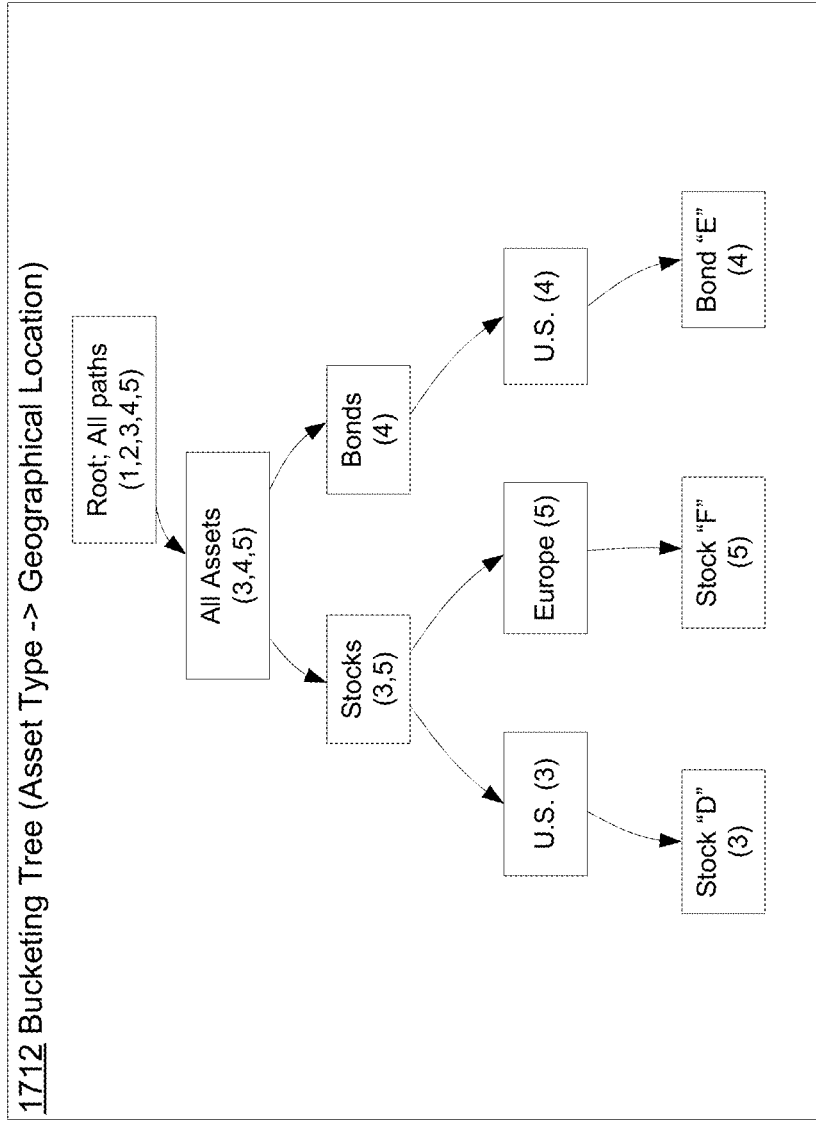

In various embodiments, the user may select multiple bucketing factors and may specify a hierarchical relationship among them, as described above in reference to FIG. 6, for example. FIG. 17A illustrates and example bucketing tree 1712 in which a user has specified two bucketing factors, Asset Type and Geographical Location. Further, the user has indicated that Geographical Location is to be a sub-categorization of Asset Type. As shown, the bucketing tree accordingly includes nodes corresponding to the Geographical Location associated with each of the asset types. Further, FIG. 17B illustrates an example user interface similar to the user interface of FIG. 16. The example user interface of FIG. 17B includes table 1714 showing results of the new categorization illustrated in FIG. 17A.

In some embodiments, calculation of values associated with each path, and aggregation of multiple path values, varies depending on a column factor. For example, when calculating a simple current value of a given asset or asset type, calculation of path values may comprise multiplication of a current value of the asset with a number of shares held. Further, aggregation of multiple path values in this example may comprise a summation of all path values to determine a total value of the asset or asset type. However, in another example, the calculation and aggregation may differ. Examples of other column factors that may each have different path calculation and aggregation include % of portfolio, active return, alpha, beta, average daily balance, internal rate of return, and/or the like.

6.0 Authentication and Permissioning

As described above, in some embodiments the system may include user authentication and permissioning. For example, a user of the system may be required to provide authentication information (for example, a username and password, a fingerprint scan, and/or the like) when accessing the system. Such authentication information may be required by the system before the user may view one or more of the user interfaces described herein, and/or may generate tables based on particular data stored by the system. In some embodiments, the user's identity may be used to determine particular data of the system which is accessible to the user. For example, the system may include data associated with many clients, only some of which are associated with the user. Accordingly, only data related to the clients associated with the user may be available via the various user interfaces. Thus, the user's identity may, in some embodiments, be authenticated before any data is shown to the user. Permissions data may be associated with the various data stored by the system such that the system may make available to a particular user only data that is permissioned such that it should be made available to that particular user.

For example, in reference to FIG. 15A, in some instances a first user may have permission to view Stock "D" (or particular attributes or other metadata associated with node D), while a second user may not have permission to view Stock "D". Accordingly, while Stock "D" may exist in graph 1502 no matter whether the first user or the second user is logged in to the system, when traversing the graph and/or generating tables, Stock "D" may be effectively invisible to the second user. Thus, in this example, a table generated for the second user would not include any data associated with Stock "D".

Additional examples of permissioning and permissions implementations that may be used in conjunction with the present disclosure are described in U.S. patent application Ser. No. 14/644,118, filed Mar. 10, 2015, and titled "SYSTEM AND ARCHITECTURE FOR ELECTRONIC PERMISSIONS AND SECURITY POLICIES FOR RESOURCES IN A DATA SYSTEM," the entire disclosure of which is hereby made part of this specification as if set forth fully herein and incorporated by reference for all purposes, for all that it contains.

In some embodiments, the system stores separate graphs associated with various clients of a firm (e.g., a wealth management, financial advisor, or investment firm). For example, a firm may have multiple clients, each of whom may manage one or more portfolios. In order to segregate data associated with each of the clients to as to prevent disclosure of confidential information, the system may maintain a separate graph for each of the clients. Such a segregation of graphs may advantageously enable protection of each client's data. In some examples, however, multiple clients' graphs may include common data entities/nodes. For example, a first client's graph may include Stock A, while a second client's graph may similarly include Stock A. In an embodiment, Stock A in each of the first and second client's graphs may indirectly reference a common Stock A node. Alternatively, the Stock A node in each of the first and second client's graphs may reference a common source of metadata and/or attributes associated with the Stock (for example, publicly available data such as a stock price). Such indirect referencing of a common node, and/or referencing a common source of attributes may advantageously reduce memory requirements of the system while maintaining privacy of each client's graphs.

In some embodiments, the system may include a single graph for multiple clients and/or for all clients of a firm. In these embodiments, the system may advantageously prevent disclosure of confidential information (for example, the graph may include data pertaining to a single client, or a subset of the clients on the system) via permissioning (as described above). Further, in these embodiments the system may advantageously further reduce memory requirements as redundant data may further be eliminated (for example, a single instance of all assets (for example, Stock A, etc.) may be maintained by the system).

Additionally, the specialized graph data structure utilized by the system enables data security (for example, protection and partitioning of client data) while simultaneously taking advantage of redundant data to reduce memory needs and computation needs. For example, as described above, in some embodiments particular data nodes may be shared among multiple clients in a common graph, and computations (for example, graph traversal) for all of the multiple clients may be run on the common graph, while at the same time permissioning of the common nodes of the graph for particular clients provides data security.

7.0 Generating Table Views with Time Varying Attributes

Figure 18A:
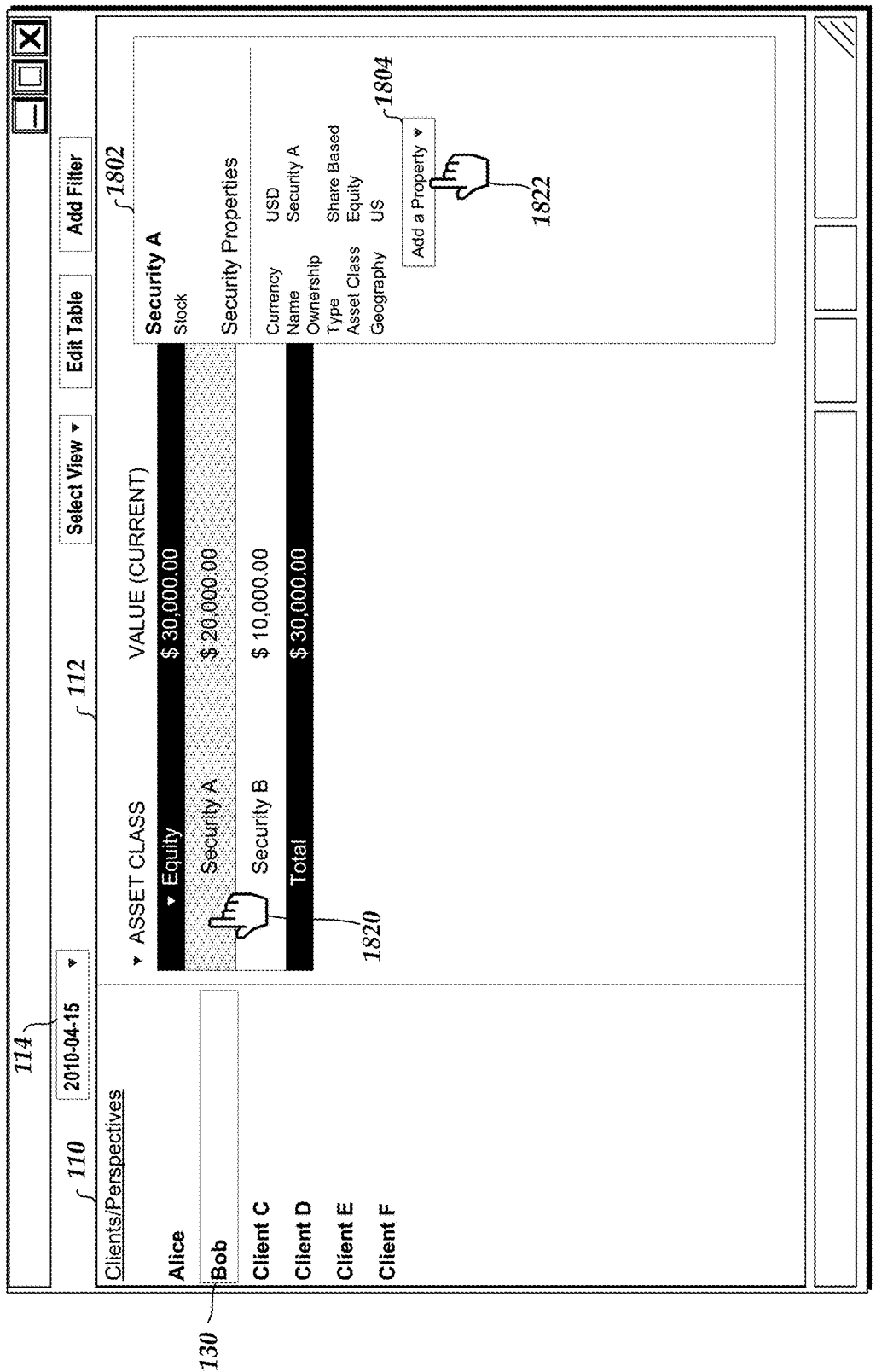
Figure 18B:
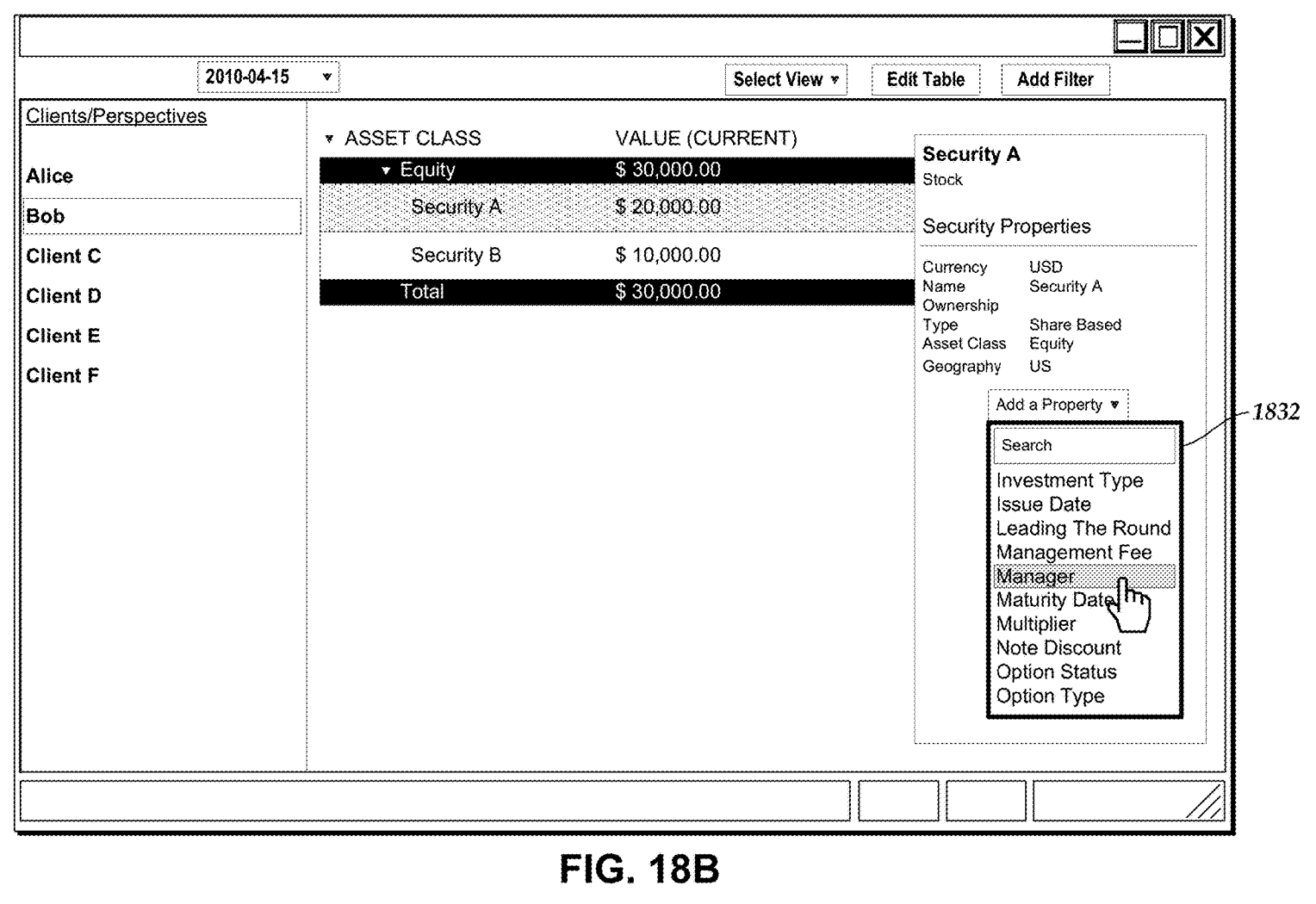
Figure 18C:
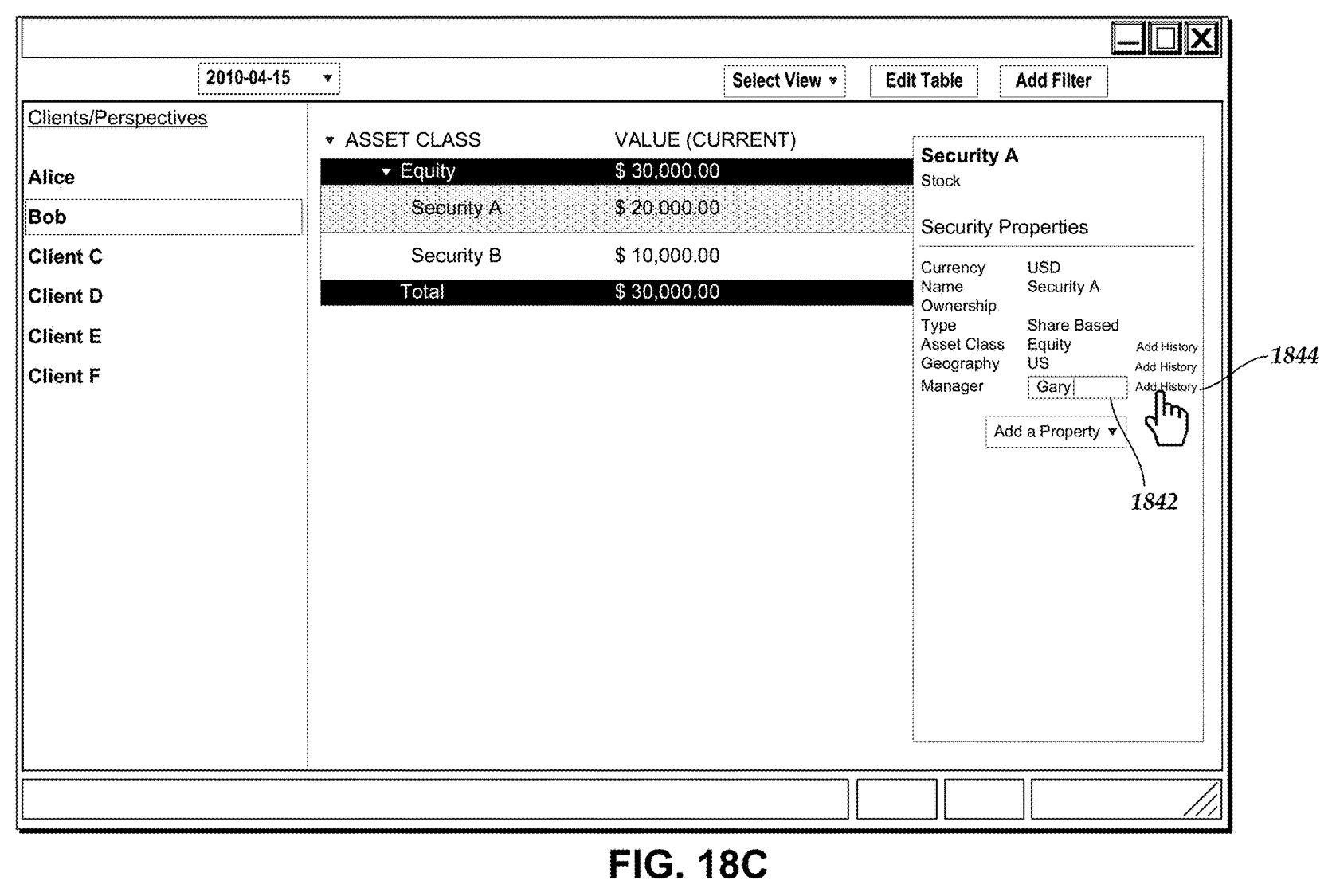

FIGS. 18A-18C illustrate example user interfaces of the system in which the user may associate a custom attribute with an asset. Referring to FIG. 18A, according to an embodiment, a user interface is shown that is similar to the user interface of FIGS. 1A, 1B, 16, and/or 17B, however various attributes (also referred to herein as properties and/or metadata) associated with a selected asset are displayed and editable by the user in a sidebar 1802. As shown in FIG. 18A, the user may interactively select one or more assets and other items shown in the user interface so as to view and edit attributes associated with the selected assets and other items via the sidebar 1802. In the example shown, the user, via cursor 1802, has selected Security A. Accordingly, the system has displayed various attributes associated with Security A in the sidebar 1802. Various attributes may be displayed in the sidebar including those shown (for example, currency, name, ownership type, asset class, geography, and/or the like), those described above and in reference to FIG. 13, and/or various other attributes including those that may be arbitrarily defined by the user (as described below).

As shown in the example user interface of FIG. 18A, the user may select an Add a Property button 1804 via, for example, cursor 1822 so as to add a new attribute to the selected Security A. FIG. 18B illustrates the example user interface after the user as selected the Add a Property button 1804. As shown, a dropdown menu 1832 may be displayed listing a scrollable list of various common attributes that may be added to the selected security. The user may additionally search for a described attribute, and/or arbitrarily specify a custom attribute. FIG. 18C illustrates the example user interface after the user has selected to add a "manager" attribute. In response, the system updates the sidebar to include the selected attribute and a field 1842 in which the user may specify a value of the added attribute. As shown, the user has specified a value of "Gary" for the manager attribute.

Figure 19A:
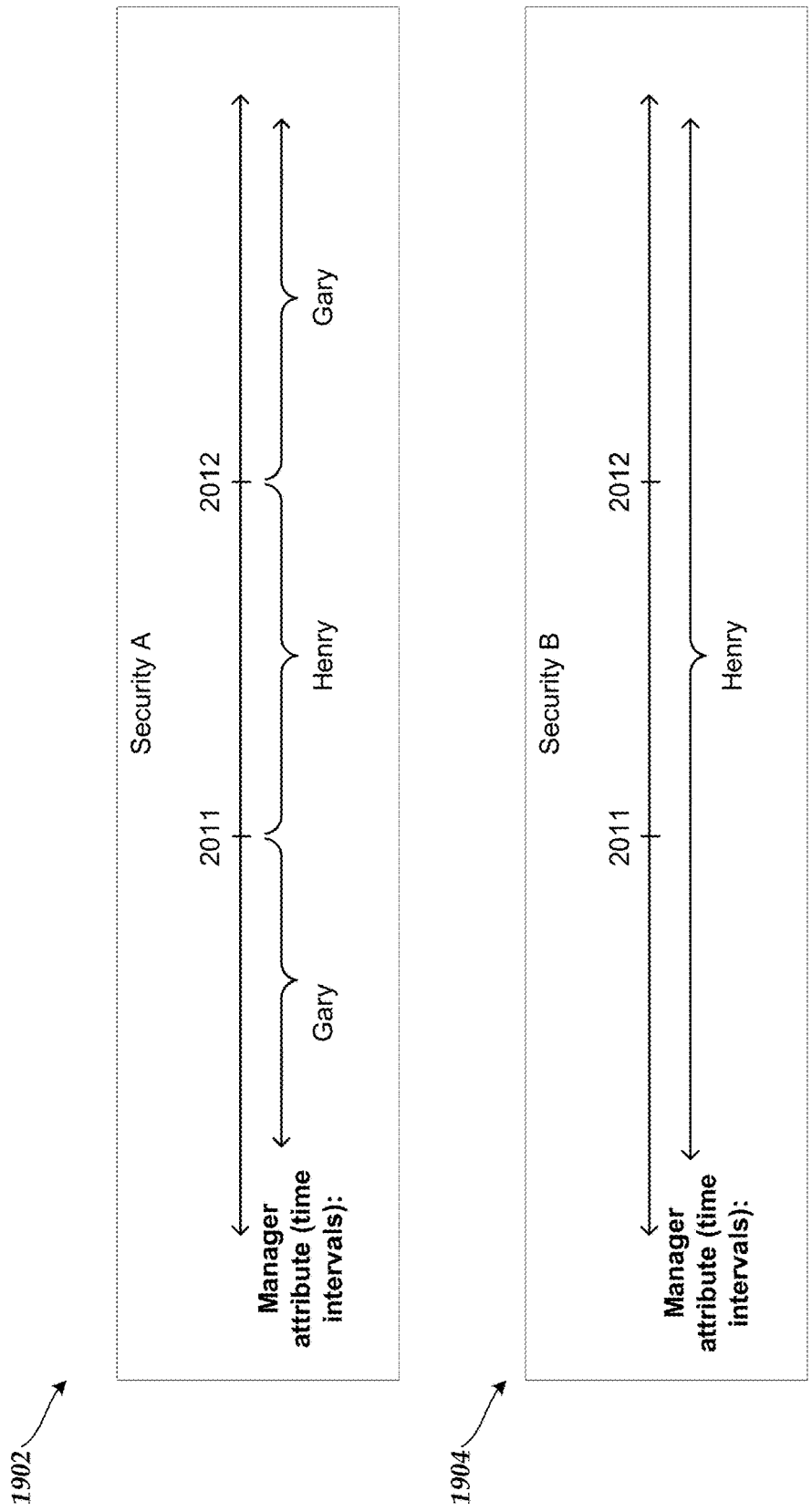
FIGS. 19A-19B illustrate example manager attribute information that may be associated with assets.

When a single value is provided for an attribute, the attribute is applied to the security (or other data item) for all time periods. However, in some embodiments the user may specify multiple values corresponding to various time periods for a given attribute. Such varying attributes are referred to herein as time varying attributes. Time varying attributes may change at various points in time, and may be specified by the user and/or determined automatically by the system based on data received from external data sources. FIG. 19A illustrates example time varying manager attribute information that may be applied to the Securities A and B. The example time varying manager attribute applied to Security A is illustrated via timeline 1902. As shown, the value of the attribute from any time in the past up until 2011 is Gary, from 2011 to 2012 is Henry, and from 2012 until anytime in the future is Henry again. The example time varying manager attribute applied to Security B is illustrated via timeline 1904. As shown, the value of the attribute for all time is Henry. A single value specified for the attribute may be equivalent to setting a single value for an attribute that is not time varying. The example time varying attributes shown in FIG. 19A are simply for illustrative purposes. Any attributes may be stored by the system, with any number of values for any number of time periods. Additionally, as described above, attributes may be stored by the system by association with graph nodes and/or edges corresponding to the particular securities (and/or other data items) for which the attributes are given.

Figure 19B:
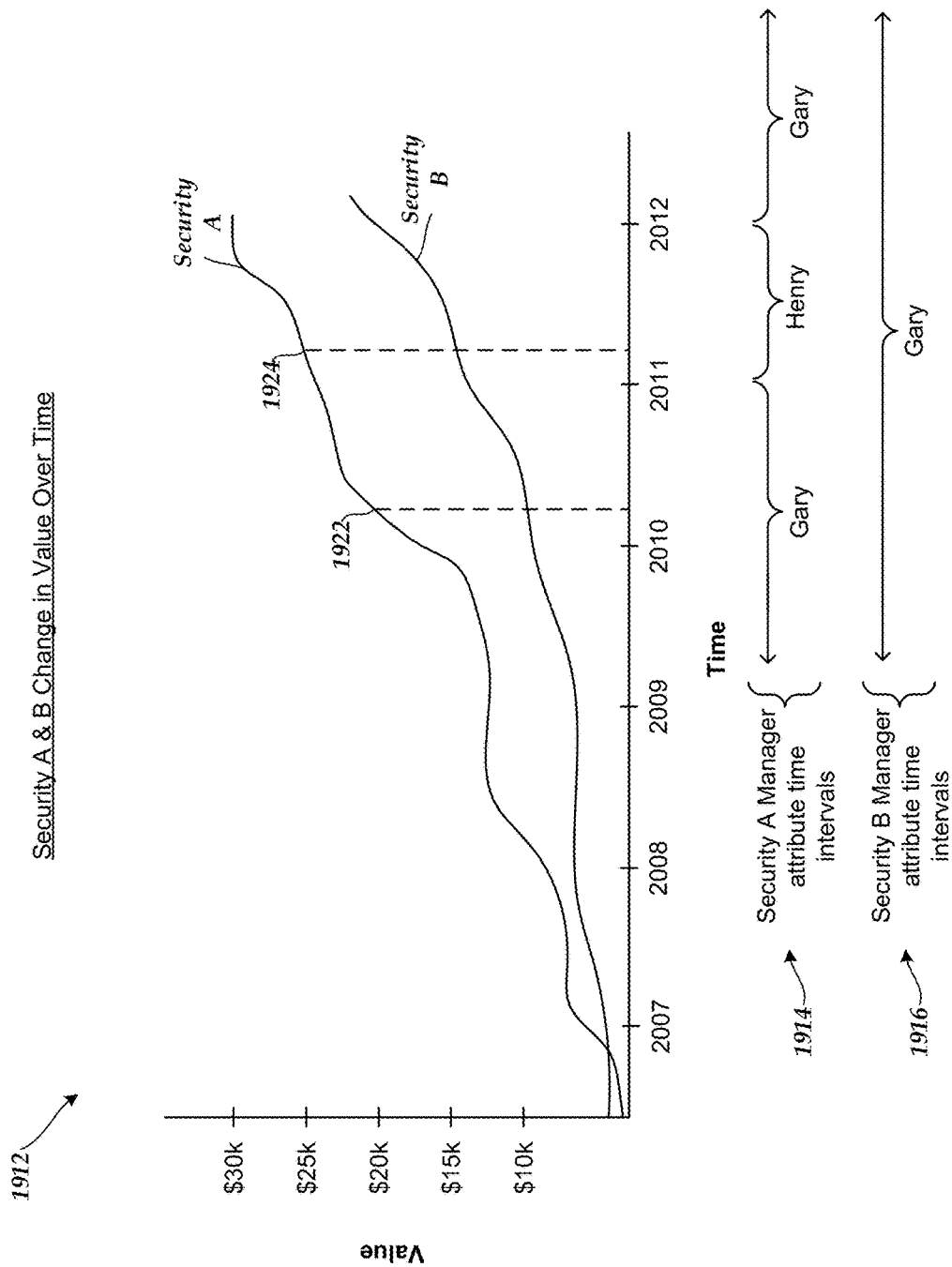

FIG. 19B illustrates an example graph 1912 showing values for each of Security A and Security B (as associated with Bob) over time. As shown, timelines 1914 and 1916 illustrate the time periods during which each security was under management of Gary or Henry with respect to the graph 1912. Dotted line 1922 illustrates an indication of the values of each of Security A and Security B as of 2010-04-15, $20,000 and $10,000 respectively. Similarly, dotted line 1924 illustrates an indication of the values of each of Security A and Security B as of 2011-04-15, $25,000 and $15,000 respectively. These example values are illustrated in the various example user interfaces described above and below.

Figure 20A:
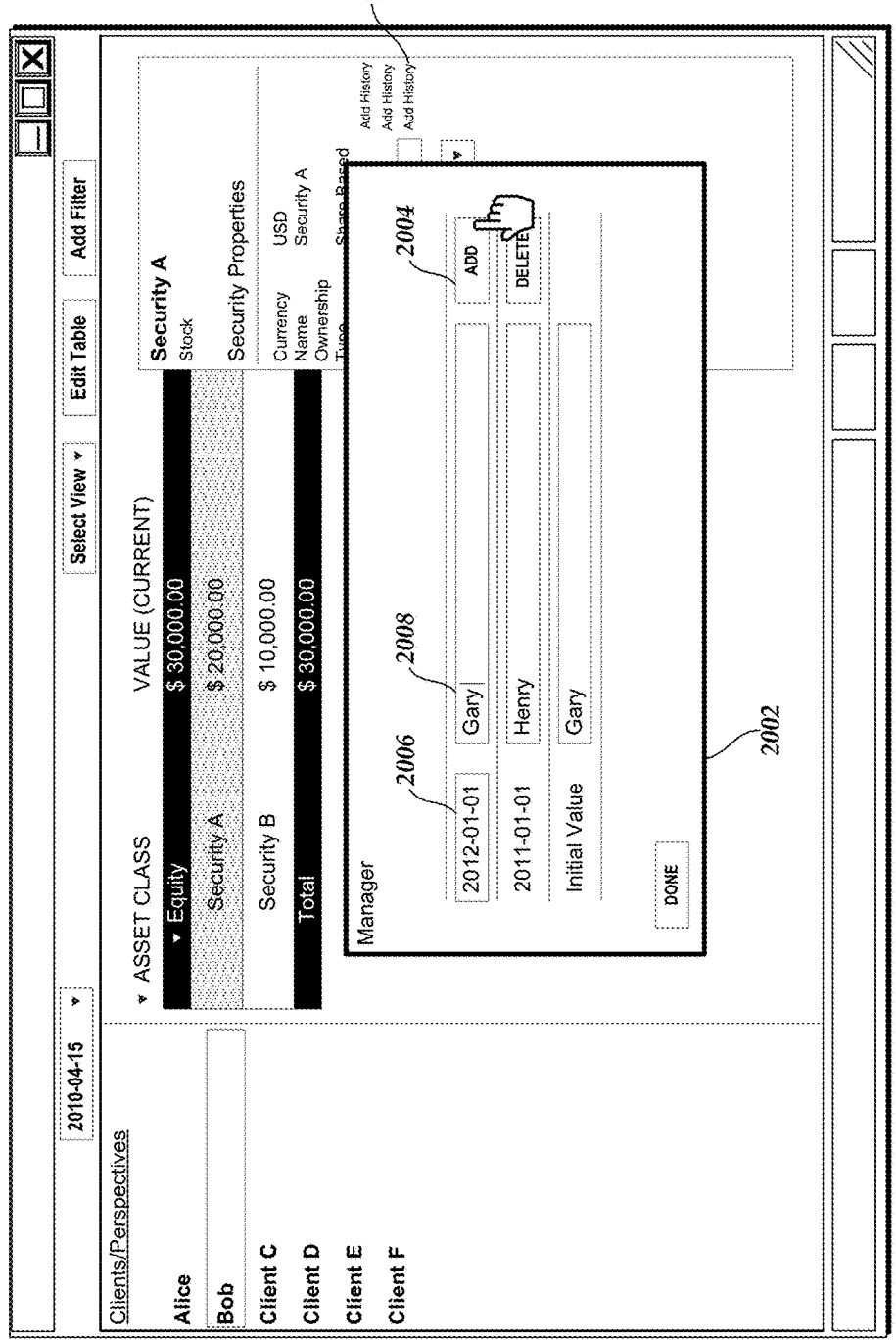

Returning to FIG. 18C, the user may specify time varying values for a given attribute by selecting, for example, Add History button 1844. FIG. 20A illustrates an example user interface of the system in which an options box 2002 is provided to the user in response to selection of the Add History button 1844. Via the options box 2002, the user may specify time varying values for a selected attribute. As shown, the user may specify a start date via box 2006 and an attribute value via box 2008 for the given start date. The user may add additional values and dates by selecting Add button 2004. Similarly, the user may delete entered values and/or add an arbitrary number of time varying values. It may be observed that the example values entered by the user in the options box 2002 correspond to the values of the example timeline 1902 of FIG. 19A, namely, the manager attribute is specified as Gary until 2011, Henry from 2011 to 2012, and Gary again from 2012 on.

While the present disclosure describes time varying attributes with a time period granularity of days (for example, the options box 2002 allows the user to specify start days for each value), in some embodiments the system may enable specification of time varying values at a finer granularity, for example, hours, minutes, and/or seconds. Similarly, when a finer granularity of time varying values is available, the user may additionally specify contexts with a similar fine time granularity.

Figure 20B:
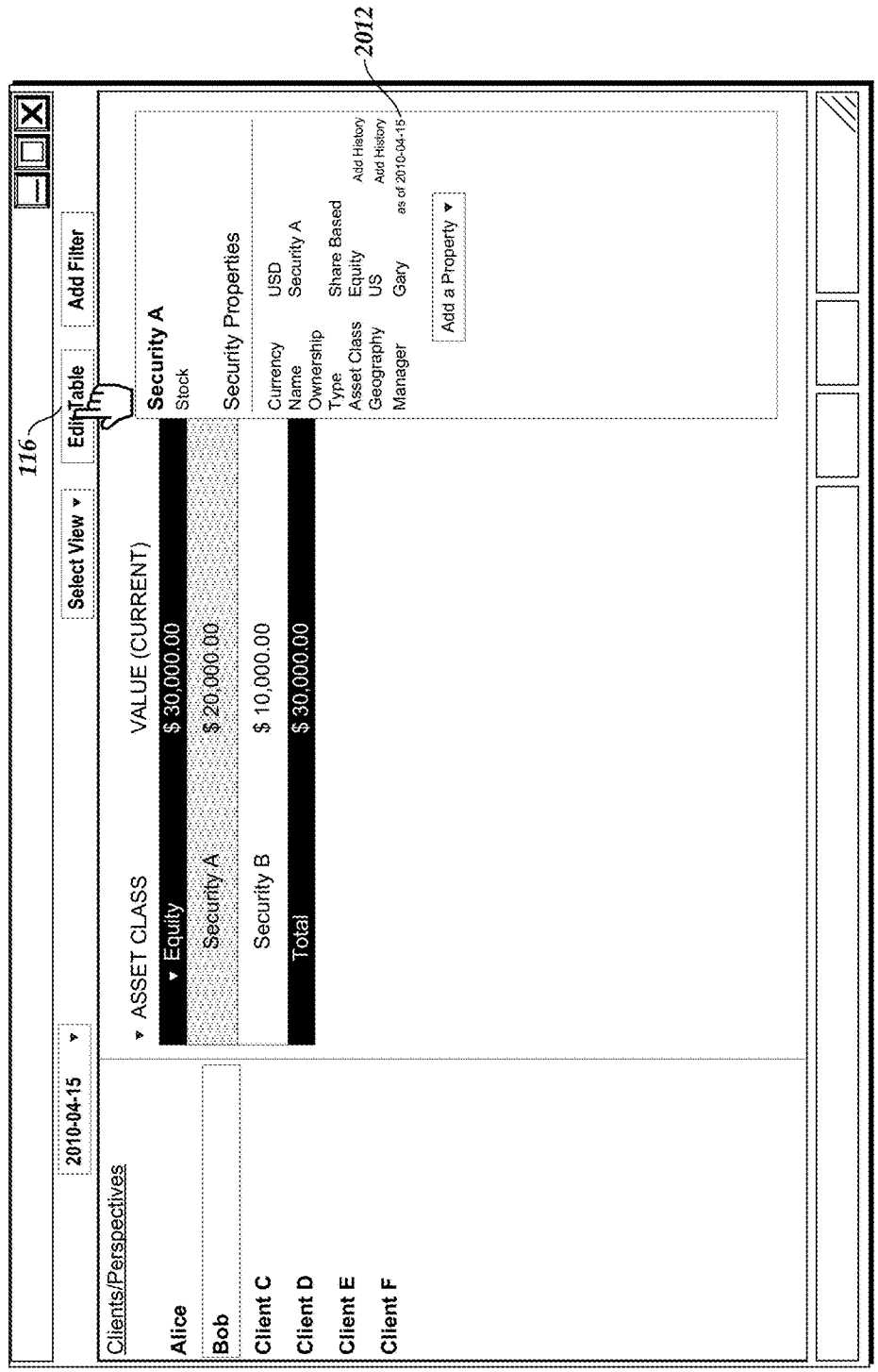

FIGS. 20B-20F illustrate example user interfaces of the system in which data is presented to the user in a table format based on the specified time varying manager attribute information described in reference to FIG. 19A. As shown in FIG. 20B, the value of the Manager attribute 2012 of the selected security (Security A) is indicated in the sidebar for the date specified by the given context. In this example, the date specified is 2010-04-15. Accordingly, the value of the Manager attribute at that time is Gary.

Figure 20C:
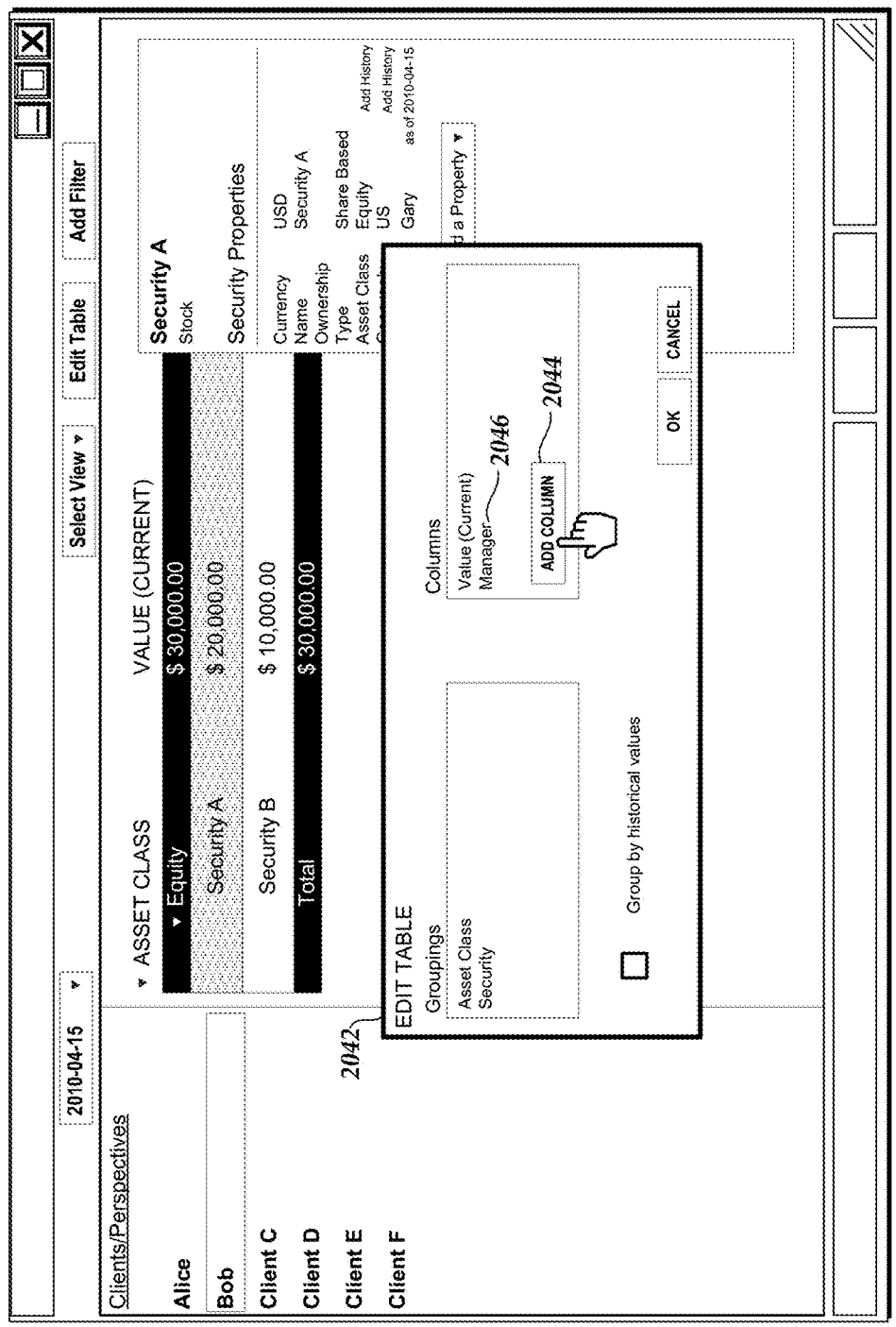
Figure 20D:
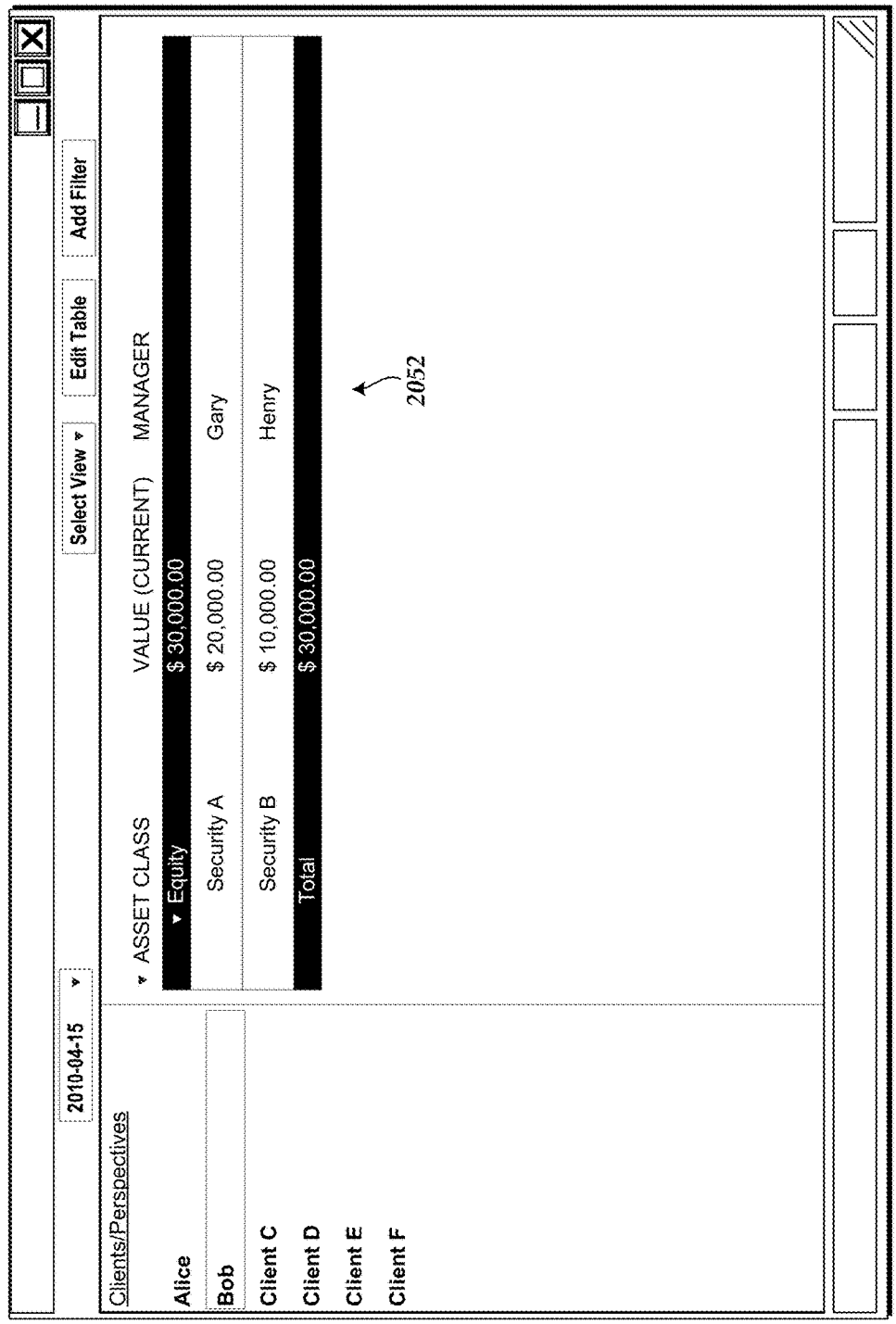

As shown, the user may select the Edit Table button 116 to add information to the table including indications of the Manager attribute. FIG. 20C illustrates an options box 2042 that is displayed by the system in response to selection of the Edit Table button 116. As described above, the user may edit the table via the options box 2042 so as to specify particular groupings of data presented (including a hierarchical arrangement of the groupings) and particular columns to be displayed in the table. As also described above, the specified columns correspond to metrics that are to be automatically calculated by the system (via, for example, graph traversal) and presented in the table. As shown, the user has selected an Add Column button 2044 and selected to add a Manager column 2046. In response to the selection, the system automatically re-traverses the graph and generates an updated user interface and table. FIG. 20D illustrates such an updated table in which Manager column 2052 has been added to the table. As shown, the values of the Manager attribute associated with each of Security A and Security B for the selected date (2010-04-15) are displayed in column 2052.

Figure 20E:
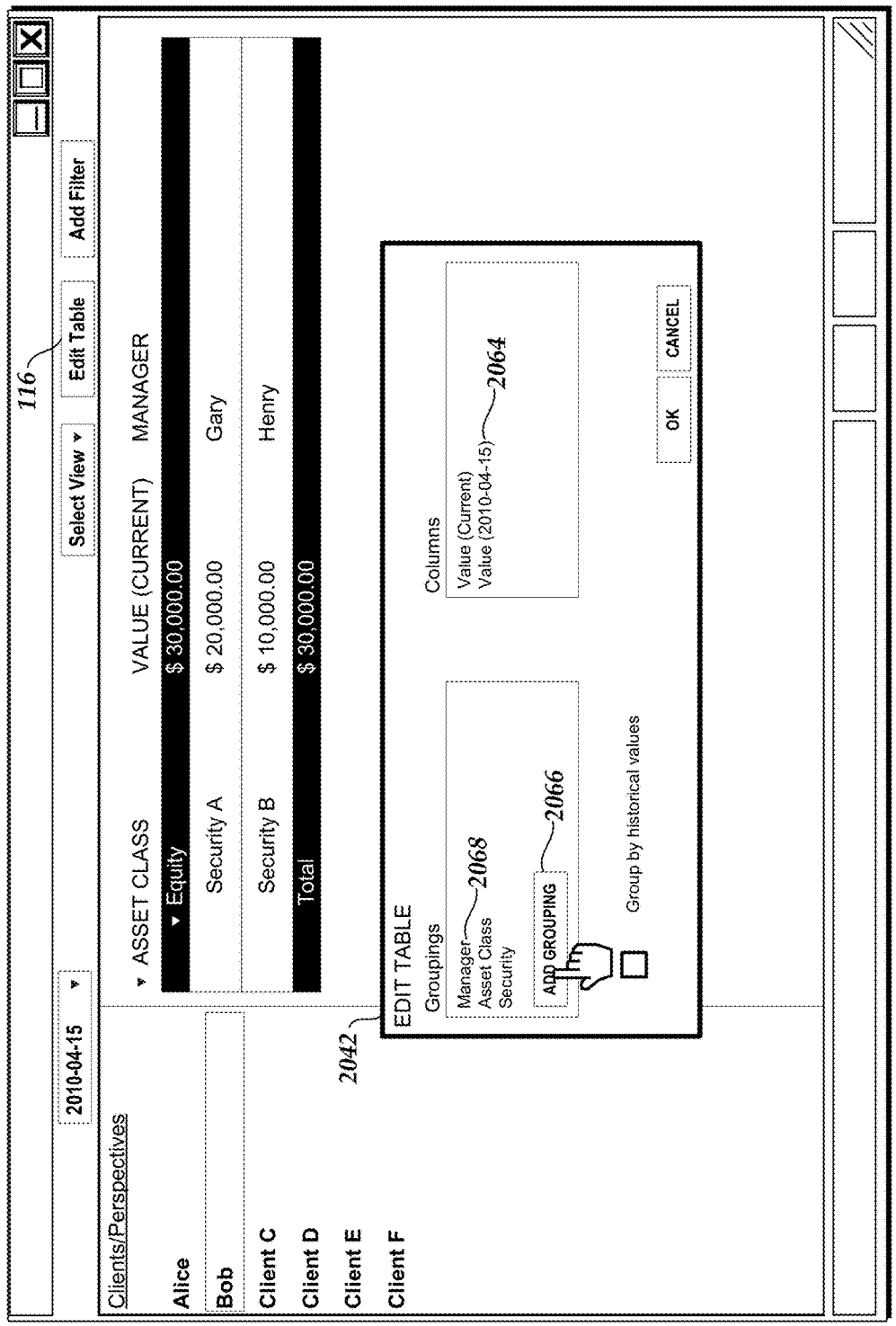

FIG. 20E illustrates an example user interface of the system in which the user is further specifying changes to the table via options box 2042. As shown, the user has, via Add Grouping button 2066, added Manager 2068 to the groupings and placed it at the top of the hierarchy such that the assets shown in the table will be organized first according to Manager, second according to Asset Class (also referred to herein as Asset Type), and third by actual Security. Additionally, the user has edited the displayed columns to remove the Manager column and add a column 2064 corresponding to Asset Value as of a particular date (in this example, 2010-04-15, the same as the date specified in the current context). In response to the user's selections, the system re-traverses the graph and updates the table to display the example user interface of FIG. 20F. As shown in column 2072, the assets (including Security A and Security B) of Bob are now organized in a hierarchical manner according to Manager and then Asset Type. Information is provided for the specified contextual data (in this example 2010-04-15). As the current selected date is the same as the date specified with respect to the metric of column 2076, the metric/column values displayed in the two columns 2074 and 2076 are the same. It may be observed that as Security A was managed by Gary as of 2010, Security A is categorized under Gary, while Security B is categorized under Henry.

Figure 21C:
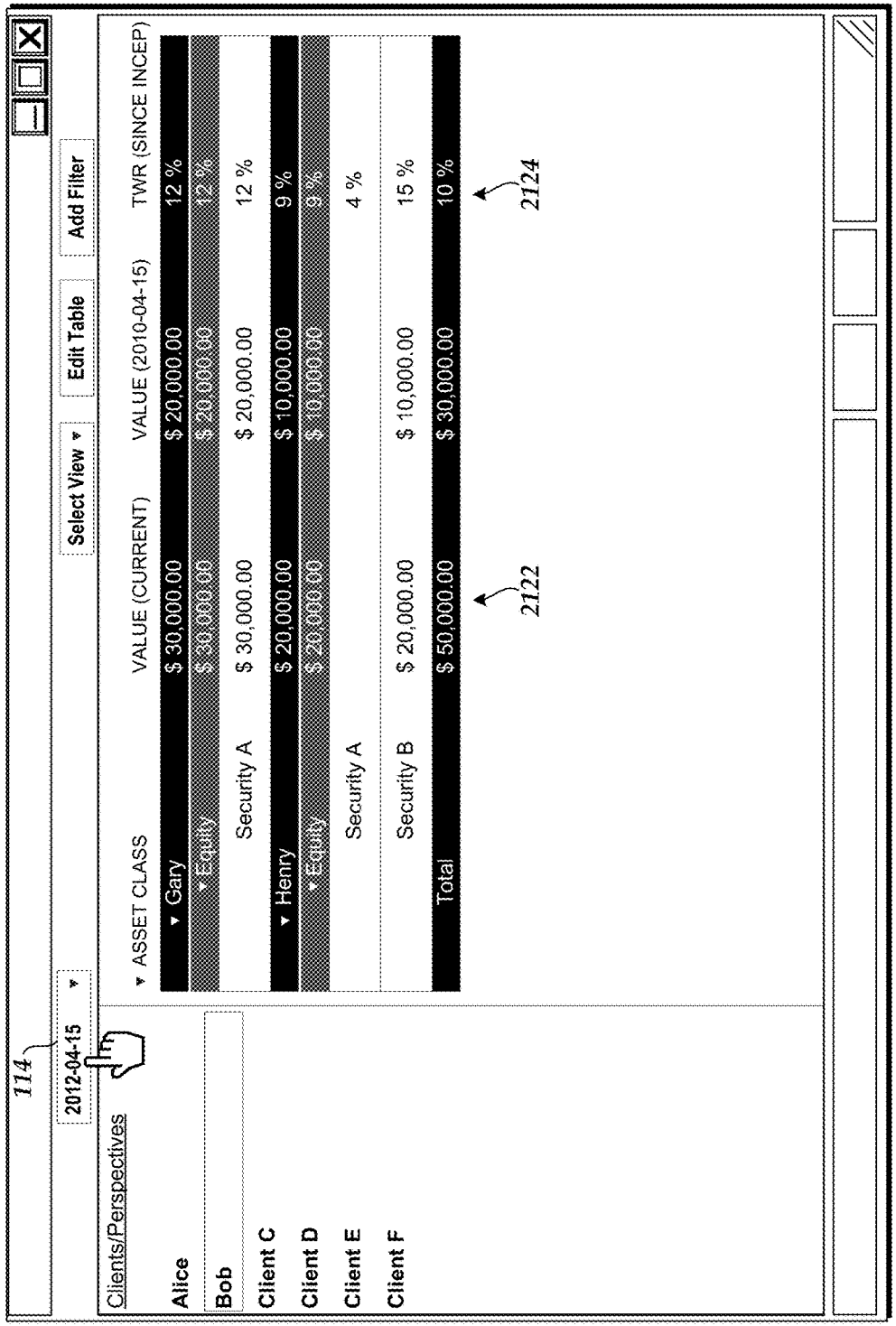

FIGS. 21A-21C illustrate additional example user interfaces of the system in which data is presented to the user in a table format based on the specified time varying manager attribute information described in reference to FIG. 19A. In FIG. 21A, the user may select the date selection box 114 to change the date of the displayed context. As shown, the user has changed the date to 2011-04-15. Accordingly, the system automatically and dynamically re-traverses the graph and updates the user interface including the displayed table. As shown in column 2102, as both Security A and Security B are managed by Henry in 2011, both are categorized under Henry. Additionally, the values displayed in column 2104 are updated based on the currently selected date, while the values displayed in column 2106 remain that same as shown in FIG. 20F. FIG. 21A is similar to FIG. 1A described above.

Turning to FIG. 21B, the user has again selected the Edit Table button 116 to cause the system to display the options box 2042. As shown, options box 2042 additionally includes a Group by historical values checkbox 2114, which the user has selected. In various embodiments, selection of the Group by historical values checkbox 2114 causes the system to automatically update the user interface (including the table for which the option has been selected) via re-traversal of the graph to provide a unique and compact display of time varying attribute information not otherwise shown for a given contextual date. For example, the user interface of FIG. 21A may be updated, upon selection of the Group by historical values checkbox 2114, to the user interface of FIG. 1B (also described above). As described above, although the selected date remains 2011-04-15, the assets shown in the table are organized according to their time varying attribute values (also referred to herein as historical values). Thus, in FIG. 1A, no asset value for Security A as of 2010-04-15 is displayed under Henry (see location 154), as Henry was not the assigned manager of that asset on that date. Similarly, no current asset value for Security A is displayed under Gary (see location 152), as Gary was not the assigned manager of that asset on the currently selected date.

Accordingly, selection of the Group by historical values checkbox 2114 causes the system to traverse the graph and calculate data based on time varying attributes associated with various graph nodes and/or edges, and display the calculated data in the user interface. Advantageously, display of time varying data, according to some embodiments, provides a more accurate representation of information that was previously available. For example, while a given asset may currently be managed by a particular person, particular metrics may not be attributable to that person if the person was not actually the manager for the time period relevant to the metric. This advantage may be more clearly understood by reference to another example, as shown in FIG. 21C.

FIG. 21C illustrates the user interface in which another metric has been added to the table in column 2124 (namely, Time Weighted Return (TWR) since inception), and the contextual date has been updated by the user to 2012-04-15 (as shown in date selection box 114). As shown, column 2122 has been updated to indicate the asset values as of 2012-04-15, at which time Security A was again managed by Gary. However, a Security A row remains under Henry as the new metric of column 2124 (TWR since inception) spans the entire time period from the current contextual date to the beginning available data (which includes 2011-2012, the time period when Henry was managing Security A. It is notable that the values of the calculated TWR in column 2124 are attributable only to the time periods during which the particular assets were managed by each manager. Accordingly, it may easily be observed that the TWR of Security A during the time period it was managed by Henry is 4%, while the TWR of Security A during the time period that it was managed by Gary is 12%.

Figure 22A:
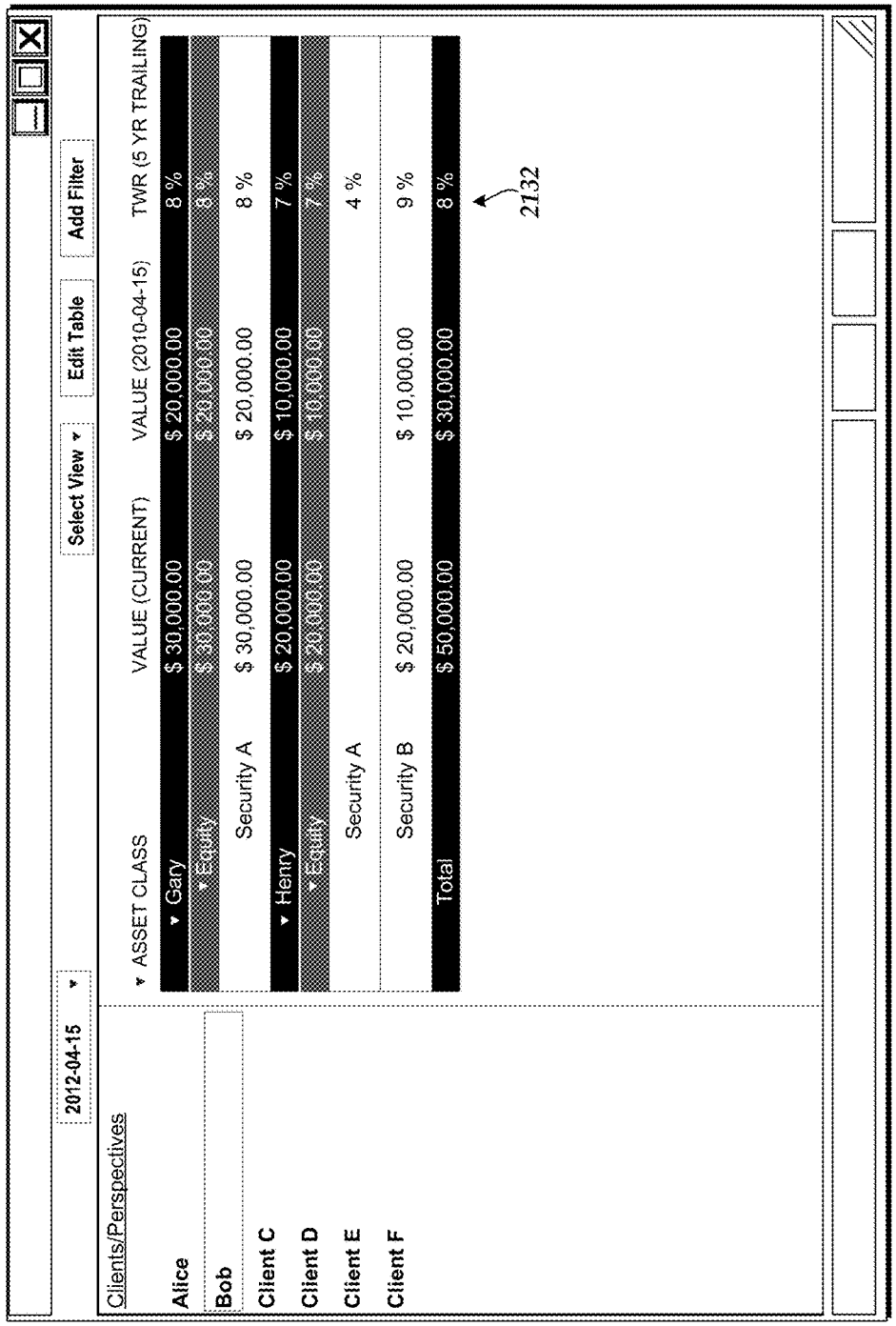
FIG. 22A illustrates yet an additional example user interface of the system in which data is presented to the user in a table format based on associated manager attribute information.

FIG. 22A illustrates another example metric in column 2132, namely TWR 5 year trailing. TWR 5 year trailing differs from TWR since inception in that the metric is only calculated over the five years previous to the currently selected contextual date. Accordingly, it may be seen that the values are generally different from the TWR since inception metric of FIG. 21C. However, it may be noted that the TWR 5 year trailing of Security A when managed by Henry remains the same, as the relevant time period, 2011-2012, remains the same under either metric. This may be better understood with reference to FIG. 22B.

Figure 22B:
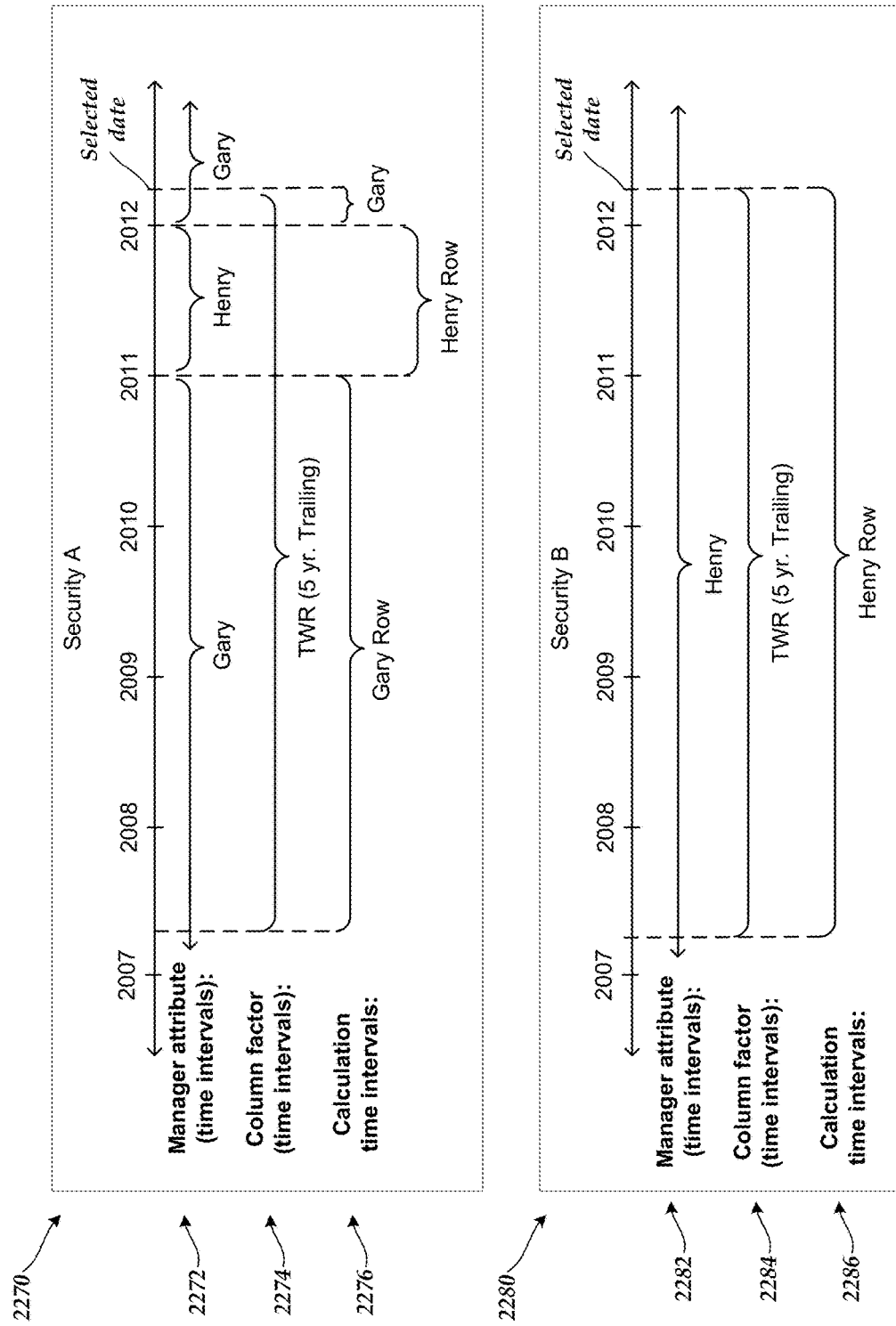
FIG. 22B illustrates calculation of time intervals based on attribute information associated with assets.

FIG. 22B illustrates calculation of time intervals based on attribute information associated with the assets, Security A and Security B. Timeline 2270 illustrates time intervals relevant to Security A when calculating the metric TWR 5 year trailing (as shown in FIG. 22A). Brackets 2272 show the time intervals associated with the time varying Manager attribute of Security A. These were described above in reference to FIG. 19A. It is of note that these time intervals are relevant to the calculation of TWR 5 year trailing for at least two reasons: 1. Because the user has selected to view the time varying information associated with the assets of the table (for example, by selection of the Group by historical values checkbox 2114); and 2. Because the table is grouped by the Manager attribute, which varies with time for at least one of the displayed assets. If either of these two conditions is not true, the calculation of time intervals described with reference to FIG. 22B would not be necessary for calculation of the given metric (TWR 5 year trailing). Brackets 2274 show time intervals associated with the given metric, in this example, the five year time period up to the selected data (in this example, the contextual date, or 2012-04-15). Brackets 2276 show time intervals corresponding to the intersection of the attribute time intervals and the metric (also referred to herein as the column factor) time intervals. These intersected time intervals are referred to herein as "calculation time intervals" or "calculation intervals" and they are used in the graph traversal process and calculation of the column values, as described below. It may be understood that the calculation time intervals correspond to rows of the table. For example, the time intervals 2007-04-15 to 2010-12-31, and 2012-01-01 to 2012-04-15 may be used to calculate the TWR 5 year trailing for Security A as managed by Gary, while the time interval 2011-01-01 to 2011-12-31 may be used to calculate the TWR 5 year trailing for Security A as managed by Henry.

Similar to timeline 2270, timeline 2280 illustrates time intervals relevant to Security B when calculating the metric TWR 5 year trailing. Bracket 2282 shows the time interval associated with the Manager attribute of Security B. Bracket 2284 show time interval associated with the given metric. And bracket 2286 shows the time interval corresponding to the intersection of the attribute time interval and the metric time interval. As described above, the calculation time interval 2286 is used in the calculation of the metric/column factor for Security B when managed by Henry.

Figure 22C:
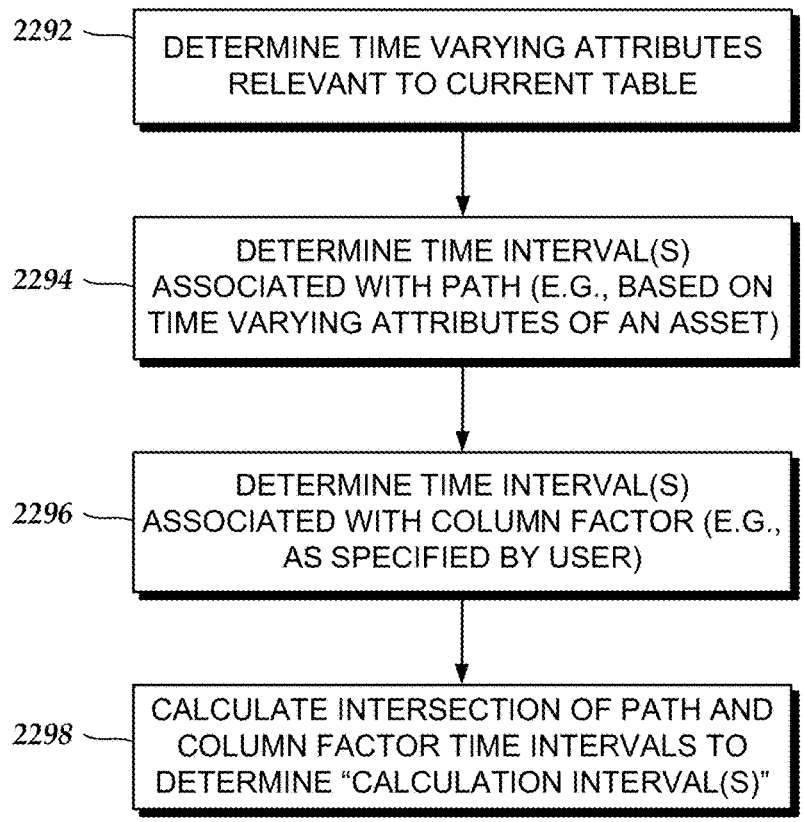
FIG. 22C is a flowchart showing an example method of the system in which time intervals associated with a given path and metric are calculated.

FIG. 22C is a flowchart showing an example method of the system in which time intervals associated with a given path and metric are calculated. In various embodiments, fewer blocks or additional blocks may be included in the process of FIG. 22C, or various blocks may be performed in an order different from that shown in the figure. Further, one or more blocks in the figure may be performed by various components of the system as described above and below, for example, one or more of view computation unit 106 and/or other aspects of the system.

At block 2272, any time varying attributes relevant to the current table are determined. As described above, the calculation of metrics based on time varying attributes is only performed by the system if 1. the user has selected to view the time varying information associated with the assets of the table (for example, by selection of the Group by historical values checkbox 2114); and 2. the table is grouped by an attribute which varies with time for at least one of the displayed assets. Thus, for example, the system determines whether the table is grouped by an attribute that varies with time for at least one of the assets of the table. If so, the process proceeds to block 2294.

At block 2294, the system determines any time intervals associated with the given path for which the metric is being calculated. For example, as described above, paths in the mathematical graph may generally correspond to rows of the table. Accordingly, time intervals associated with the path may be determined such that the given metric may be calculated with respect to the table row. An example is illustrated in FIG. 22B with brackets 2272 in which time intervals are determined for the time varying manager attribute for Security A (Security A corresponding to a row of the table/path in the graph). As is described below in reference to FIG. 22D, block 2294 is performed for each of the enumerated paths in the graph such that metric calculations may be performed with respect to each row of the table. It may be understood that there may be not time intervals associated with a given path. For example, with respect to Security B of FIGS. 22A-22B, there is not time interval associated with a Gary value of the manager attribute (because, for example, Gary never managed Security B). Accordingly, ultimately the calculated metric is going to be void, and the system may, in some embodiments, leave a blank space in the table for the value, or omit the path/row completely (as is the case in FIG. 22A as no relevant calculations pertain to Security B as managed by Gary).

At block 2296, the system determines any time intervals associated with the given metric/column factor. An example is illustrated in FIG. 22B with brackets 2274 in which time intervals are determined for the TWR 5 year trailing metric. As is described below in reference to FIG. 22D, block 2296 is performed for each of the metrics/column values of the table such that metric calculations may be performed with respect to each column of the table.

At block 2298, the system calculates the intersection of the path time intervals and the column factor/metric time intervals to determine the "calculation intervals" for the given path and metric. An example is illustrated in FIG. 22B with brackets 2276 in which calculation time intervals are calculated for TWR 5 year trailing of Security A for each of two paths: Gary (2007-04-15 to 2010-12-31 and 2012-01-01 to 2012-04-15) and Henry (2011-01-01 to 2011-12-31).

Accordingly, as described in reference to FIG. 22C, the system may calculate "calculation intervals" for each combination of path and metric/column factor relevant to the table of the user interface.

Figure 23:
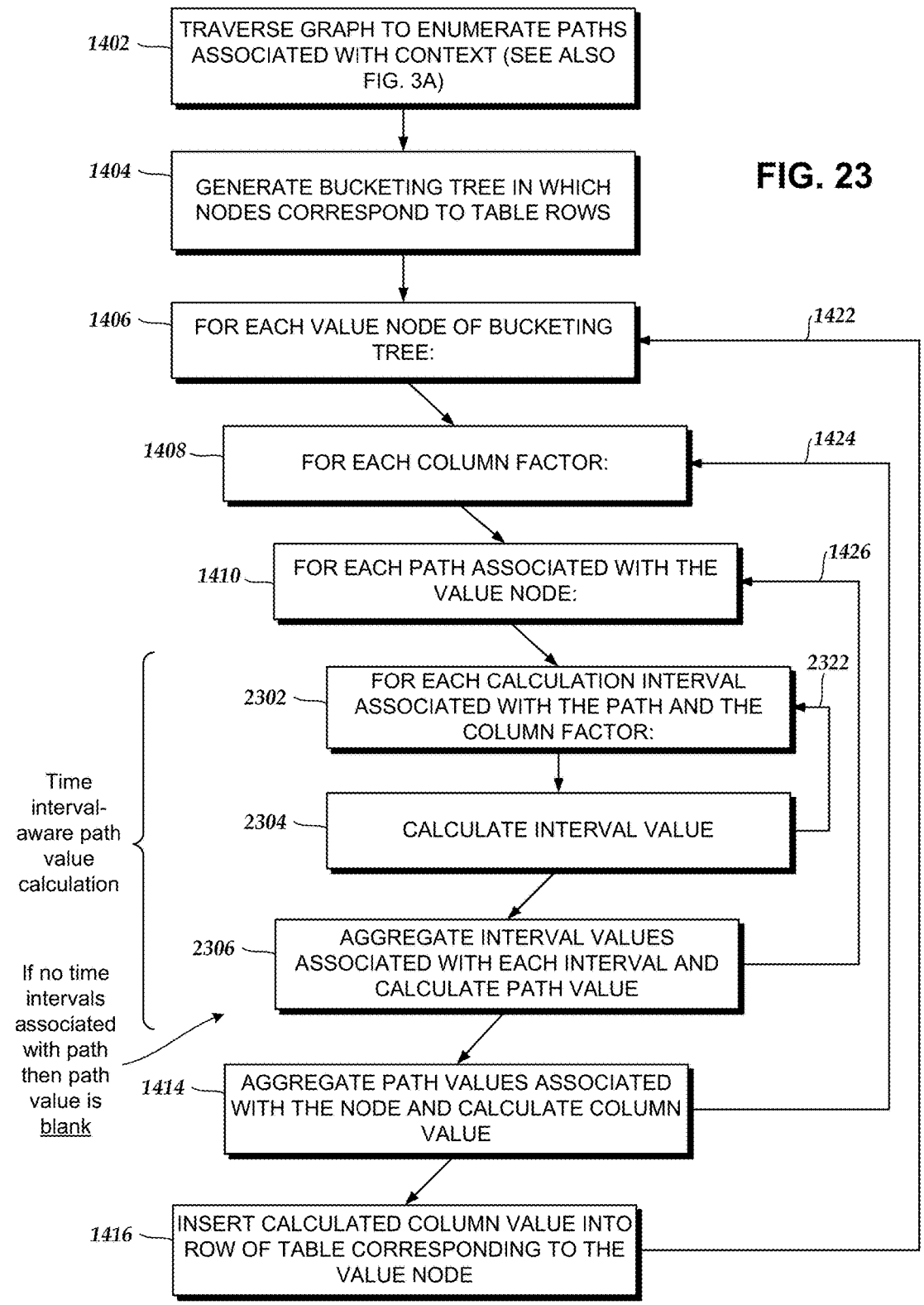
FIG. 23 is a flowchart showing an example method of the system in which a table is generated, including time varying attributes.

FIG. 23 is a flowchart showing an example method of the system in which a table is generated via graph traversal and column factor calculations, including time varying attributes. The flowchart of FIG. 23 includes many blocks similar to the flowchart of FIG. 14. However, additional blocks 2303, 2304, and 2306 of the flowchart of FIG. 23 enable the calculation and display of time varying data (examples of which are described above with respect to FIGS. 1B, 21C, and 22A). In various embodiments, fewer blocks or additional blocks may be included in the process of FIG. 23, or various blocks may be performed in an order different from that shown in the figure. Further, one or more blocks in the figure may be performed by various components of the system as described above and below, for example, one or more of view computation unit 106 and/or other aspects of the system.

Figures 24A, 24B:
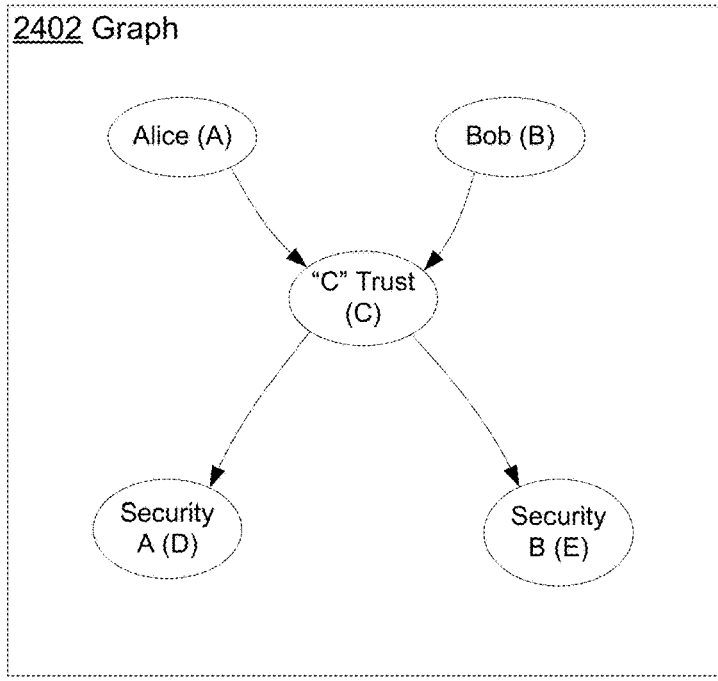
FIGS. 24A-24E illustrate an example traversal of a simplified graph, including time varying attributes.
Figure 24C:
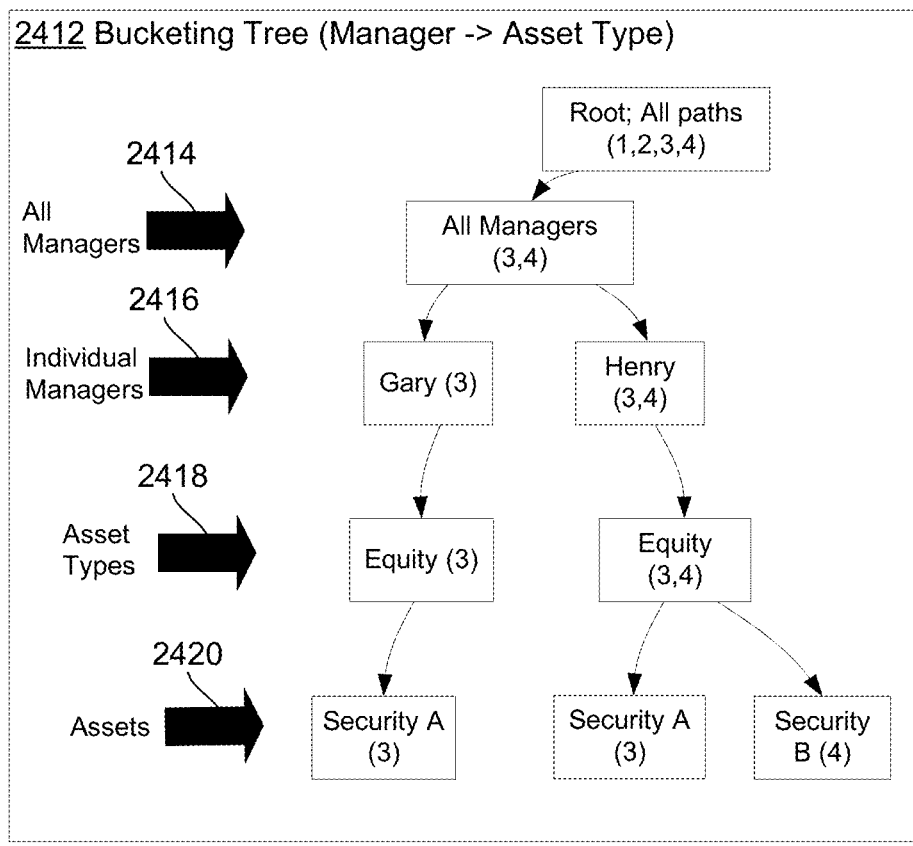

Blocks 1402, 1404, 1406, 1408, 1410, 1414, and 1416 proceed generally as described above with reference to FIG. 16. A simplified example of the process is illustrated by FIGS. 24A-24E with reference to simplified graph 2402 of FIG. 24A (similar to the simplified example of FIGS. 15A-15C). Briefly, at block 1402, the graph is traversed so as to enumerate all paths with respect to the selected perspective. In this example, the perspective is Bob, and the graph 2402 is traversed so as to enumerate the paths as shown in FIG. 24B. At block 1404, a bucketing tree is generated (as described above) based on the selected bucketing factors. In this example, the bucketing factors include a hierarchical arrangement of Manager and then Asset Type. Accordingly, an example bucketing tree 2412 is generated as shown in FIG. 24C. As shown, the paths are organized into various value nodes corresponding to rows that will be inserted in the table. Values nodes 2414 include all managers, value nodes 2416 include each value of the manager attribute found in the paths, value nodes 2418 include asset types found in the paths, and value nodes 2420 include each of the individual assets.

As described above, at blocks 1406, 1408, and 1410, each value node of the bucketing tree is processed so as to calculate each of the column values associated with that value node (see block 1416), each column factor associated with a given value node is processed so as to calculate the relevant column value, which relevant column value is calculated as each path associated with a given value node is processed so as to generate a path value (see block 1416) that may be aggregated to calculate the relevant column value (see block 1414).

Figures 24D, 24E:
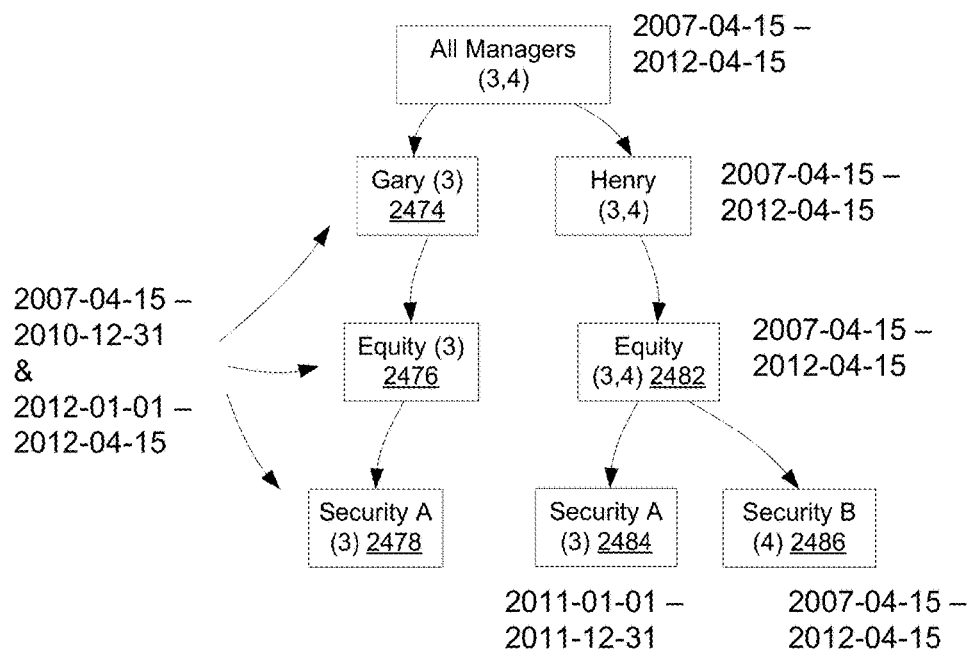

Within the processing of each path associated with a value node as shown in blocks 1410 and the loop arrow 1426, the path values are calculated in blocks 2302, 2304, and 2306 taking into account time varying attributes. In block 2302, first the calculation intervals associated with the given path and column factor are calculated as described in reference to FIG. 22C. This process is illustrated in the simplified example in FIGS. 24D and 24E. In particular, in FIG. 24D the time varying attributes relevant to the current table are determined (as described in reference to block 2292 of FIG. 22C). In this example, the only time varying attribute that is relevant is the Manager attribute. Then, in FIG. 24E, the calculation intervals are determined for each of the paths for the given column factors (as described in reference to blocks 2294, 2296, and 2298 of FIG. 22C). In the example of FIG. 24E, the given column factor is TWR 5 year trailing, and the calculations of each of the time intervals relevant to each path were described in reference to FIGS. 22B and 22C. For various values nodes of the bucketing tree associated with multiple paths, the intervals are further intersected. Thus, for example, the Henry value node 2480 is associated with both paths 3 and 4 as calculated with respect to value nodes 2484 and 2486, and thus the relevant calculation interval is 2007-04-15 to 2012-04-15 (as this is the intersection of 2011-01-01 to 2011-12-31 associated with value node 2484 and 2007-04-14 to 2012-04-15 associated with value node 2486). Similarly, each of values nodes 2474, 2476, and 2478 is associated with calculation intervals calculated as described above in reference to FIG. 22B (2007-04-15 to 2010-12-31 and 2012-01-01 to 2012-04-15).

Having calculated the calculation intervals associated with each combination of value node and column factor, in block 2304, for each calculation interval of the relevant value node and column factor being determined, an interval value is calculated. The interval value is calculated similar to the calculation of the path value described above in reference to block 1412 of FIG. 14. In particular, the relevant path of the graph is traversed and a path value is calculated based on attributes associated with relevant nodes and/or edges of the graph in the path, taking into account the calculation intervals. For example, suppose the TWR 5 year trailing of value node 2486 (of FIG. 24E) is to be calculated. The relevant paths include only path 4, and the calculation intervals including only 2007-04-14 to 2012-04-15. Accordingly, path 4 of the graph 2402 is traversed, including nodes B, C, and E, so as to determine, for Bob's investment in Security B, what the TWR is from 2007-04-14 to 2012-04-15. This calculation accounts for, for example, any incremental investments or sales made by Bob within the calculation interval (which are indicated by attributes associated with edges connecting Bob (node B) to "C" Trust (node C) and "C" Trust (node C) to Security B (node E) in graph 2402), and any changes in the value of Security B within the calculation interval (which are indicated by attributes associated with node B). Any other metrics may be calculated by the system as described above in an analogous manner for each applicable calculation interval.

At block 2306, the calculation interval values calculated in block 2304 are aggregated so as to determine a total path value. In the example above in which the path value is calculated for value node 2486, only one calculation interval is represented so no aggregation is needed (for example, the calculation interval value will be equal to the path value). Accordingly, the system determines a TWR 5 year trailing for Security B that is attributable to Henry (for example, 9% as shown in FIG. 22A). However, when multiple calculation intervals are associated with a path (as is the case with, for example, value node 2478) the calculation interval values for each are aggregated so as to determine a total path value. For example, in the case of TWR 5 year trailing for value node 2478, a value is determined for each time interval 2007-04-15 to 2010-12-31 and 2012-01-01 to 2012-04-15. Then the values are aggregated to arrive at a total TWR 5 year trailing for Security A that is attributable to Gary (for example, 8% as shown in FIG. 22A).

As described above, any metrics may be calculated by the system, and TWR and asset value are only provided as examples. Examples of other metrics include rate of return, IRR, cash flow, average daily balance, and/or the like. Various metrics may be associated with particular interval value aggregation techniques and/or path value aggregation techniques. For example, calculation of IRR for disparate time intervals may include calculation of IRR for each individual time interval (accounting for cash flows during those time intervals), followed by a designation of artificial cash flows for the start and end of each time interval such that and IRR across all the time intervals may be calculated. Other similar process may be applied to interval value aggregation and/or path value aggregation for various other metrics.

As mentioned above, when no calculation intervals are determined to be associated with a value node, no entry is provided in the table, and no value node may be represented in the bucketing tree (for example, no value node is included in the bucketing tree of FIG. 24E corresponding to Security A as managed by Gary).

Advantageously, according to some of the embodiments described herein, the same graph traversal process as described with reference to FIG. 14 may be adapted to account for time varying attributes, as described in reference to FIG. 23. In particular, the path value calculation process may be expanded to include consideration of time intervals associated with each path.

In some embodiments, values of time varying attributes associated with a particular data item may overlap. For example, a particular asset may be managed by two managers during a particular period of time, and also by each of the managers individually during other different periods of time. The graph traversal process in such embodiments proceeds as described above, however certain time intervals may overlap calculation interval determination.

Thus, the system advantageously, according to some embodiments, automatically calculates complex data based on time varying attributes via graph traversal. As described above, the user may advantageously edit the table so as to change the categorization, add or remove column factors, apply filters, and/or the like, and in response the system automatically and dynamically re-traverses the graph, calculates new data values, and updates the table of the user interface. No previous systems have been as powerful, flexible, and/or processor and memory efficient. Further, the system compactly presents complex time varying information to the user more efficiently than previous systems and methods.

While the present disclosure has largely described the system with respect to a Manager time varying attribute, it is to be understood that any other attribute may be time varying, and the table may be categorized according to any other attribute. As an example, a geographical time varying attribute may be applied to assets. For example, a particular stock may initially be considered a European stock. However, over time the stock may transition to being a primarily US stock. Accordingly, the geography attribute associated with the stock may vary with time, and the user may organize the table according to geography of assets (and thus metrics will be calculated by the system based on the time varying geography attribute). Numerous other examples may be provided and are intended to fall within the scope of the present disclosure.

8.0 Data Caching

In various embodiments the system may cache data generated by graph traversals so as to speed up computation of data for table generation and/or speed up graph traversals. For example, in various embodiments the system may automatically store enumerated paths, calculated bucketing trees, and/or calculated column values. Accordingly, the system may, in future graph traversals, and when no changes have been made to at least portions of the graph that would invalidate such caches, utilize such caches to speed up computations. Accordingly, in these embodiments the system may reduce computational needs and speed up generation of tables and user interfaces requested by the user.

In another example, the system may cache calculated calculation intervals, calculated calculation interval values, path values, and/or the like. Further, the system may automatically determine that two or more sets of calculation intervals are equal to one another. For example, calculation of the following two metrics have the same associated time intervals: Current IRR (wherein the current date range is 2001-2002) and IRR 1 year trailing (wherein the current date is 2002). The system may automatically determine that the two time intervals are the same, and may therefore cache calculation interval value calculations from one to be used with respect to the other.

9.0 Hardware Overview

According to various embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 25:
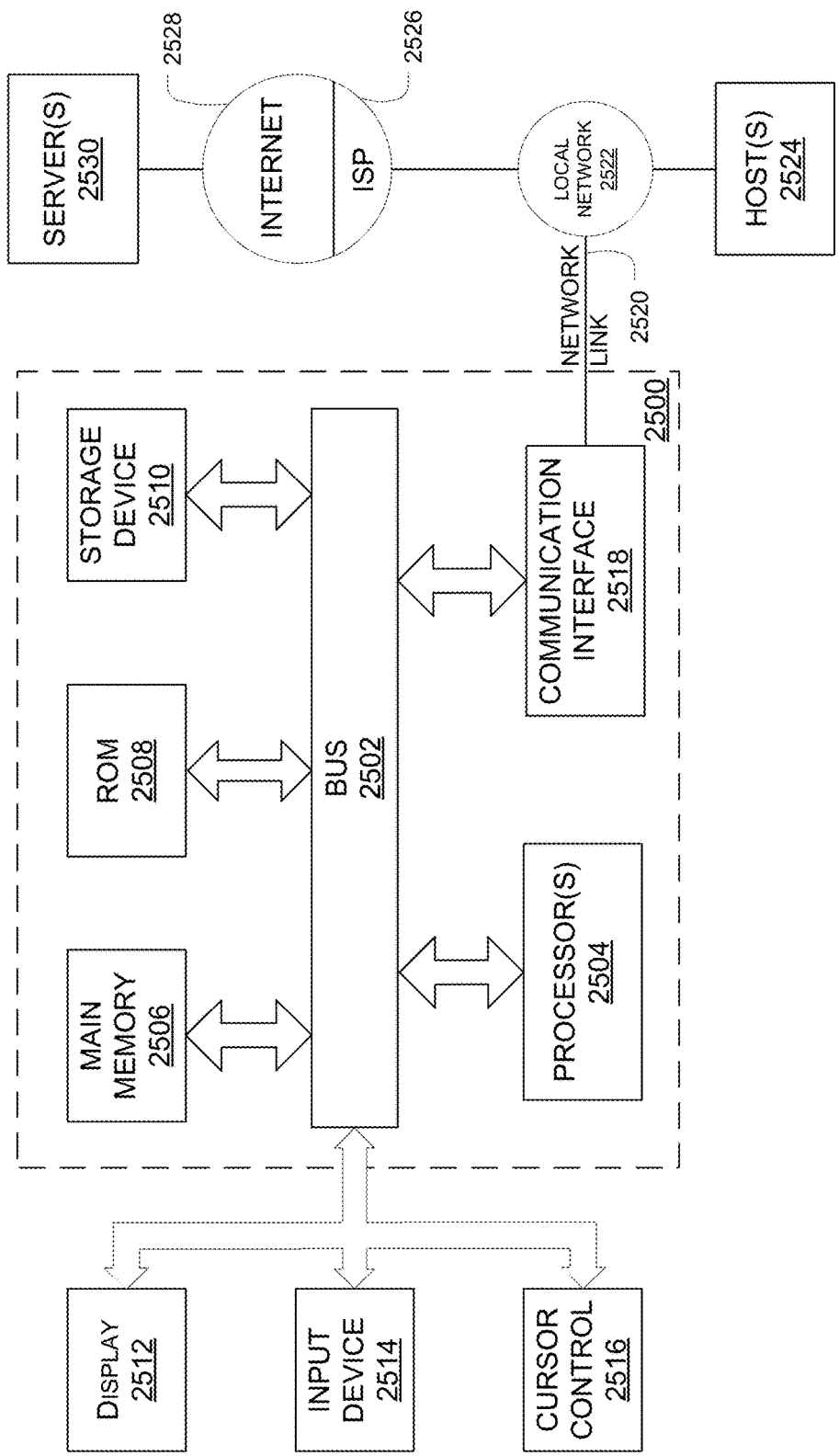
FIG. 25 illustrates a computer system with which various embodiments may be implemented.

For example, FIG. 25 is a block diagram that illustrates a computer system 2500 upon which various embodiments of the invention may be implemented. Computer system 2500 includes a bus 2502 or other communication mechanism for communicating information, and a hardware processor 2504 coupled with bus 2502 for processing information. Hardware processor 2504 may be, for example, a general purpose microprocessor. In various embodiments, one or more of the memory 200, data repository 204, table view 205, view computation unit 206, rendering unit 207, report unit 209, graph model logic 212, custodian interface unit 213, and/or the like, may be implemented on the computer system 2500. For example, the various aspects of the systems described in reference to FIG. 2A may be stored and/or executed by the computer system 2500.

Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Such instructions, when stored in non-transitory storage media accessible to processor 2504, render computer system 2500 into a special-purpose machine that is customized to perform the operations specified in the instructions.

Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 2502 to a display 2512, such as a cathode ray tube (CRT), for displaying information to a computer user. An input device 2514, including alphanumeric and other keys, is coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane.

Computer system 2500 may implement the techniques described herein using customized hard-wired logic, one or more ASICs or FPGAs, firmware and/or program logic which in combination with the computer system causes or programs computer system 2500 to be a special-purpose machine. According to one embodiment, the techniques herein are performed by computer system 2500 in response to processor 2504 executing one or more sequences of one or more instructions contained in main memory 2506. Such instructions may be read into main memory 2506 from another storage medium, such as storage device 2510. Execution of the sequences of instructions contained in main memory 2506 causes processor 2504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2510.

Volatile media includes dynamic memory, such as main memory 2506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2502. Transmission media can also take the form of acoustic or light waves, such as those generated during radio-wave and infra-red data communications.

Various forms of media may be involved in carrying one or more sequences of one or more instructions to processor 2504 for execution. For example, the instructions may initially be carried on a magnetic disk or solid state drive of a remote computer. The remote computer can load the instructions into its dynamic memory and send the instructions over a telephone line using a modem. A modem local to computer system 2500 can receive the data on the telephone line and use an infra-red transmitter to convert the data to an infra-red signal. An infra-red detector can receive the data carried in the infra-red signal and appropriate circuitry can place the data on bus 2502. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card, cable modem, satellite modem, or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams. The signals through the various networks and the signals on network link 2520 and through communication interface 2518, which carry the digital data to and from computer system 2500, are example forms of transmission media.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518.

The received code may be executed by processor 2504 as it is received, and/or stored in storage device 2510, or other non-volatile storage for later execution.

10.0 Distributed Architecture

The features described above, including calculating metrics (e.g., column factors), may, in some embodiments, be performed in a single computer device. For example, in some embodiments the graph, graph traversal, and metric calculations may be implemented via a single computing system. Such an arrangement may be advantageous, in some implementations, in that the entire graph (or a relevant portion of the graph) may be stored in memory of a single computing device, and may be traversed at that computing device.

In some embodiments, however, the features described above, including calculating metrics (e.g., column factors), may be performed by a plurality of computing devices in a distributed manner. In such an implementation, portions of the graph (which may or may not comprise exclusive portions) may be distributed across many computing devices, and graph traversal and computation of metrics may similarly be performed across many computing devices. Such an implementation is referred to herein as a "distributed system architecture." The distributed system architecture may include one or more distributed computing systems (e.g., each distributed computing system can communicate with a particular computing system (such as in a client-server model), each distributed computing system can communicate with each other, and/or the like). The distributed computing systems may each be in communication via one or more networks, either local or remote, which may include the Internet. Communications among the distributed computing systems may be via wired or wireless connections. One or more of the distributed computing systems may be located in a hosted computing environment, such as a cloud computing environment, and/or may comprise virtual instances of computing systems.

In order to implement metric calculations in a distributed system architecture, each of the metric (e.g., column factor) calculations of the system (e.g., the system 2602) may be associated with a "calculation graph" that indicates a series of related computations, and/or operations (e.g., logical operations), necessary to calculate the metric. A "calculation graph" includes one or more discrete "calculation nodes," connected by edges, that each indicate succinct computation steps in an overall process to compute a particular metric. In this specification, language to the effect of performing, or computing, a calculation node is to be understood to mean performing (e.g., by one or more systems) any calculations, computations, operations, identified by, in, or otherwise associated with, the calculation node. The edges in the calculation graph indicate relationships and/or data communication among the calculation nodes. Advantageously, a calculation graph provides a kind of "map" by which a metric calculation may be broken down into a plurality of discrete steps, each of which may or may not independently be distributed for faster and more efficient computation. As each of the computation steps may be independently distributed, computation of a metric via a calculation graph in a distributed system architecture may be sped up as compared to computation of the same metric in a single computing system.

Figure 26A:
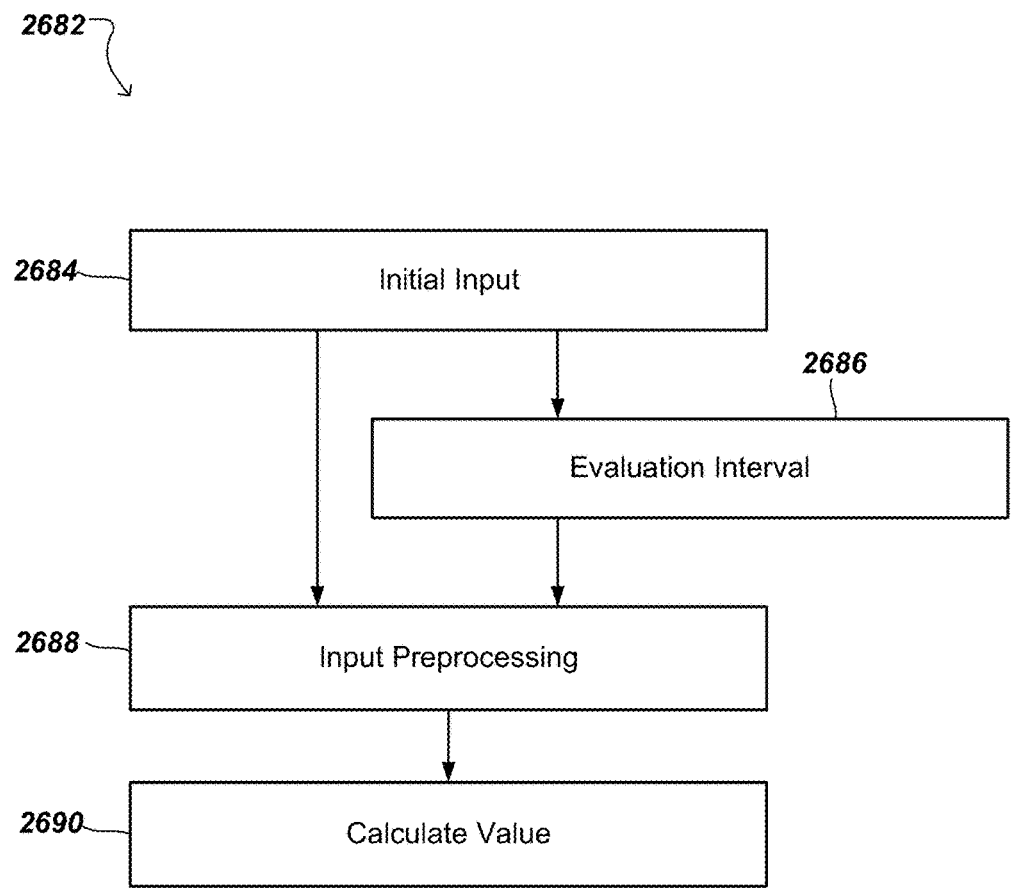
FIG. 26A illustrates an example of a simple calculation graph stored by the system.

FIG. 26A illustrates an example of a simple calculation graph 2682 stored by the system (e.g., system 2602, described below). The example calculation graph 2682 illustrates computation steps associated with a "value" metric calculation. Specifically, calculation graph 2682 includes four calculation nodes (2684, 2686, 2688, and 2690), wherein relationships among the calculation nodes (which also indicate data communications) are illustrated by edges. As shown, calculation of the "value" metric (e.g., a value of a security, a value of a group of securities, etc.) may be performed by reference to the calculation graph associated with the value metric.

The example calculation graph 2682 indicates four discrete steps that may each optionally be distributed (e.g., each discrete step may be computed using multiple distributed computing systems). In this simplified example, at calculation node 2684, the initial input may be received. The initial input may include, for example, one or more paths associated with the calculation to be performed. Identification of paths is discussed above, for example, in reference to FIGS. 14 and 15A-15C. Then, at calculation node 2686, the inputs (e.g., the paths) may be analyzed to determine an "evaluation interval" (e.g., the time period associated with the "value" computation). This calculation node 2686 may be distributed by, for example, sending each path, or subsets of paths, to different distributed computing systems for determination of relevant evaluation intervals associated with each (which may include, e.g., traversing each path in a portion of the graph on each distributed computing system). The results of the determinations may be then be combined back together in a single distributed computing system for comparison, such that a combined "evaluation interval" may be determined. The evaluation interval and the path information can then be provided to calculation node 2688, where certain preprocessing can be performed (and which may be performed in a distributed manner). The results of the preprocessing can then be provided to calculation node 2690, in which each path is separately traversed, based on the evaluation interval, and the results of each path traversal are aggregated for a final "value" metric calculation. Again, as with the other calculation nodes, calculation node 2690 may be distributed, such that individual paths (or subsets of paths) may be traversed on different distributed computing systems. Accordingly, the calculation graph 2683 provides a "map" for calculation of the "value" metric in a series of discrete computation steps, each of which may or may not be distributed.

Further examples of calculation graphs are described below in reference to, for example FIGS. 27A and 31-32.

Figure 26B:
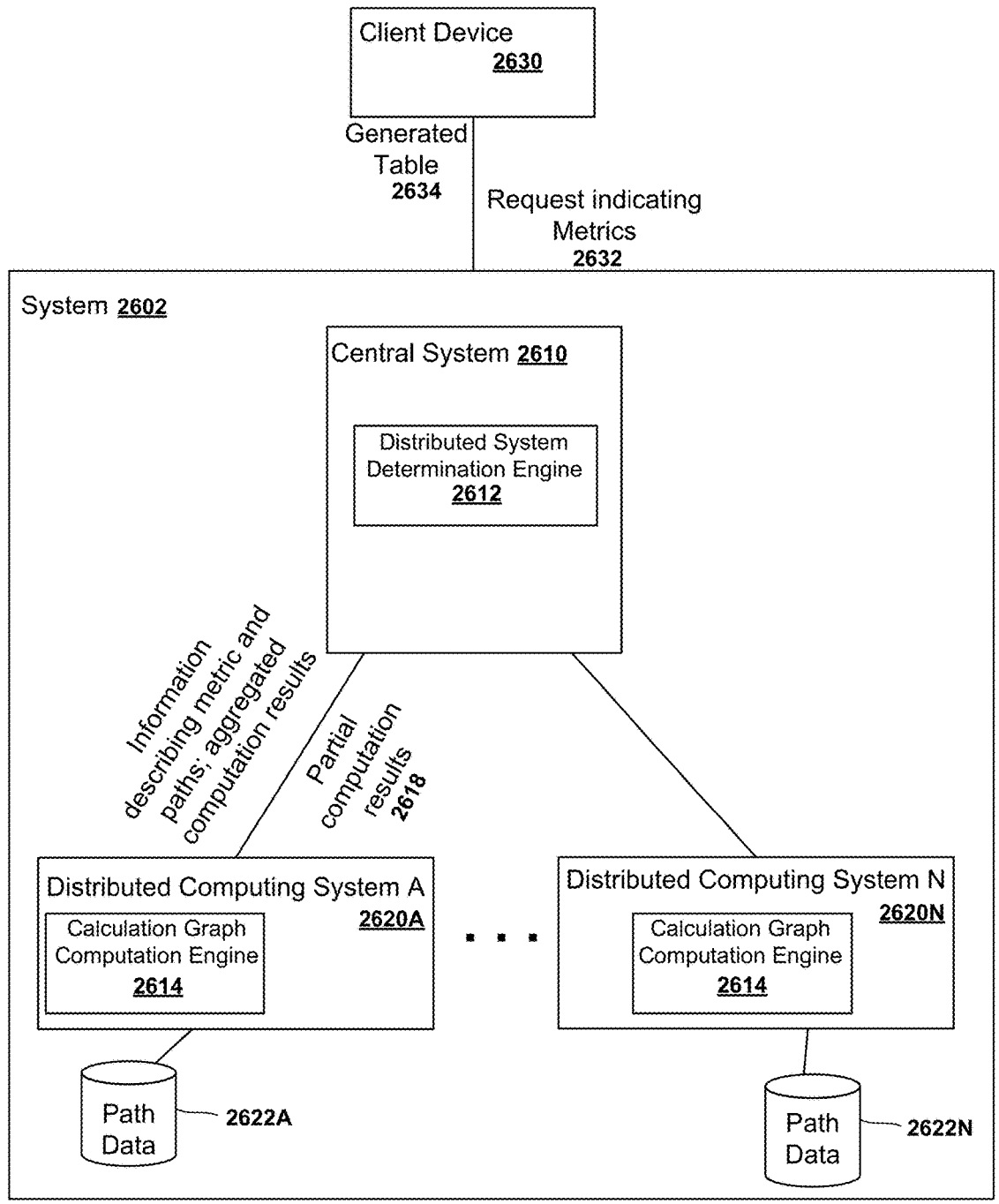
FIG. 26B illustrates an example of a distributed system architecture of the system.

FIG. 26B illustrates an example of a distributed system architecture of the system. In the distributed system architecture, each distributed computing system may compute portions of a computation to calculate a metric, and a particular computer system can aggregate the portions to obtain intermediate and/or final computation results.

As described above, when computing a metric for a row in a table, with the row identifying one or more paths (e.g., as described above with reference to FIG. 14), the system can traverse calculation nodes included in a calculation graph associated with the metric, and compute the metric utilizing information associated with the paths. Each calculation node of the calculation graph can either be a distributed calculation node, indicating that subsets of paths identified in a row can be provided to different distributed computing systems to be computed in parallel, or a non-distributed calculation node, indicating that multiple paths cannot be separated to perform the computations identified by the non-distributed calculation node. Therefore, computations identified in distributed calculation nodes do not depend on information associated with more than one path (e.g., there are no data dependencies between paths). Alternatively, calculations identified in non-distributed calculation nodes may depend on data from more than one path.

In another example of a metric, a particular metric can require determining a net value (e.g., net cash value) of all assets since an earliest time that any asset has been held (e.g., since inception). Thus, to determine the net value, an identification of the earliest time that any asset has been held is required. Since this earliest time can come from any asset, there is a data dependency between the associated paths for a row identifying the assets. However, as generally described above, and as further described below with reference to FIG. 27B, computing the above metric can be separated into succinct computation steps identified in two distributed calculation nodes, which can be included in a calculation graph for computing the net value. For instance, an initial distributed calculation node can determine an earliest time from any path, and provide the earliest time to a subsequent distributed calculation node that determines the net value of the paths. In this way, determining an earliest time can be determined for each path, or a subset of paths from the total paths, in parallel. Thereafter, computing a net value for each path, or a subset of paths, using the earliest time can be performed in parallel, and the computed results can be aggregated to arrive at the net value for all assets.

To compute a distributed calculation node, the system can partition, or otherwise separate, the paths identified in a row into multiple subsets of paths. Individual distributed computing systems can then operate on respective subsets of paths, and the computation results from each distributed computing system can be aggregated together to compute a final computation result.

The system may optionally be configured to avoid performing duplicate calculations. Duplicate calculations may occur, for instance, when paths associated with a row include one or more identical paths associated with other rows. The distributed system architecture may enable efficiency gains by saving bandwidth and memory usage associated with avoiding computations of duplicate calculations corresponding to same paths, for example through utilizing output values of already computed paths.

As described above, when computing rows, identifications of inputs associated with the rows can be obtained (e.g., the inputs can be translated into identifications of paths), and calculations can be performed utilizing paths (e.g., calculations to determine values of one or more metrics). The distributed system architecture can utilize the identified paths when computing a metric, and can optionally deduplicate identical paths identified in one or more of the rows of a table as a whole. In this specification, deduplicating rows includes computing paths only if the paths have not already been previously computed, and/or determining that two or more rows of a table include duplicate paths that may be computed a single time for all rows, rather than multiple times.

As an example of deduplicating path calculations, and referring to FIG. 15C described above, a first row may represent "all assets," a second row may represent "asset types," and a third row may represent "assets." The "all assets" row involves calculating values associated with input paths 3, 4, and 5 while a particular assets row (e.g., a row identifying Stock "D") involves calculating a value associated with path 3. The distributed computing system may calculate the "all assets" row (calculate a metric associated with paths 3, 4, and 5), and also the particular assets row (e.g., calculate a metric associated with path 3). Rather than calculating the value associated with path 3 twice (e.g., once for the "all assets" row and once for the particular assets row), the distributed computing system may deduplicate path 3 and calculate it only once. That is, the system may compute the "all assets" row, and when computing the particular assets row, obtain the already computed value of path 3 (e.g., computed during computation of the "all assets" row) and utilize the computed value (e.g., insert the computed value into a table identifying values of the metric for the rows). By deduplicating, the system can realize efficiency gains in computation, memory usage, and bandwidth usage. For instance, the system (e.g., central system 2610 as described below) can ensure that the distributed computing systems be called, for example, through remote procedure calls (RPCs), only as needed, thus reducing bandwidth requirements, processing requirements (e.g., the system can increase throughput of computing metrics, and handle more users and/or paths), storage requirements, and so on.

To increase the computation speed and efficiency of a distributed calculation node, each distributed computing system may, in some implementations, operate only on paths with associated information stored locally by the distributed computing system. In this way, the distributed computing system can access local storage (e.g., non-volatile memory connected locally to the distributed computing system, or a storage subsystem in communication with the distributed computing system over a local, or wide, area network) for information associated with a received subset of paths. To effect this increase in computation speed, each distributed computing system can store information associated with particular paths according to a particular storage process (e.g., data can be striped across the distributing computing systems at a particular level of a node in a graph; graphs are described above with reference to FIG. 3A), which will be described below with reference to FIGS. 29-30.

As described below, with reference to FIGS. 31-32, the system can provide a graphical representation of a calculation graph for display on a client device. The graphical representation can include nodes connected by edges, with explanatory information (e.g., text) of each node included in the graphical representation. As an example, each node can include an indication of an amount of overall computing, or processing, time that the system incurs when processing the node with respect to all other nodes in the calculation graph. The graphical representation can be zoomed into, such that a subset of the nodes are presented, or zoomed out of, such that additional nodes are presented. A user viewing the graphical representation can therefore quickly examine the overall flow of the computation of the associated metric, and identify whether an error exists in the calculation graph. Additionally, a user can identify particular nodes that are candidates to be distributed calculation nodes (e.g., based on a computing, or processing, time of the nodes).

FIG. 26B illustrates a block diagram of a system 2602 utilizing a distributed system architecture in communication with a client device 2630. The described system 2602 can implement the functionality described elsewhere in the specification, and can be analogous to, and implement the same functionality, as the computer system described above, with reference to FIG. 2A.

The system 2602 includes a central system 2610 that can receive a request 2632, from a client device 2630, for a generated table 2634 (e.g., a table as illustrated in FIG. 16), and provide the generated table 2634 for presentation on the client device 2630. As described above, and further described below, the generated table 2634 includes rows, identifying paths of a graph (e.g., the paths illustrated in FIGS. 15B-15C), and further includes one or more columns each associated with a metric (e.g., a computation such as TWR, net cash, Value as illustrated in FIG. 16).

To determine a metric for each row in the table, the central system 2610 can access a calculation graph (e.g., using a calculation graph computing engine 2614 that stores, or can access, calculation graphs) associated with the metric. As described above, the calculation graph includes calculation nodes connected by edges, with each calculation node identifying one or more computations, and/or operations, as part of a process to compute the metric. One or more of the calculation nodes in the calculation graph can be a distributed calculation node, indicating that the computations, and/or operations, identified in the distributed calculation node can be performed by distributed computing systems in parallel.

The central system 2610 is in communication with a multitude of distributed computing systems 2620A-N (e.g., over a network), and directs the overall process of computing a metric. As illustrated in FIG. 26B, and as an example, the central system 2610 and distributed computing systems 2620A-N are arranged in a client-server model, such that the central system 2610 directs the distributed computing systems 2620A-N to perform computations, and in response receives partial computation results 2618 for aggregation.

To compute a distributed calculation node in the calculation graph, the central system 2610 includes a distributed system determination engine 2612 that can separate paths identified in a row into subsets of paths, and can assign each distributed computing system to operate, in parallel, on a particular subset of paths. For instance, if a row identifies example paths 1-4, the distributed system determination engine 2612 can determine subsets of paths (e.g., a first subset can include path 1, a second subset can include paths 2-3, and a third subset can include path 4), and assign each distributed computing system to operate on a particular subset.

To effect this determination, the distributed system determination engine 2612 can access information identifying which of the distributed computing systems 2620 A-N store information associated with each path. The distributed system determination engine 2612 can then direct a distributed computing system to perform the distributed calculation node on a subset of paths that the distributed computing system stores (e.g., in database 2622A). In this way, the distributed computing system can obtain (e.g., from local storage such as database 2622A), information associated with a path, and perform the computations, and/or operations, identified in the distributed calculation node without requiring a network call to a network storage system for information associated with the path.

After determining distributed computing systems 2620 A-N to perform the distributed calculation node on subsets of paths, the central system 2610 can provide information describing the metric and the subsets of paths to each distributed computing system. Each distributed computing system (e.g., distributed computing system A 2620A) can then access a calculation graph associated with the metric (e.g., using the calculation graph computation engine 2614) and perform the computations, and/or operations, identified in the distributed calculation node using information associated with the subset of paths (e.g., obtained from local storage 2622A).

Since each distributed computing system computes the distributed calculation node on a subset of the paths, the distributed computing systems can provide the partial computation results 2618 back to the central system 2610, which can then aggregate the partial computation results 2618 to compute a final computation result for the distributed calculation node.

After computing the distributed calculation node, the central system 2610 can traverse to a subsequent calculation node, and compute a final computation result, until the entirety of the calculation graph has been traversed and a final result for the metric has been obtained.

Advantageously, the central system 2610 can optionally ensure that each path identified in any row is computed once (e.g., via deduplicating paths as described above). That is, the central system 2610 can monitor (e.g., maintain information identifying) paths that have been computed (e.g., paths computed for any row, for instance when determining a value of the metric for the rows), and for any row identifying a previously computed path, the central system 2610 can utilize the previously computed path (e.g., a computed value). For instance, the central system 2610 can cause determination of outputs (e.g., values) of each path, and for a particular row identifying paths, can utilize the outputs of the identified paths to combine (e.g., aggregate, such through summing of) the outputs, and thus obtain a value of the metric for the particular row. Additionally, for a row identifying one or more previously computed paths and one or more un-computed paths, the central system 2610 can remove duplicate paths, and the remaining paths (e.g., un-computed paths) can be transmitted to remote servers (e.g., Distributed Computing System 2620A of FIG. 26B) for computation. As an example, and referring to FIG. 16, the system can compute, for instance, a value of row associated with a "Total." The system can then utilize values (e.g., outputs) of the paths computed while determining the "Total" row, to quickly insert values into the remaining rows. For instance, "Stocks" row is the sum of row "Stock 'D'" and "Stock 'F'", and so on. In this way, the system can conserve processing time and power.

In some implementations, to compute a non-distributed calculation node, the central system 2610 can perform the computations, and/or operations, identified in the non-distributed calculation node without utilizing the distributed computing systems 2620A-N. Additionally, the central system 2610 can request information associated with each of the paths (e.g., from each distributed computing system storing information associated with a path) to perform the non-distributed calculation node. In some implementations, the central system 2610 can store, or maintain, information associated with all of the paths, so that the central system 2610 can avoid obtaining information associated with paths when performing the non-distributed calculation nodes.

Each distributed calculation node can be associated with information describing (1) inputs the calculation node utilizes, and optionally other information including (2) outputs, (3) steps associated with computing the calculation node, and so on. As described above, inputs can include paths, and optionally other input information such as an interval (e.g., an interval value over which the calculation is performed), a Boolean value, a value associated with a prior calculation node from which the distributed calculation node is connected via an edge, and so on. The information can be stored or maintained as an object (e.g., Java object), data structure, and so on, which identifies one or more of the above-recited information. This stored or maintained information (e.g., an object, data structure), can be provided from, for instance, the central system 2610 to one or more distributed computing systems, with the information identifying one or more paths each distributed computing system is to utilize. In this way, the information can encapsulate information usable by the distributed computing systems, and can provide a simple method of representing a calculation graph (e.g., the identified inputs of a calculation node can indicate dependencies on other calculation nodes, for instance through use of pointers, and so on). Additionally, the central system 2610 can therefore optimize the amount of data transmitted when computing calculation nodes, and ensure that the transmitted data is serializable. Instead of providing redundant or extraneous data, these objects, or data structures, allow the central server 2610 to provide a pre-determined minimal set of data that represents the required input for the requested calculations.

Figure 26C:
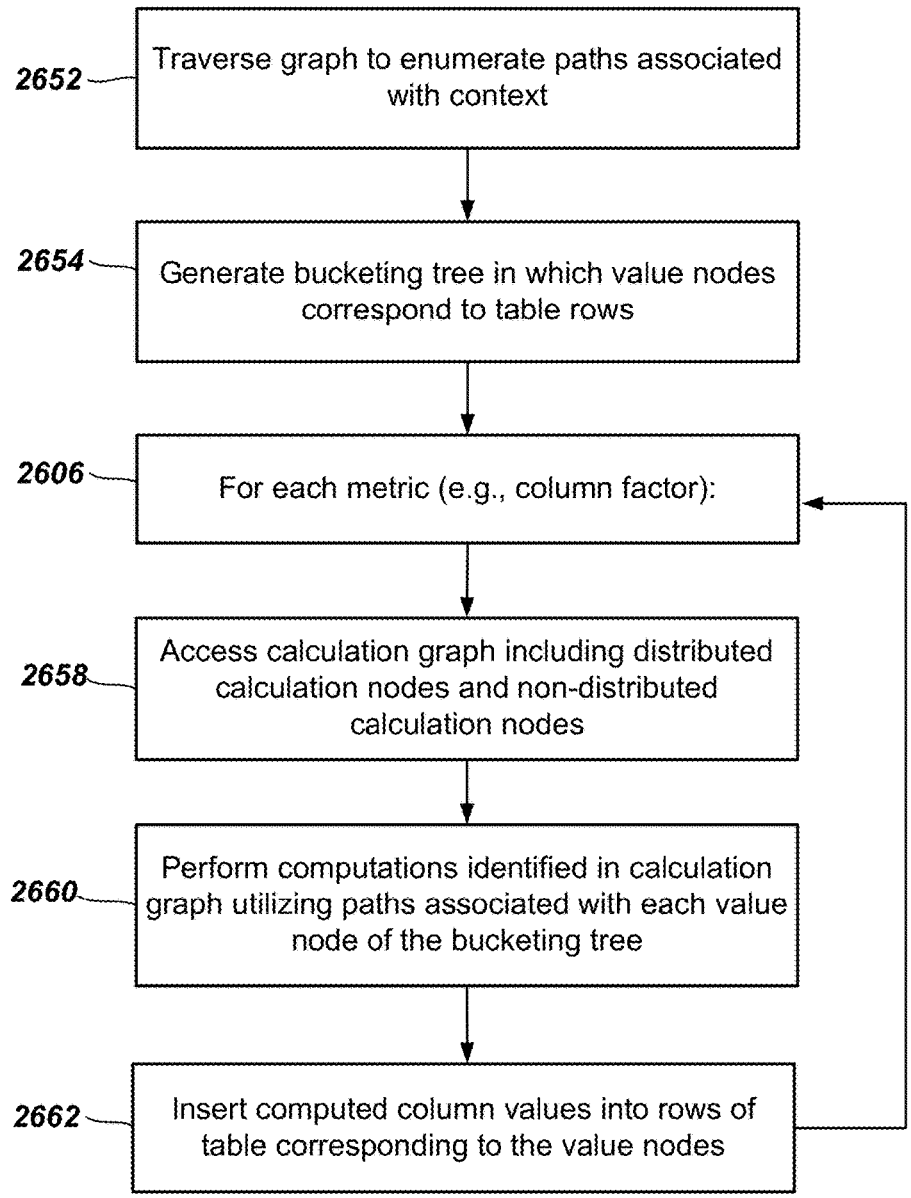
FIG. 26C is a flowchart showing an example process for computing metrics.

FIG. 26C is a flowchart showing an example process 2650 for computing metrics. For convenience, the process 2650 will be described as being performed by a system of one or more computers (e.g., the system 2602 using a distributed system architecture as described above).

The system traverses a graph to enumerate paths (block 2652). As described above in reference to FIG. 3A and block 1402 of FIG. 14, the system traverses the graph to enumerate all the unique paths from an initial node (e.g., a top level node associated with a perspective) to a node with no children (e.g., a lowest level node such as an asset). An example of a graph is illustrated in FIG. 15A, with a particular initial node being a person (e.g., Bob), and each node with no children being an asset associated with the person (e.g., Stocks D, F). The unique paths enumerated from the graph in FIG. 15A are illustrated, and described above, in FIG. 15B. In some implementations, enumeration of paths associated with a context may be accomplished in a distributed manner, e.g., by the distributed system architecture. For example, the distributed computing system may traverse the graph via the distributed computing systems A-N, wherein portions of the graph stored by each of the distributed computing systems A-N (as described herein) may be traversed such that the paths may be enumerated, as described above. Doing so may, in some implementations, increase the efficiency of enumerating paths by allowing each distributed computing system to individually traverse a particular part of the graph.

The system generates a bucketing tree in which value nodes correspond to rows in a table (block 2654). As described above, in FIG. 3B and block 1404 of FIG. 14, the system processes the unique paths according to a selected bucketing factor to create a tree (also referred to herein as a "bucketing tree"). The tree includes value nodes, with each value node identifying one or more of the unique paths. The tree is separated into levels of value nodes, with each subsequently lower level including value nodes that further segment the enumerated paths based on the selected bucketing factor. For instance, as illustrated in FIG. 15C, an initial node (e.g., a Root node) includes all of the paths illustrated in FIG. 15B, the subsequent lower level includes value nodes that segment the paths by asset type, and the subsequent lower level includes value nodes that segment the paths by particular asset.

Each value node included in the bucketing tree corresponds to a particular row in a table, with the table including one or more columns that intersect with each row. An example of a table is illustrated, and described above, in FIG. 16. The columns of the table indicate types of computations that can be computed for each value node, with each column being associated with a particular metric (e.g., "Value" as illustrated in FIG. 16). As described above, a metric can indicate a total value associated with all paths identified by a row (e.g., a total value of all assets), a total weighted return (TWR), and so on. A user can select one or more metrics that he/she is interested in, and the system can compute the metrics for each value node in the tree.

For each metric in the tree, the system accesses a respective calculation graph that includes distributed calculation nodes and non-distributed calculation nodes (blocks 2656-2658). As described above, a calculation graph defines computations associated with computing a particular metric. The computations are organized into calculation nodes that each identify one or more computations to perform using information associated with one or more paths. Each calculation node is connected by an edge to one or more other calculation nodes, and computation results from a calculation node are provided to subsequent calculation nodes connected via respective edges.

Therefore, for a particular metric, the system accesses an associated calculation graph (e.g., the system can store information describing calculation graphs) and computes the particular metric (block 2660). To compute the particular metric using the associated calculation graph, the system traverses the included calculation nodes, performing computations identified by each calculation node using prior computation results, and providing computation results to subsequent calculation nodes. Since each calculation node can, as described above, be a distributed calculation node or a non-distributed calculation node, the system can increase a computation speed (e.g., compared to computing the particular metric without a distributed system architecture) through the use of the distributed calculation nodes.

Upon the system traversing to a distributed calculation node, the system determines subsets of the paths included in a value node (e.g., a current row in the table), and provides information to distributed computing systems to perform the computations identified in the distributed calculation node using information associated with each path in a respective subset of the paths.

For instance, the tree illustrated in FIG. 15C includes a value node labeled "All Assets" which includes paths 3, 4, 5. A row in the table, illustrated in FIG. 16, that identifies paths 3, 4, and 5, is labeled "Total." When computing the metric (e.g., "Value" as illustrated in FIG. 16) for the row labeled "Total," upon traversing to a distributed calculation node in an associated calculation graph, the system can determine subsets of the paths (e.g., a first subset can include path 3, a second subset can include path 4, and a third subset can include path 5), and provide information to multiple distributed computing systems to compute the distributed calculation node, in parallel, using information associated with a respective subset of paths. That is, a first distributed computing system can perform computations, and/or operations, identified in the distributed calculation node using information associated with path 3, a second distributed computing system can perform computations identified in the distributed calculation node using information associated with path 4, and so on.

After a distributed computing system computes one or more results, the distributed computing system provides the computation result to the system (e.g., a central system 2610 as described above) for aggregation. Further to the example described above and illustrated in FIG. 16, the first distributed computing system can provide the computation result 20,000, the second distributed computing system can provide the computation result 30,000, the third distributed computing system can provide the computation result 20,000, and the system can aggregate (e.g., sum) the computation results to compute the computation result for the distributed calculation node (e.g., 70,000).

In this way, each subset of paths can be computed in parallel by different distributed computing systems, and the system can aggregate the results, and save overall time (e.g., reducing a time to provide the final computation result to a user). Since a distributed calculation node indicates that there are no data dependencies between paths, computation results for each path can be stored, and re-used, by the system or a distributed computing system. Therefore, computations identified in a distributed calculation node need only be performed once for each path. For example, when computing a distributed calculation node for all of the paths (e.g., the row labeled "Total" in FIG. 16), the computation results for each path can be stored (e.g., by the distributed computing system that performed the computations, or by the system which receives the computation results). Subsequently, when computing a distributed calculation node for less than all of the paths (e.g., the row labeled "Stocks" in FIG. 16), the system can aggregate the already computed results for the paths (e.g., without processing the paths again). Alternatively, the system can first compute a distributed calculation node for less than all of the paths, and later compute the distributed calculation node for all of the paths by aggregating the already computed paths. In some implementations, the system can determine to compute all of the paths initially, or less than all of the paths initially, based on an estimated, or historical, time to compute all of the paths. That is, if the time to compute all of the paths exceeds a threshold (e.g., 50 ms, 500 ms, 1 second), the system can prefer to compute less than all of the paths to more quickly provide results to a user. Storing intermediate values is further described below, with reference to FIG. 28.

Additionally, the system can reduce, or otherwise minimize, a frequency, or amount of times, that a distributed computing system is called (e.g., by the central system 2610). As will be described, the system can batch calls to distributed computing systems, reducing required bandwidth (e.g., network bandwidth) between the central system 2610 and distributed computing systems, and reducing latency associated with repeated calls to distributed computing systems.

As described above, the calculation graph may include calculation nodes that are either (1) executed locally (e.g., non-distributed calculation nodes) or (2) executed remotely (e.g., distributed calculation nodes). In an example without batching, when computing the calculation graph for a value node, the system can traverse the calculation graph until reaching a distributed calculation node, and can then call (e.g., provide information to) distributed computing systems to perform operations on subsets of rows identified in the value node. Since each value node corresponds to a row in a table, and there may be multitudes (e.g., hundreds, thousands, millions) of rows, distributed computing systems may be called, for instance without deduplication as described above, which can cause re-use of previously computed values a number of times equivalent to a total number of distributed nodes multiplied by a total number of rows. For example, the table depicted in FIG. 16 contains six rows, each corresponding to each of the nodes of bucketing tree 1512 (e.g., Bonds, Stocks, Bond "E", Stock "D", Stock "F", and Total). Computing each of the values identified in FIG. 16 may require one or more calls (e.g., a remote procedure call) to distributed computing systems to perform the calculations according to a number of distributed calculation nodes.

Thus, the system can optionally batch calls to distributed computing systems, for instance by causing a distributed calculation node to be executed once for the entirety, or a portion, of the rows. For instance, the system can compute the calculation graph for each row, or a subset of rows (e.g., a threshold number, such as a percentage, or a quantity, a user selectable amount), until traversing to a distributed calculation node. That is, for a first row the system can compute the calculation graph, for instance the non-distributed nodes, and upon reaching a distributed calculation node (e.g., a particular distributed calculation node, such as one that consumes greater than a threshold amount of processing time in the calculation graph), the system can store values that would be input to the distributed calculation node (e.g., store the values output from non-distributed calculation nodes that connect via edges to the distributed calculation node), for instance in a queue. For a second row, the system can similarly the compute the calculation graph until reaching the distributed calculation node, and similarly store the values (e.g., in a queue). The system can proceed for each remaining row, or a portion of the remaining rows, and store the values associated with the row (e.g., in a queue). Subsequently, once each row, or a portion of the rows, has been computed up until the distributed calculation node, the system can provide the computed values to distributed computing systems for computation, such that all of the rows, or a portion of the rows, can be computed via the same call to the distributed computing systems.

As an example, a first row can identify paths 1, 2, and 3, and the system can compute the calculation graph until traversing to a distributed calculation node, and can store values that would be input to the distributed calculation node (e.g., in a queue). Similarly, a second row can identify path 1, 3, and 5, and the system can compute the calculation graph until traversing to the distributed calculation node and store values that would be input to the distributed calculation node (e.g., in the queue). The system can then provide identifications of the paths for each row, and its associated computed values (e.g., as stored in the queue), to distributed computing systems, and receive output from the distributed computing node for both the first row and the second row. In this way, the system can reduce a number of times that the distributed computing systems are to be called, through batching input to the distributed computing systems. That is, the system can provide all the input used for each, or a portion of, the rows to the distributed computing systems.

Referring back to FIG. 16, the system can ensure that for each distributed computing node, the distributed computing systems are called once for all of the six rows. By using batching, the system may reduce bandwidth usage by reducing the number of RPC calls that are made to the distributed computing systems.

Furthermore, the system can intelligently re-use information, such that less than the full number of rows may require calls to distributed computing systems. For instance, the system can determine a minimum subset of rows that identifies every path (e.g., the subset identifies all of the paths spread across the subset of rows), and can compute the calculation graph for this minimum subset of rows up until a distributed calculation node. Once each of the subset of rows reaches the distributed calculation node, for instance through batching as described above, the system can call the distributed computing systems one time such that the subset of rows are computed via the same call. Subsequently, the system can continue computing the calculation graph, and once outputs for the subset of rows are determined (e.g., values of the particular metric associated with the calculation graph), values of the remaining rows can be determined using values for the computed paths. That is, as described above with respect to de-deduplication, the system can utilize previously computed output values for each path, such that the system can aggregate (e.g., sum) the previously computed output values for the remaining rows (e.g., for an example remaining row, sum the previously computed values of the paths identified by the example remaining row).

As will be described below, in some implementations information associated with each path can be stored by respective distributed computing systems. In these implementations, the system can direct distributed computing systems to perform computations, or operations, using information associated with paths that they store locally. In this way, the system can avoid each distributed computing system having to provide time-consuming, and network bandwidth consuming, requests for information associated with paths (e.g., over a network as a network call for data).

For a non-distributed calculation node, the system performs the computations, and/or operations, identified in the non-distributed calculation node using information associated with all of the paths identified in a present row. Since a non-distributed calculation node indicates data dependencies between the paths, the paths cannot be computed in parallel.

Similar to a distributed calculation node, in some implementations the system can store intermediate values computed during the processing of a non-distributed calculation node. For instance, to compute results using a non-distributed calculation node, information associated with each path can be required. For particular non-distributed calculation nodes that only include computations which are linear, the system can store intermediate values when computing the non-distributed calculation node. Afterwards, the system can utilize the intermediate values when computing the non-distributed calculation node for a different row. For instance, a first row can identify paths 1, 2, 3, 4, and 5. A subsequent row can identify paths 1, 2, 3, and 4. To perform the computations identified in the non-distributed calculation node using information associated with paths identified in the subsequent row, the system can extract the effect of path 5.

The system traverses the calculation graph, including distributed calculation nodes and non-distributed calculation nodes, until a final calculation node is traversed and computed (e.g., using computation results computed in prior calculation nodes).

The system then inserts the computed column values into respective rows of the table (block 2662). The system computes a metric for each row of the table, and inserts the computed results into respective rows. After computing results for a particular metric, the system accesses a calculation graph for a subsequent metric, and computes results for each row. Alternatively, in some implementations the system can compute all metrics for a row, and then move to a subsequent row and compute all metrics.

Figure 27A:
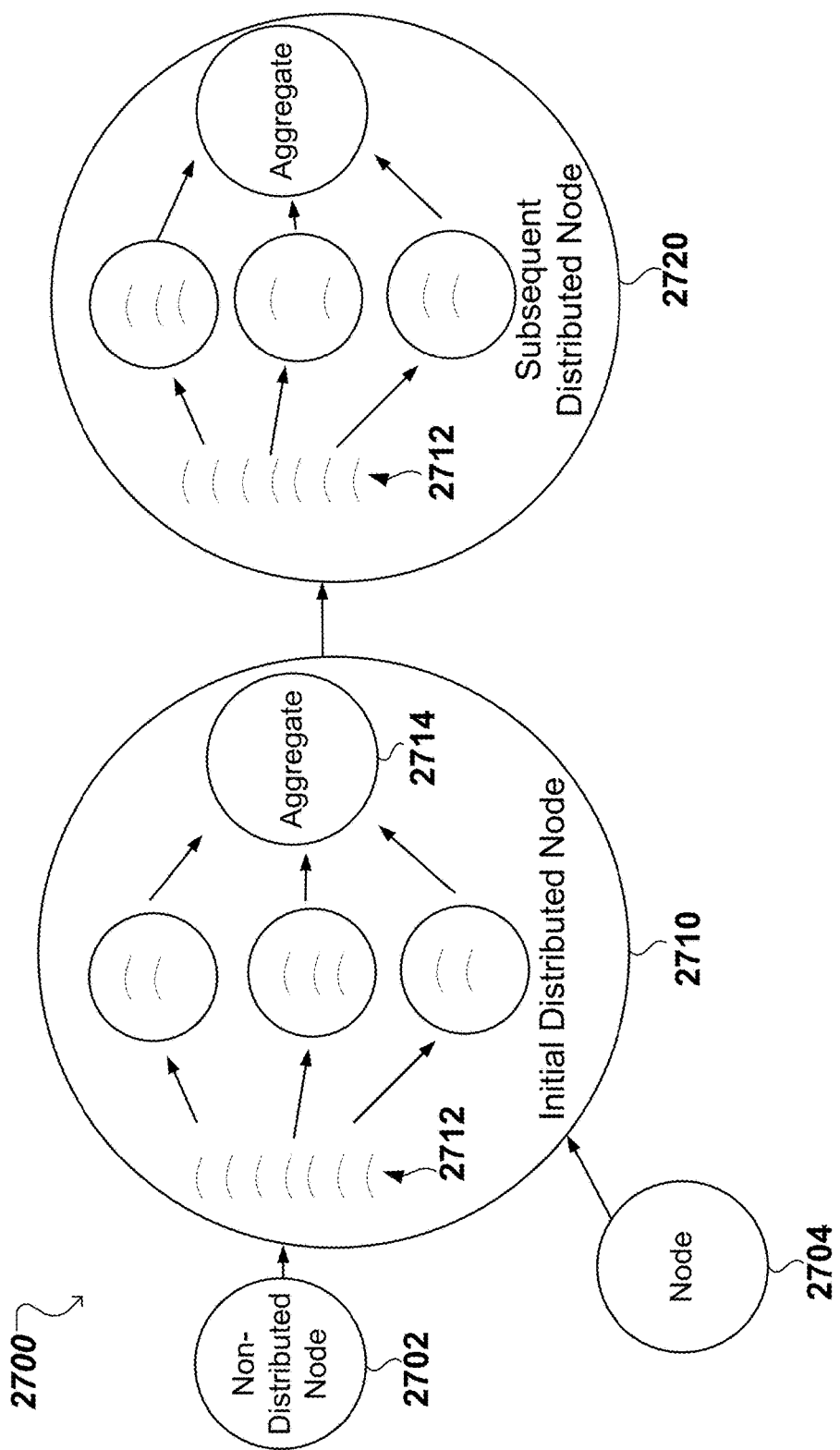
FIG. 27A illustrates an example of a calculation graph.

FIG. 27A illustrates an example of a calculation graph 2700. The calculation graph 2700 includes a non-distributed calculation node 2702 connected by an edge to an initial distributed calculation node 2710. Additionally, another calculation node 2704 (e.g., a distributed calculation node or a non-distributed calculation node) is connected by an edge to the initial distributed calculation node 2704.

As described above, the calculation graph 2700 is associated with a particular metric, and uses information associated with one or more paths to compute a column value (e.g., to be inserted in a table, as illustrated in FIG. 16). To compute the particular metric, the system accesses the calculation graph 2700, and performs the computations, and/or operations, identified in the non-distributed calculation node 2702 and the calculation node 2704 (e.g., in parallel, substantially in parallel, separately, and so on). In implementations in which calculation node 2702 and calculation node 2704 are computed in parallel, when computing calculation node 2710, the system can initiate the computation after receipt of results from both calculation node 2702 and 2704. In this way, calculation node 2702 and 2704 can be computed on distinct systems (e.g., central systems 2610), or in parallel on a same system, increasing the computation speed of the calculation graph 2700.

After the results from the non-distributed calculation node 2702 and the calculation node 2704 are computed, the system performs operations identified in the initial distributed calculation node 2710 using the results (e.g., a subset of the results, all of the results, or none of the results). As illustrated in the calculation graph 2700, the initial distributed calculation node 2710 is utilizing information associated with 7 paths 2712. The system (e.g., a central system 2610 as described above) determines subsets of the paths 2712, and directs distributed computing systems (e.g., distributed computing systems 2620A-N) to utilize information associated with respective subsets, and the results from the calculation nodes 2702 and 2704, to compute the initial distributed calculation node 2710. In the example of FIG. 27A, the system has determined three subsets of paths, with a first and third subset including two paths, and a second subset including three paths. In some implementations, the system can determine subsets of paths according to a quantity of distributed computing systems that are being utilized at below a threshold computing capacity (e.g., the system can determine a greater number of subsets if a greater number of distributed computing systems are not being utilized). In some implementations, and as will be described below with reference to FIGS. 29-30, the system can determine subsets of paths such that information associated with each path in a respective subset is stored (e.g., locally stored), or maintained (e.g., in a storage subsystem) by a particular distributed computing system.

The distributed computing systems (e.g., described above in FIG. 26B) perform computations, and/or operations, identified in the initial distributed calculation node 2710, and provide computation results to the system (e.g., to a central system 2610 as described above), which aggregates the results to determine final results 2714 for the calculation node 2710. As will be described below, with reference to FIG. 28, the system can store intermediate values generated for each path, or subset of paths. The intermediate values can be used in a subsequent utilization of the initial distributed calculation node 2710, to avoid processing the initial distributed calculation node 2710 a subsequent time.

The aggregated final results 2714 are then utilized by the system to perform computations identified in a subsequent distributed calculation node 2720. As illustrated in FIG. 27, the system has determined subsets of the 7 paths 2712 (e.g., according to locations of information associated with each subsets). For the subsequent distributed calculation node 2720, the subset of paths have been determined to be different than for the initial distributed calculation node 2710 (e.g., as described above, this can be based off a utilization of each distributed computing systems). However in some implementations each subset of paths can be identical for each distributed calculation node (e.g., in implementations in which distributed computing systems store, or maintain, information associated with particular paths).

Figure 27B:
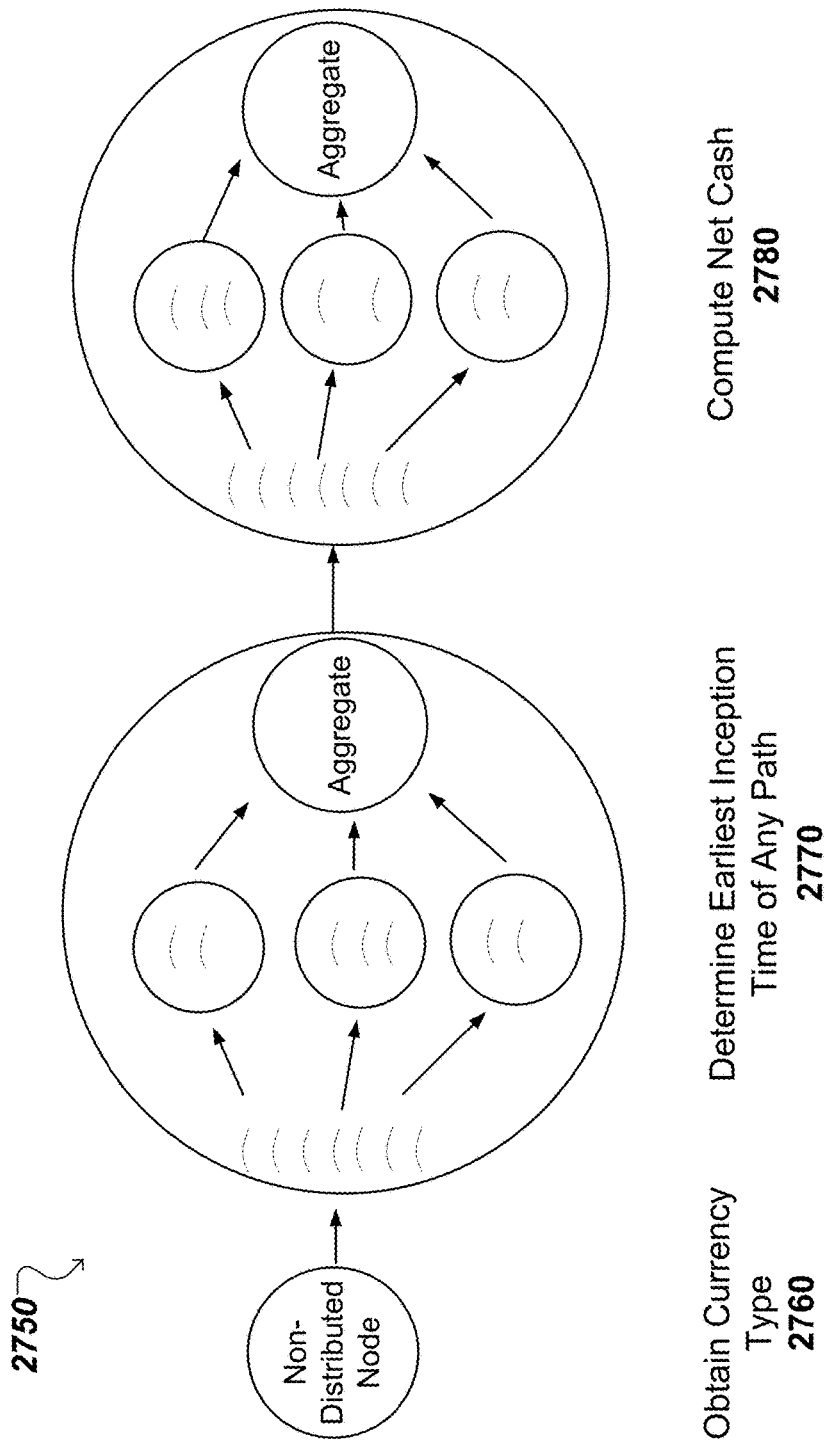
FIG. 27B illustrates a calculation graph associated with computing a net cash of multiple assets since inception.

FIG. 27B illustrates a calculation graph 2750 associated with computing a net cash of multiple assets since inception (e.g., since each asset was held by, or associated with, a person). The calculation graph 2750 includes two distributed calculation nodes, 2770 and 2780, and an initial non-distributed calculation node 2760.

As described above, to compute the net cash of assets since inception, an earliest time of any of the assets needs to be determined. In the example of FIG. 27B, each path is associated with a particular asset, which is further illustrated in example FIG. 15C. Since the earliest time creates a data dependency between each path (e.g., the system is required to sum up net cash of all assets from a particular time, without having access to the particular time), computing net cash from inception, as a single calculation node, has to be a non-distributed calculation node. However, since determining an earliest time does not have a data dependency between paths, operations to determine an earliest time can be identified in a distributed calculation node (e.g., the distributed calculation node 2770). Similarly, once an earliest time is determined, computing net cash does not introduce any data dependencies between the paths, and computing net cash can be identified in a subsequent distributed calculation node 2780.

As illustrated in FIG. 27B, an initial non-distributed calculation node 2760 identifies operations to obtain a currency type. Since the currency type can be obtained (e.g., from a user in a user request for net cash since inception, from a geographic region of the user, or from any of the assets), there is no performance benefit in converting this calculation node 2760 into a distributed calculation node. The obtained currency type 2760 is stored, and utilized to compute net cash using computations, and/or operations, identified in the distributed calculation node 2780.

As will be described below, with respect to FIGS. 31-32, the calculation graph 2750 can be presented to a user, allowing the user to quickly identify whether the operation flow of operations identified in the calculation graph is logical. For instance, the user can view FIG. 27B (e.g., with explanatory text near each calculation node), and quickly verify that the calculation graph 2750 properly computes net cash from inception. In some implementations, each calculation node in the calculation graph 2750 is configured to be selectable, and upon a user selection of a calculation node, information describing the calculation node can be presented. For instance, the operations identified in the calculation node can be presented (e.g., with options to edit the operations, add operations, and so on), comments left by another user can be presented, and so on.

Figure 28:
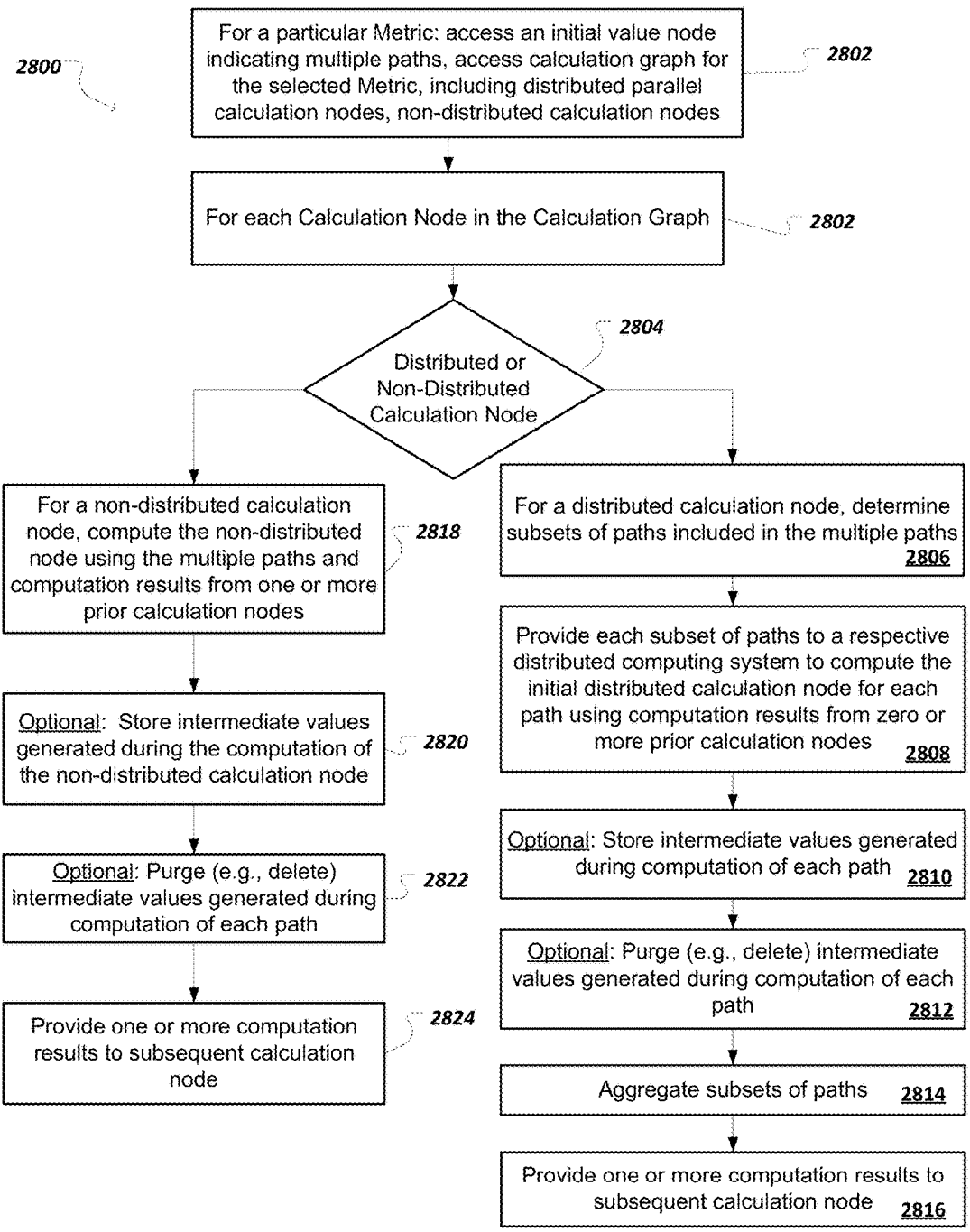
FIG. 28 is a flowchart of an example process for computing a metric using an associated calculation graph.

FIG. 28 is a flowchart of an example process 2800 for computing a metric using an associated calculation graph. For convenience, the example process 2800 will be described as being performed by a system of one or more computers (e.g., the system 2602 using a distributed system architecture).

The system accesses a calculation graph associated with the metric (e.g., obtains information identifying computations, and/or operations, identified in the calculation graph), and obtains identifications of paths that are included in an initial value node (e.g., a row in a table, as described above in FIG. 26C).

The system traverses to a calculation node in the calculation graph, and determines whether the calculation node is a distributed calculation node or a non-distributed calculation node (blocks 2802, 2804). As described above, a distributed calculation node indicates that the paths can be computed in parallel (e.g., a data dependency does not exist between paths). A description of computing a distributed calculation node follows, and a description of computing a non-distributed calculation node begins at block 2816.

To compute a distributed calculation node, the system determines subsets of the paths included in the value node (block 2806). Since computing the paths can be performed in parallel, the system determines subsets of paths which can then each be computed, in parallel, by different distributed computing systems.

As described above, the system can determine a number of paths to include in each subset according to a number of distributed computing systems that are being utilized at less than a threshold percentage. Additionally, as will be described below with reference to FIGS. 29-30, the system can assign each path to a particular subset, such that all paths assigned to a subset are stored by a same distributed computing system.

The system provides information to each distributed computing system to perform the computations, and/or operations, identified in the distributed calculation node using information associated with a respective subset of paths, and zero or more computation results from prior calculation nodes (block 2808).

As described above, with respect to FIG. 27A, a single calculation node (e.g., calculation node 2710) can be connected by an edge to multiple prior calculation nodes (e.g., calculation node 2702 and calculation node 2704). The computation results from the prior calculation nodes can, in some examples, be utilized by a present calculation node (e.g., the distributed calculation node). The computation results from the prior calculation nodes can be provided (e.g., by a central system as described in FIG. 26B) to each distributed computing system.

Each distributed computing system performs the computations, and/or operations, identified in the distributed calculation node, and provides the computation results to the system (e.g., central system 2610 as described in FIG. 26B).

In some implementations, the system can store intermediate values generated during the computation of each path (block 2810). For instance, each distributed computing system can store computation results generated after performing the distributed calculation node for each path. In this way, if the distributed computing system is directed to perform the distributed calculation node on one or more of the already processed paths a second time, the distributed computing system can simply access the computation result (e.g., from local storage). In some implementations, the central system (e.g., central system 2610 described in FIG. 26B) can receive the intermediate values (e.g., partial computation results as described in FIG. 26B), and store the intermediate values. In this way, the central system can avoid directing distributed computing systems to perform any computations at all, and can simply obtain the intermediate values from storage (e.g., local storage).

As an example, a particular distributed computing system can perform computations, and/or operations, identified in the distributed calculation node using information associated with particular paths (e.g., a subset of the paths identified in the initial value node), for instance example paths 1-4. After performing the distributed calculation node, the particular distributed computing system can store the intermediate values for each of the example paths. In a subsequent value node identifying paths, for instance example paths 2-3, the particular distributed computing system can access the intermediate values already generated for example paths 2-3 (e.g., generated when computing example paths 1-4), and provide, or combine, the intermediate values to the central system. Additionally, in some implementations the central system can store the intermediate values for example paths 1-4, and can automatically utilize the intermediate values for examples paths 2-3 without use of the particular distributed computing system.

Since intermediate values can be optionally stored, in general each path may need only be computed a single time for each distributed calculation node. Therefore, in some implementations, the system can initially select a value node that includes all of the paths, and perform the calculation graph on the value node such that intermediate values for all paths are initially determined. In this way, in performing the calculation graph on remaining value nodes that include less than all of the paths, any distributed calculation node in the calculation graph can use already determined intermediate values.

However, if there are a large number of paths (e.g., tens, hundreds, thousands), performing the calculation graph on the entirety of the paths might take a large amount of time. Therefore, the system can initially compute the metric for value nodes that include less than the entirety of the paths, and provide them for presentation to a client device, and lastly compute the metric for a value node that includes all of the paths (e.g., using, in part, intermediate values that have been generated).

In some implementations, the system can also optionally purge intermediate values generated during the computation of each path (block 2812). For instance, through analyzing the computation graph, the system can determine, for instance based on edges between calculation nodes, when information output from a particular calculation node is no longer needed. As an example, the particular calculation node may be connected via respective edges to two subsequent calculation nodes that utilize information received from the particular calculation node. Upon the two subsequent calculation nodes executing, the output of the particular calculation node can be purged (e.g., deleted, as may no longer be needed).

The system can track (e.g., monitor) the results that will be output by a calculation node. The results can be provided to subsequent calculation nodes that depend on the results of the initial calculation nodes (e.g., as identified via edges connecting the calculation nodes). When the subsequent calculation nodes finish (e.g., complete) calculations, the tracked result at the initial stage may no longer be needed. At that point, the results may be purged to reduce memory usage. The system may implement the tracking functionality by utilizing a calculation graph with interconnected calculation nodes as depicted in FIG. 15A. The system examines the dependencies of the calculation nodes. If all the outgoing edges of a node (e.g., the calculation nodes performing the subsequent calculation stages) have been executed, then the system may no longer need the results of the initial calculation node, and thus the results can be purged.

The system aggregates the subsets of paths (block 2814). As described above, each distributed computing system determines computation results, and provides the computation results to the system (e.g., to the central system 2610). The system performs an aggregation process to combine (e.g., sum) the computation results from each distributed computing system into a final computation result for the distributed calculation node.

The system provides one or more computation results to subsequent calculation nodes (block 2816). The system traverses to a subsequent calculation node, or more than one subsequent calculation node, and uses the computation results when performing the subsequent calculation nodes.

For a non-distributed calculation node, the system performs the computations, and/or operations, identified in the non-distributed calculation node using information associated with the paths (block 2818). Since there is a data dependency between paths in a non-distributed calculation node, the system performs the computations using the entirety of the paths. As described above, the system can obtain information associated with each path from the distributed computing systems, or the system can store, or maintain, information associated with all paths.

The system optionally stores intermediate values generated during computation of the non-distributed calculation node (block 2820). For some non-distributed calculation nodes that only include linear computations, the system can store intermediate values generated during the computation of the non-distributed calculation node, and re-use one or more of the intermediate values or extract (e.g., cancel) the effects of one or more paths.

The system optionally purges (e.g., deletes) intermediate values (block 2822). As described above, with respect to block 2812, intermediate values output from calculation nodes that are not to be utilized again in the calculation graph, may be deleted to conserve memory, reduce processing (e.g., limit monitoring of variables), and so on.

Figure 29A:
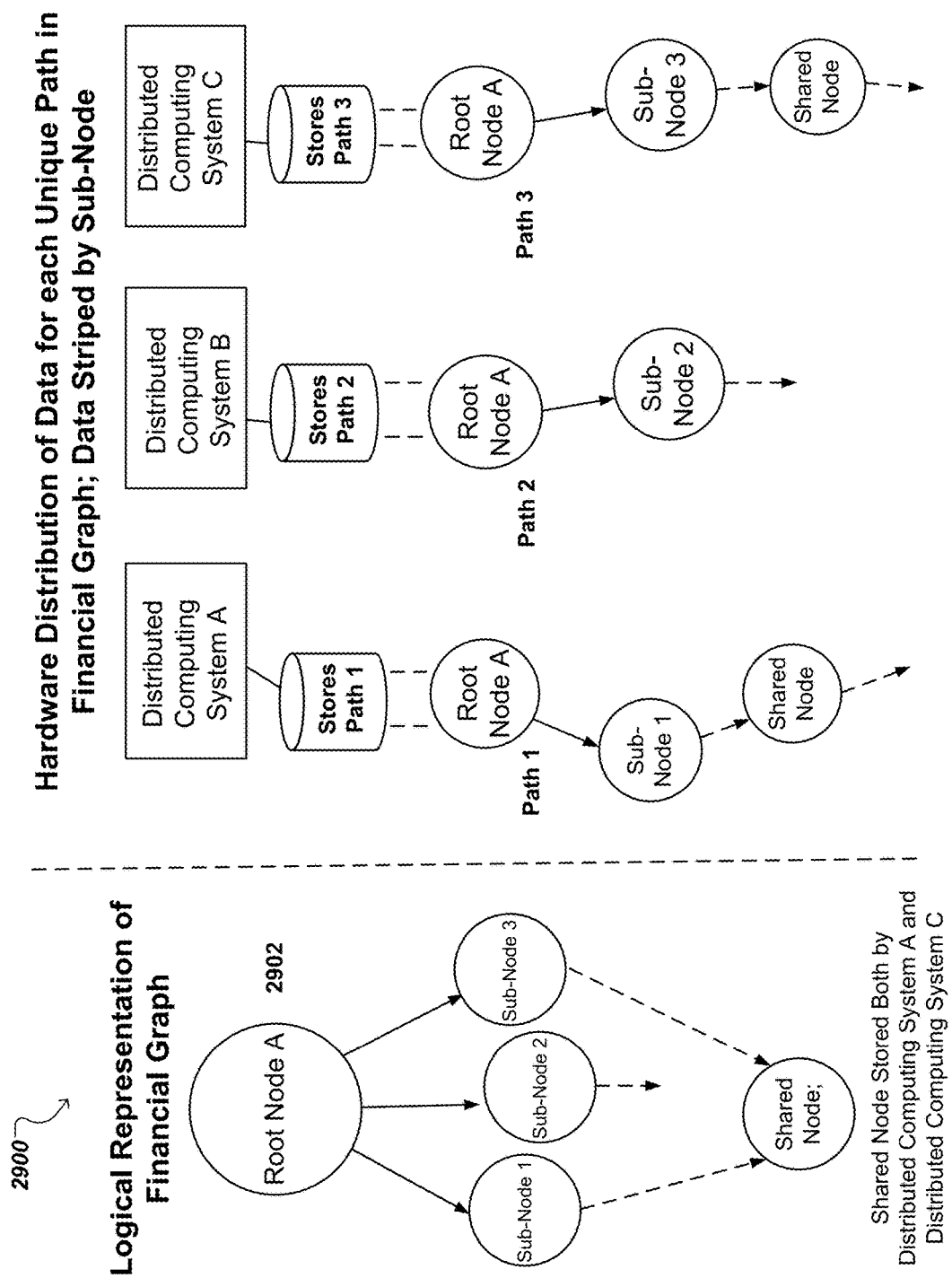
FIG. 29A illustrates a block diagram of an example distribution of the graph across distributed computing systems.

The system provides one or more computation results to subsequent calculation nodes (block 2824). The system traverses to a subsequent calculation node, or more than one subsequent calculation node, and uses the computation results when performing the subsequent calculation nodes. FIG. 29A illustrates a block diagram 2900 of the distribution the graph (e.g., the mathematical graph 202) across distributed computing systems. The block diagram 2900 includes a logical representation of a graph 2902 (e.g., a graph as described above in reference to FIG. 15A), which includes a root node (e.g., a person such as "Bob" as illustrated in FIG. 15A), and one or more sub-nodes (e.g., "Trust", followed by "Stock D", "Bond E", and "Stock F" as illustrated in FIG. 15A). Additionally, Sub-Node 1 and Sub-Node 3 include a same shared node in respective paths.

As described above, the system can enumerate unique paths from the root node to each lowest level node (e.g., a node without children). In the example of FIG. 29A, there are three unique paths, Path 1 which includes Root Node A, Sub-Node 1, and the Shared Node; Path 2, which includes Root Node A, Sub-Node 2, and subsequent nodes; and Path 3, which includes Root Node A, Sub-Node 3, and the Shared Node.

Distributed computing systems A-C each store information including portions of the graph (which portions may or may not be exclusive to one another). In some embodiments, the portions of the graph stored in each distributed computing system may be selected such that complete paths are included on each system. For example, as shown in the example of FIG. 29A, Distributed computing systems A-C each store information associated with one of the enumerated paths, such that each distributed computing system can perform computations, and/or operations, identified in a distributed calculation node using information associated with a path that they store locally (e.g., in a database). As illustrated, Distributed computing system A stores information associated with Path 1, Distributed computing system B stores information associated with Path 2, and Distributed computing system C stores information associated with Path 3.

Each path can be stored by a particular distributed computing system according to a storage process. For instance, as illustrated in FIG. 29A, the paths are assigned to a distributed computing system in a round-robin fashion according to Sub-Node. In some other implementations, paths can be assigned in a different manner (e.g., according to a different level of sub-node, according to a type of information, and so on). In the example of FIG. 29A, the data is therefore striped by Sub-Node.

Figure 29B:
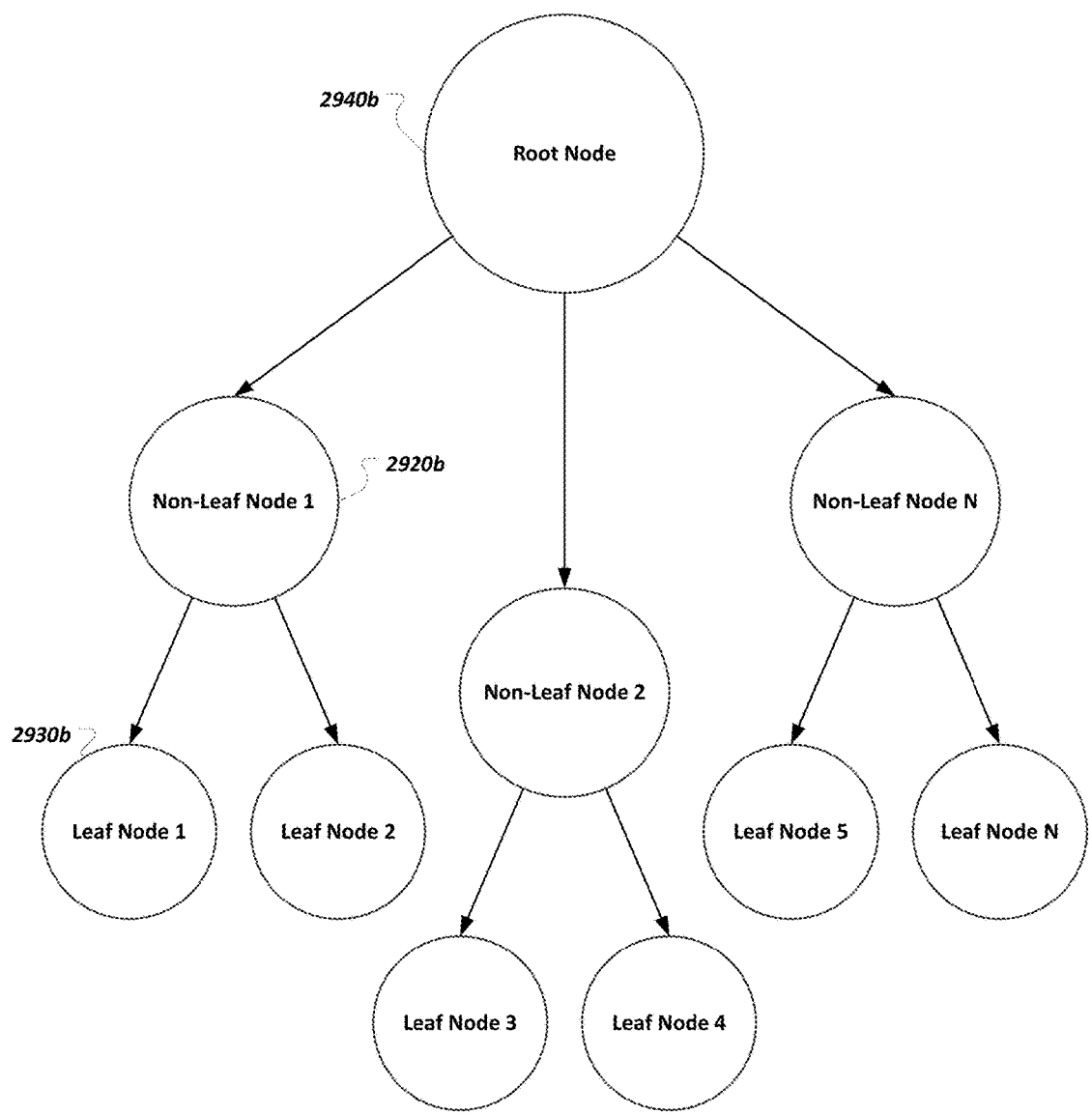
FIG. 29B illustrates a block diagram of another example distribution.

Data may optionally or alternatively be striped as illustrated in FIG. 29B, according to leaf nodes and non-leaf nodes. In a striped, round-robin approach, data may optionally be categorized as leaf or non-leaf positions. For example, a financial account or trust can, in some implementations, be considered a non-leaf position (e.g., as illustrated in FIG. 15C), and stocks, bonds, and so on, may be considered leaf positions. Data striping divides data into segments that are distributed to different physical locations. In some embodiments of the distributed system architecture, the system (e.g., Central System 2610 of FIG. 26B) stripes leaf nodes 2930*b* to different remote servers (e.g., Distributed Computing System 2620 of FIG. 26B). For instance, leaf node 1 (e.g., a path that terminates at leaf node 1) may be distributed to (e.g., stored by) a first distributed computing system 1, leaf node 2 may be distributed to a second distributed computing system, and so on.

Each distributed computing system stores information associated with all nodes included in a particular path. Therefore, data can be stored by the system multiple times. For instance, distributed computing systems A-C each store information associated with Root Node A, and Distributed computing systems A and C store information associated with the shared node. In some other implementations, in which a shared storage pool exists in local communication with each distributed computing system (e.g., a storage subsystem can be in communication with each distributed computing system), the storage subsystem can store information associated with each path a single time.

Figure 30:
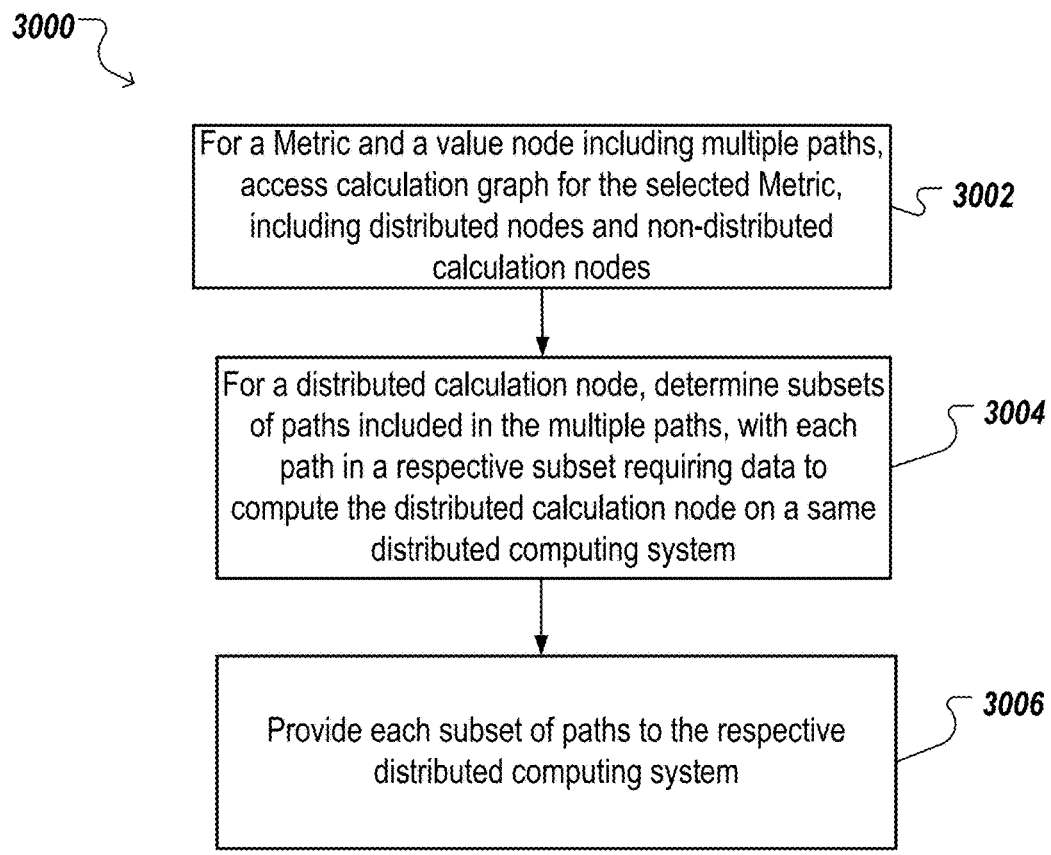
FIG. 30 illustrates an example process for determining subsets of paths when performing a distributed calculation node.

FIG. 30 illustrates an example process 3000 for determining subsets of paths when performing a distributed calculation node. For convenience, the process 3000 will be described as being performed by a system of one or more computers (e.g., the system 2602 using a distributed system architecture).

The system accesses a calculation graph associated with a metric, the calculation graph including distributed calculation nodes and non-distributed calculation nodes. (block 3002). As described above, each metric can be associated with a calculation graph, and the system can utilize the calculation graph to compute a metric for a value node that includes one or more paths.

The system determines subsets of paths included in the paths (block 3004). The system determines subsets of paths such that each path in a subset is stored by a same distributed computing system.

For instance, as illustrated in FIG. 29A, each distributed computing system can store information associated with one or more paths. The system (e.g., the central system 2610) can obtain information identifying which paths are stored by distributed computing systems, or provide requests to distributed computing systems to identify paths they store, and determine subsets of the paths with each subset being stored by a same distributed computing system.

The system directs each distributed computing system to perform the distributed calculation node using a respective subset of paths. As described above, each distributed computing system can perform the computations, and/or operations, identified in the distributed calculation node, and provide the computation results to the system (e.g., central system 2610) for aggregation. Since each distributed calculation node stores information associated with a respective subset of paths locally, the computation speed of the distributed calculation node can be increased.

Figure 31:
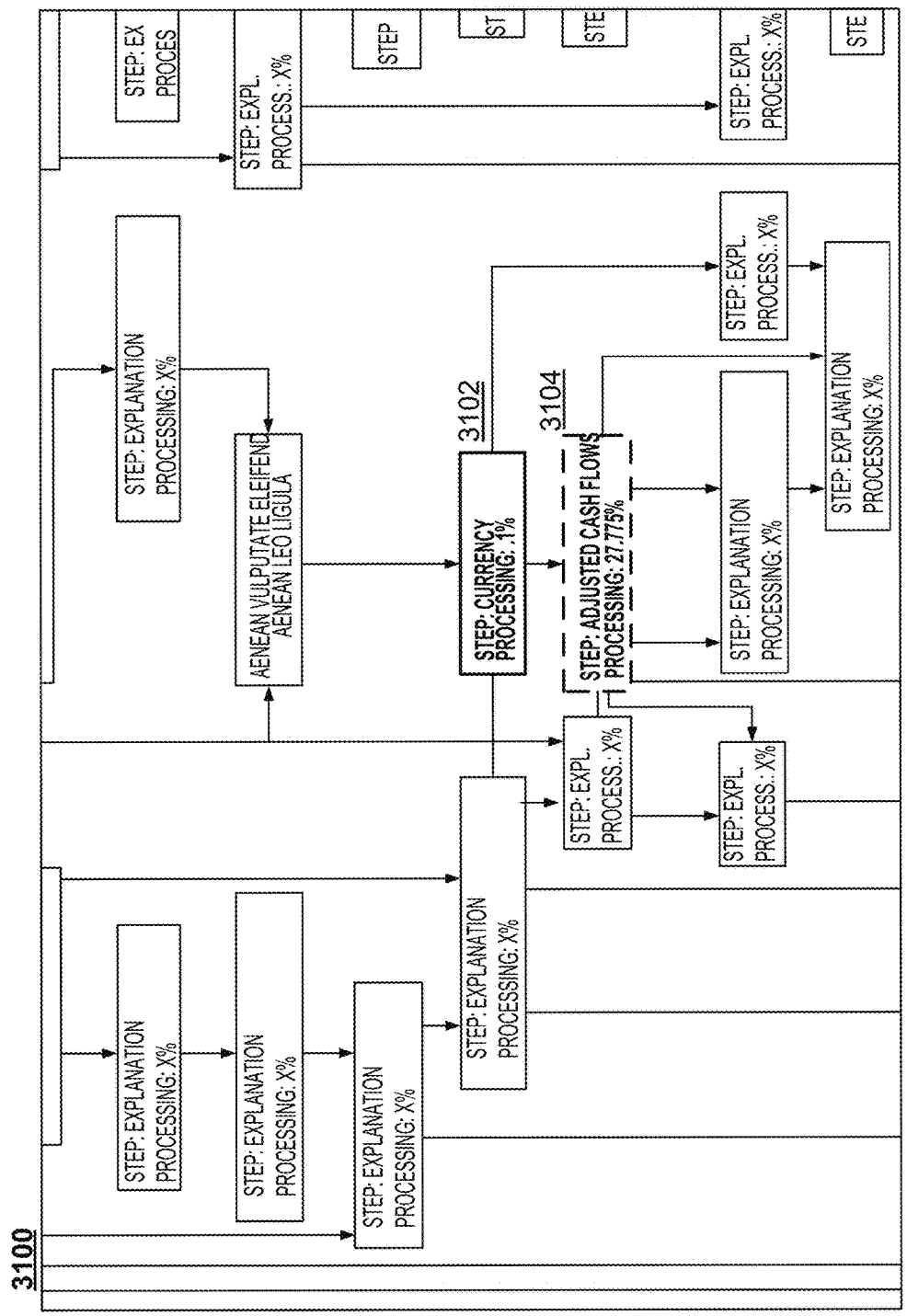
FIG. 31 illustrates a portion of a visual representation of a calculation graph that has been zoomed by a user.

FIG. 31 illustrates a portion 3100 of a visual representation of a calculation graph that has been zoomed by a user. As described above, the system can provide a visual representation of a calculation graph for presentation on a client device (e.g., generate user interface data in response to receiving a request). The user of the client device can interact with the visual representation of the calculation graph to zoom in on a portion 3100 of the representation to examine individual distributed calculation nodes or non-distributed calculation nodes. Since a calculation graph can be unwieldy in size (e.g., tens, hundreds, thousands of calculation nodes), the representation can be zoomed by the user to examine detail. Thus, an electronic representation of a calculation graph can be generated and still each individual portion of the representation can be examined by a user.

The portion 3100 includes calculation nodes with associated information, which as illustrated in FIG. 31, includes explanatory text of each calculation node's function. For instance, Calculation node 3102 includes explanatory text stating "Currency". Each calculation node further includes an identification of an amount of processing time the system incurs when performing the computations, and/or operations, identified in the calculation node. For instance, calculation node 3102 indicates that the system spends "0.1%" processing the calculation node 3102. The processing time can be determined as a measure of central tendency (e.g., average) of processing times after computing a threshold number of metrics associated with the calculation graph. Additionally, the processing time can be specific to a single performance of the calculation graph (e.g., specific to a user).

Furthermore, calculation node 3104 includes explanatory text stating "Adjusted Cash Flows" and indicates a processing time of "27.775%." The user reviewing the portion 3100 of the visual representation can view Calculation node 3104, and determine that any optimizations made to the calculation graph should be made to Calculation node 3104. For instance, the calculation graph can indicate whether Calculation node 3104 is a distributed or non-distributed calculation node, and if the Calculation node 3104 is non-distributed, the system can include information identifying a data dependency between the paths. In this way, the user can determine whether the Calculation node 3104 can be turned from a non-distributed calculation node into one or more distributed calculation nodes (e.g., as described in FIG. 27B). To indicate whether a calculation node is distributed or non-distributed, the system can assign a particular color to distributed and non-distributed calculation nodes, or can highlight or otherwise identify a type of each calculation node.

In some implementations the user can watch the calculation graph being performed on live data. That is, the visual representation of the calculation graph can be updated (e.g., the user interface data can be updated and re-generated) as each calculation node in the calculation graph is being performed and completed, and results from each calculation node can be graphically illustrated as being provided to subsequent calculation nodes. The user can select a particular calculation node and view information associated with the selected calculation node, including which distributed computing systems are being utilized (e.g., and which paths they store), the computations, and/or operations, identified in the selected calculation node, and so on.

Figure 32:
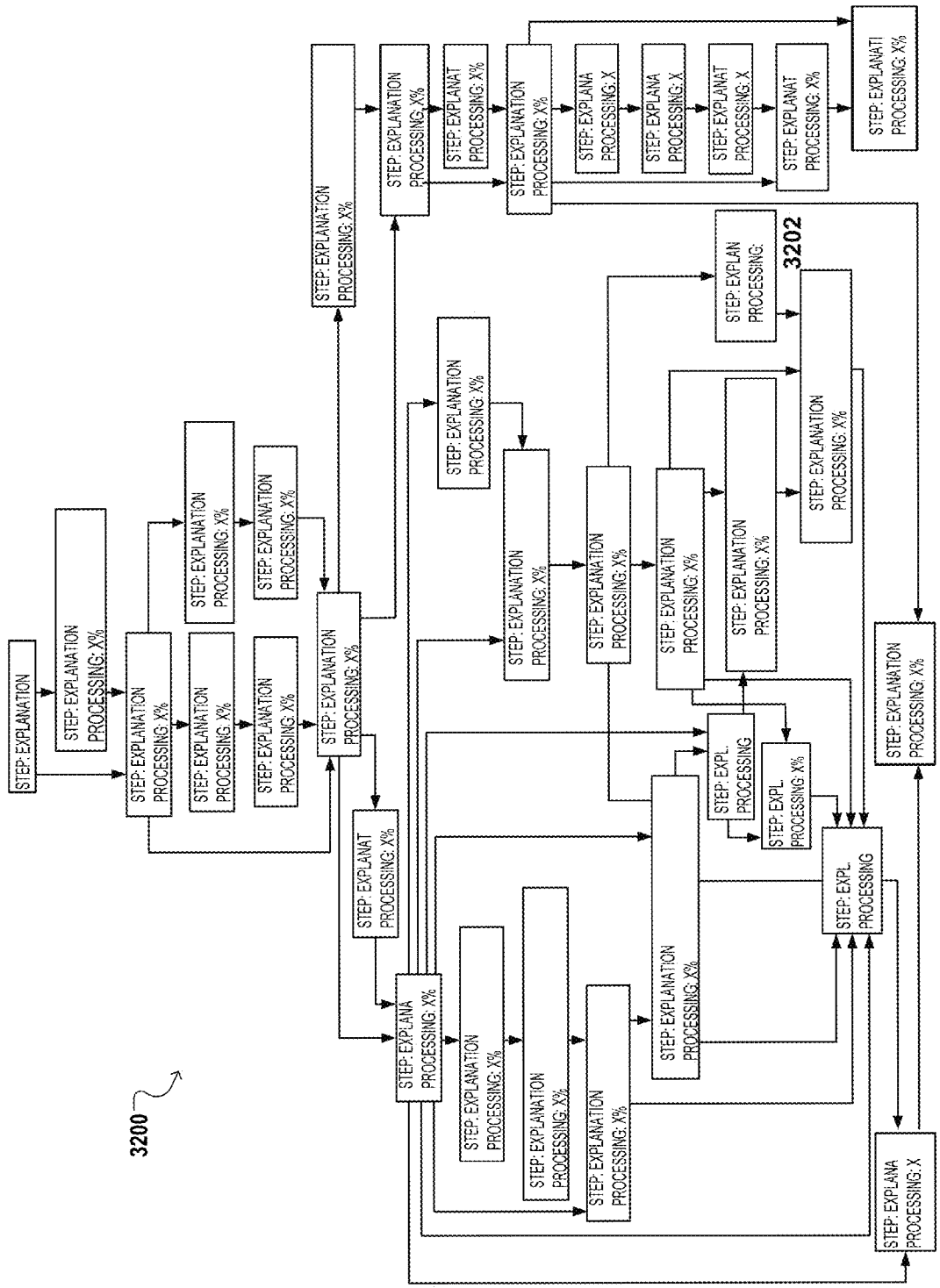
FIG. 32 illustrates a zoomed out calculation graph.

FIG. 32 illustrates a zoomed out visual representation of a calculation graph 3200. As described in FIG. 31, a portion of the visual representation of the calculation graph 3200 can be zoomed to examine detail associated with particular calculation nodes. In the example of FIG. 32, the entirety of the visual representation of the calculation graph 3200 can be viewed by the user. As illustrated (e.g., step 2302), some of the explanatory text can be minimized (e.g., cut off from view of the user) with the visual representation zoomed out. Therefore, as described above a user can zoom in allowing the user to obtain fine-grain information associated with particular steps, and determine calculation nodes that are ripe for being distributed.

11.0 Additional Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to access one or more electronic data sources in response to inputs received via an interactive user interface in order to automatically calculate metrics based on a complex mathematical graph and insert the metrics into a dynamically generated table of the interactive user interface, the computing system comprising:
   one or more computer processors; and
   a computer readable storage medium configured to:
      store a complex mathematical graph comprising nodes and edges, each of the nodes storing information associated with at least one of an account, an individual, a legal entity, or a financial asset, each of the edges storing a relationship between two of the nodes, wherein a plurality of attributes is associated with each of the nodes and each of the edges; and store program instructions configured for execution by the computer processors in order to cause the computing system to:

generate user interface data for rendering an interactive user interface on a computing device, the interactive user interface including:

a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and a context selection element including a listing of a plurality of perspectives from which the dynamically generated table may be automatically updated, each of the plurality of perspectives associated with a node of the complex mathematical graph;

receive, via the interactive user interface, a selection of one of one of the plurality of perspectives;

determine a node of the complex mathematical graph associated with the selected perspective;

automatically traverse the complex mathematical graph from the determined node so as to enumerate paths within the complex mathematical graph that are associated with the determined node;

for each enumerated path, determine any rows of the dynamically generated table associated with the enumerated path based on nodes commonly associated with the enumerated path and a row of the dynamically generated table;

generate a bucketing tree comprising a plurality of value nodes corresponding to the rows of the dynamically generated table and associated with the respective enumerated paths determined to be associated with the rows;

for each metric of the dynamically generated table:

access a calculation graph associated with the metric, the calculation graph including at least one distributed calculation node and zero or more non-distributed calculation nodes, wherein each calculation node identifies computations and/or operations that are part of computing the metric;

for each value node associated with respective paths:

perform computations and/or operations identified in the calculation graph using information associated with the value node's respective paths to obtain a metric value for the metric, wherein for a particular distributed calculation node of the calculation graph, the computing system:

determines subsets of the value node's respective paths;

provides, to each of a plurality of distributed computing systems, information describing a particular subset and the particular distributed calculation node;

receives, from each of the plurality of distributed computing systems, computation results; and aggregates the received computation results to obtain a final computation result for the particular distributed calculation node; and automatically update the dynamically generated table with the calculated metric values, wherein each of the calculated metric values is inserted into a cell of the table corresponding to the row associated with the value.

2. The computing system of claim 1, wherein determining subsets of the value node's respective paths comprises:

obtaining information identifying distributed computing systems and paths stored by the distributed computing systems;

identifying distributed computing systems that store paths of the respective paths; and assigning each path to a subset such that each path included in a subset is stored by a same distributed computing system.

3. The computing system of claim 1, wherein the rows of the dynamically generated table are arranged hierarchically according to a user defined categorization of one or more attributes associated with nodes of the complex mathematical graph.

4. The computing system of claim 1, wherein the program instructions further cause the computing system to:

store, by each distributed computing system, intermediate values computed for each path after performing computations, and/or operations, identified in the particular distributed calculation node.

5. The computing system of claim 4, wherein for a particular value node and the particular distributed calculation node:

obtain, by a distributed computing system, intermediate values previously computed for one or more paths that are same as paths associated with the particular value node;

perform the computations, and/or operations, identified in the particular calculation node using, at least in part, the obtained intermediate values.

6. The computing system of claim 1, wherein the program instructions further cause the computing system to:

discard intermediate values generated during performance of computations and/or operations identified in a calculation node based on information indicating inputs to subsequent calculation nodes.

7. The computing system of claim 1, wherein for a node in the calculation graph comprising a distributed calculation node or a non-distributed calculation node, performing the computations, and/or operations, identified in the calculation node, and using the computation results of the calculation node when performing a subsequent calculation node in the calculation graph connected by an edge to the calculation node.

8. The computing system of claim 1, wherein the one or more metrics include at least one of asset value, TWR, IRR, rate of return, cash flow, or average balance.

9. The computing system of claim 1, wherein the interactive user interface further includes a graphical representation of a selected calculation graph, the interactive user interface configured to receive a selection of a calculation node in the selected calculation graph, and update the interactive user interface to include information describing the selected calculation node.

10. The computing system of claim 9, wherein information describing the selected calculation node includes computations, and/or operations, identified in the selected calculation node.

11. The computing system of claim 1, wherein the interactive user interface further includes a graphical representation of a selected calculation graph, the graphical representation including the distributed and non-distributed calculation nodes of the calculation graph connected by edges, and information describing each calculation node.

12. The computing system of claim 11, wherein information describing each calculation node includes explanatory text associated with the calculation node and a total processing time that the system incurs when processing the calculation node.

13. The computing system of claim 1, wherein automatically traversing the complex mathematical graph from the determined node so as to enumerate paths within the complex mathematical graph is performed by the distributed computing systems, which each determine a subset of the enumerated paths.

14. The computing system of claim 1, wherein for the particular distributed calculation node, the program instructions further cause the computing system to provide information to the distributing computing systems to compute the particular distributed calculation node for the plurality of values nodes in a same call to the distributed computing systems.

15. A method comprising:
by a computing system of one or more processors,
accessing a complex mathematical graph comprising nodes and edges, each of the nodes storing information associated with at least one of an account, an individual, a legal entity, or a financial asset, each of the edges storing a relationship between two of the nodes, wherein a plurality of attributes is associated with each of the nodes and each of the edges
generating user interface data for rendering an interactive user interface on a computing device, the interactive user interface including:
a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and
a context selection element including a listing of a plurality of perspectives from which the dynamically generated table may be automatically updated, each of the plurality of perspectives associated with a node of the complex mathematical graph;
receiving, via the interactive user interface, a selection of one of one of the plurality of perspectives;
determining a node of the complex mathematical graph associated with the selected perspective;
traversing the complex mathematical graph from the determined node so as to enumerate paths within the complex mathematical graph that are associated with the determined node;
for each enumerated path, determining any rows of the dynamically generated table associated with the enumerated path based on nodes commonly associated with the enumerated path and a row of the dynamically generated table;
generating a bucketing tree comprising a plurality of value nodes corresponding to the rows of the dynamically generated table and associated with the respective enumerated paths determined to be associated with the rows;
for each metric of the dynamically generated table:
accessing a calculation graph associated with the metric, the calculation graph including at least one distributed calculation node and zero or more non-distributed calculation nodes, wherein each calculation node identifies computations and/or operations that are part of computing the metric;
for each value node associated with respective paths:
performing computations and/or operations identified in the calculation graph using information associated with the value node's respective paths to obtain a metric value for the metric, wherein for a particular distributed calculation node of the calculation graph:
determining subsets of the value node's respective paths;
providing, to each of a plurality of distributed computing systems, information describing a particular subset and the particular distributed calculation node;
receiving, from each of the plurality of distributed computing systems, computation results; and
aggregating the received computation results to obtain a final computation result for the particular distributed calculation node; and
updating the dynamically generated table with the calculated metric values, wherein each of the calculated metric values is inserted into a cell of the table corresponding to the row associated with the value.

16. The method of claim 15, wherein determining subsets of the value node's respective paths comprises:
obtaining information identifying distributed computing systems and paths stored by the distributed computing systems;
identifying distributed computing systems that store paths of the respective paths; and
assigning each path to a subset such that each path included in a subset is stored by a same distributed computing system.

17. The method of claim 15, wherein the rows of the dynamically generated table are arranged hierarchically according to a user defined categorization of one or more attributes associated with nodes of the complex mathematical graph.

18. The method of claim 15, wherein the method further comprises:
storing, by each distributed computing system, intermediate values computed for each path after performing computations, and/or operations, identified in the particular distributed calculation node.

19. The method of claim 15, wherein the interactive user interface further includes a graphical representation of a selected calculation graph, the interactive user interface configured to receive a selection of a calculation node in the selected calculation graph, and update the interactive user interface to include information describing the selected calculation node.

20. The method of claim 15, wherein for a node in the calculation graph comprising a distributed calculation node or a non-distributed calculation node, performing the computations, and/or operations, identified in the calculation node, and using the computation results of the calculation node when performing a subsequent calculation node in the calculation graph connected by an edge to the calculation node.

* * * * *